United States Patent [19]

Hedrick et al.

[11] 4,369,222
[45] Jan. 18, 1983

[54] METAL-THERMOPLASTIC-METAL LAMINATES

[75] Inventors: Ross M. Hedrick, St. Louis; James C. Woodbrey, Chesterfield; James D. Gabbert, St. Louis; Floyd B. Erickson, Webster Groves, all of Mo.

[73] Assignee: Monsanto Company, St. Louis, Mo.

[21] Appl. No.: 314,927

[22] Filed: Oct. 26, 1981

Related U.S. Application Data

[63] Continuation of Ser. No. 230,934, Feb. 2, 1981, which is a continuation of Ser. No. 99,918, Dec. 14, 1979, abandoned, which is a continuation-in-part of Ser. No. 972,537, Dec. 22, 1978, abandoned.

[51] Int. Cl.$^3$ ...................... B32B 15/08; B32B 27/34; B32B 27/36
[52] U.S. Cl. .................... 428/216; 428/213; 428/215; 428/273; 428/447; 156/311; 156/329; 156/330; 264/61; 428/450; 428/458; 428/475.5; 428/448; 428/416; 428/474.4; 428/480; 428/482; 156/308.2
[58] Field of Search ................... 428/213, 458, 474.4, 428/475.5, 480, 273, 447, 448, 450, 416, 215, 216; 156/311, 309, 329, 330; 264/261

[56] References Cited

U.S. PATENT DOCUMENTS

| | | | |
|---|---|---|---|
| 2,325,668 | 8/1943 | Dreyfus | 428/215 |
| 2,653,889 | 9/1953 | Hager | 428/447 |
| 2,740,732 | 4/1956 | Peck | 156/184 |
| 2,936,253 | 5/1960 | Agens | 428/458 |
| 3,024,131 | 3/1962 | Hutchinson | 428/447 |
| 3,164,488 | 1/1965 | Workman | 428/416 |
| 3,352,742 | 11/1967 | Zunich | 428/174 |
| 3,382,136 | 5/1968 | Bugel | 428/215 |
| 3,406,045 | 10/1968 | Sattler | 428/458 |
| 3,455,775 | 7/1969 | Pohl | 428/461 |
| 3,721,597 | 3/1973 | Colburn | 428/457 |
| 3,874,989 | 4/1975 | Stange | 428/480 |
| 3,903,350 | 9/1975 | Baird | 428/416 |
| 3,939,029 | 2/1976 | Gilliam | 156/331 |
| 3,950,605 | 4/1976 | Hori | 428/216 |
| 4,118,540 | 10/1978 | Amort | 428/457 |
| 4,143,790 | 3/1979 | Ueno | 428/458 |
| 4,156,054 | 5/1979 | Gurewitsch | 428/458 |
| 4,169,006 | 9/1979 | Matsubara | 428/480 |
| 4,182,382 | 1/1980 | Ingraham | 428/458 |
| 4,313,996 | 2/1982 | Newman | 428/461 |
| 4,330,587 | 5/1982 | Woodbrey | 428/458 |

FOREIGN PATENT DOCUMENTS 1512735 6/1978 United Kingdom .

OTHER PUBLICATIONS

Chem. Economy & Eng. Review, vol. 2(No. 10), Oct. 1970, pp. 51–53, 57, entitled "Planium–A Compound Material of Aluminum, etc.".

Modern Plastics, vol. 41, No. 7,(Mar.), 1964, "New Structural Laminates: Polyethylene Core, Aluminum Skins", pp. 119–124.

Primary Examiner—Ellis P. Robinson
Attorney, Agent, or Firm—Michael C. Schiffer; Paul D. Matukaitis; Edward P. Grattan

[57] ABSTRACT

This invention relates to construction panels comprising metal-thermoplastic-metal laminates and a process for preparing same, said laminates possessing in combination critical service properties of high heat distortion temperature, low coefficient of linear thermal expansion, low inelastic ratio, and lightness in weight.

72 Claims, 3 Drawing Figures

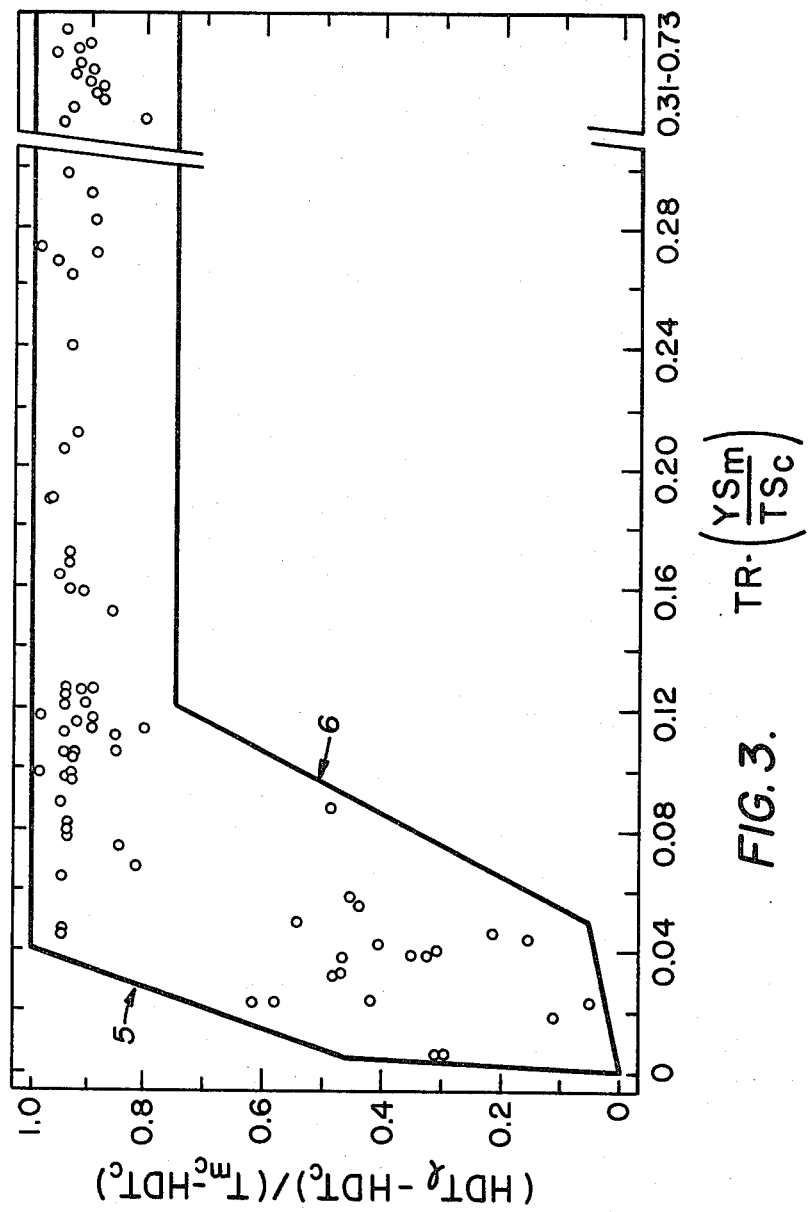

METAL-THERMOPLASTIC-METAL LAMINATES

CROSS-REFERENCE TO RELATED APPLICATION

This application is a continuation of application Ser. No. 230,934, filed Feb. 2, 1981 which is a continuation of application Ser. No. 099,918 filed Dec. 14, 1979 and now abandoned which is a continuation-in-part of co-pending application Ser. No. 972,537 filed Dec. 22, 1978, and now abandoned.

BACKGROUND OF THE INVENTION

1. Field of the Invention

This invention relates to metal-thermoplastic-metal laminates comprising a metal layer laminated to each side of a thermoplastic core layer selected from the group consisting of partly crystalline polyamides and polyesters. These laminates have an improved combination of critical properties required for use in construction applications.

2. Description of the Prior Art

Metal-thermoplastic-metal laminates and processes for their preparation are known. See, for example, Bugel et al., U.S. Pat. Nos. 3,382,136; Zunich et al., 3,352,742; and Pohl et al., *Modern Plastics*, 41 (7 March), 119–124 (1964).

The laminates described in the above-noted references as well as other prior art laminates, however, are, in general, limited in their applications, particularly when contemplated for use as construction panels where the combination of good dimensional stability under engineering loads at elevated temperatures (high heat-distortion temperatures), low thermal expansivity (low coefficient of linear thermal expansion) and good recovery from flexural deflection (low inelastic ratio) are necessary properties of a light-weight laminate.

SUMMARY OF THE INVENTION

A primary object of the present invention, therefore, is to provide a light-weight metal-thermoplastic-metal laminate having an improved combination of service properties considered important and critical for demanding construction applications such as outer and inner building panels, appliance panels, and transportation vehicle body panels, for example, automobiles, boats, airplanes, and the like.

A further object of the invention is to provide a light-weight construction panel laminate characterized by, among other properties, a combination of a high heat distortion temperature, a low coefficient of linear thermal expansion, and a low inelastic ratio (or high flexural elasticity).

A still further object of the invention is to provide such a laminate which, in addition to the critical properties deemed necessary for the construction applications, also has a wide range of additional desirable properties, for example, excellent deep-draw, simple-bend and stretch formability at elevated temperatures, very good ductility, very good energy absorption ability, (including resistance to denting), and very good strength in flexure.

Another object of the invention is to provide a laminate having a specially selected thermoplastic core layer composition.

A further object is to provide a laminate which is particularly useful in applications requiring high flexural stiffness and a high heat distortion temperature.

Still another object of the invention is to provide a laminate which is particularly adapted for use in automotive applications.

An additional object of the present invention is to provide a process for the preparation of the aforementioned metal-thermoplastic-metal laminates.

These and other objects will be apparent to those skilled in the art from the accompanying description and claims.

The above objects are successfully accomplished by the present invention which is directed to metal-thermoplastic-metal laminates having in combination:

an inelastic ratio less than about 93%;
a coefficient of linear thermal expansion less than about $63 \times 10^{-6} °C.^{-1}$;
a heat distortion temperature of at least about 130° C.; and
a maximum weight of no more than about 9.76 kg/m$^2$;

said laminate comprising:

a thermoplastic core layer selected from the group consisting of partly crystalline polyamides and polyesters having a crystalline melting point greater than about 130° C.; and
a metal layer laminated on each side of the thermoplastic core layer, each metal layer having:
a melting point greater than the crystalline melting point of the thermoplastic core layer; and a minimum thickness of about 0.00127 cm;

wherein the thickness ratio of the sum of the metal layer-thicknesses to the thermoplastic core layer thickness is described by the region of numerical overlap of the parameter TR(YS$_m$/TS$_c$) as determined from the areas defined by the relationships of TR(YS$_m$/TS$_c$) to IR$_l$, CLTE$_l$, and (HDT$_l$−HDT$_c$)/(T$_{mc}$−HDT$_c$), the lower boundary of said areas being defined by the equation of a straight line $$y = mx + b$$

in which y is the y-axis parameters of IR$_l$, CLTE$_l$, and (HDT$_l$−HDT$_c$)/(T$_{mc}$−HDT$_c$), x is the x-axis parameter of TR(YS$_m$/TS$_c$), m is the slope of the straight line, and b is the intercept on the y-axis, with the proviso that:

when y is IR$_l$, m is 108 and b is zero (0) for values of x from zero (0) to 0.65, and m is zero (0) and b is 70 for values of x greater than 0.65;
when y is CLTE$_l$, m is $-3.6 \times 10^{-4}$ and b is $45 \times 10^{-6}$ for values of x from zero (0) to 0.1, and m is zero (0) and b is $9 \times 10^{-6}$ for values of x greater than 0.1; and
when y is (HDT$_l$−HDT$_c$)/(T$_{mc}$−HDT$_c$), m is 1 and b is zero (0) for values of x from zero (0) to 0.05, m is 10 and b is $-0.45$ for values of x from 0.05 to 0.12, and m is zero (9) and b is 0.75 for values of x greater than 0.12;

and the upper boundary of said areas being defined by the equation of a straight line as defined hereinabove, with the proviso that:

when y is IR$_l$, m is 280 and b is 30 for values of x from zero (0) to 0.25, and m is zero (0) and b is 100 for values of x greater than 0.25;
when y is CLTE$_l$, m is $-2.88 \times 10^{-3}$ and b is $216 \times 10^{-6}$ for values of x from zero (0) to 0.05, m is $-1.29 \times 10^{-4}$ and b is $78.5 \times 10^{-6}$ for values of x from 0.05 to 0.26, and m is zero (0) and b is $45 \times 10^{-6}$ for values of x greater than 0.26; and when y is $(HDT_l-HDT_c)/(T_{mc}-HDT_c)$, m is 112.5 and b is zero (0) for values of x from zero (0) to 0.004, m is 15.3 and b is 0.389 for values of x from 0.004 to 0.04, and m is zero (0) and b is 1 for values of x greater than 0.04;

wherein:

$IR_l$ is the inelastic ratio of the laminate as measured in flexure at 5% strain in the outer metal layers at the point of maximum deflection;

$CLTE_l$ is the coefficient of linear thermal expansion of the laminate;

$(HDT_l-HDT_c)/(T_{mc}-HDT_c)$ is a normalized heat distortion temperature variable wherein $HDT_l$ is the heat distortion temperature of the laminate;

$HDT_c$ is the heat distortion temperature of the thermoplastic core layer;

$T_{mc}$ is the crystalline melting point of the thermoplastic core layer;

TR is the thickness ratio of the sum of the metal layer-thicknesses to the thermoplastic core layer thickness;

$YS_m$ is the thickness-weight-average tensile yield strength of the two metal layers at an offset of 5% elongation; and $TS_c$ is the tensile strength of the thermoplastic core layer.

Stated alternatively, the thickness ratio of the sum of the metal layer-thicknesses to the thermoplastic core layer thickness is described by the region of numerical overlap of the parameter $TR(YS_m/TS_c)$ as determined from plots of $IR_l$ versus $TR(YS_m/TS_c)$, $CLTE_l$ versus $TR(YS_m/TS_c)$, and $(HDT_l-HDT_c)/(T_{mc}-HDT_c)$ versus $TR(YS_m/TS_c)$ as shown, respectively, in FIGS. 1, 2 and 3 of the specification, in which $IR_l$, $CLTE_l$, $(HDT_l-HDT_c)/(T_{mc}-HDT_c)$, TR, $YS_m$, and $TS_c$ are as defined hereinabove.

It would be understood by those skilled in the art that the units for m and b for the above equations are the same as the units for the corresponding y, which units are set forth herein in the description of the y parameters.

The provision of the process object is accomplished by a process which comprises:

(a) disposing a metal layer on each side of a thermoplastic core layer selected from the group consisting of partly crystalline polyamides and polyesters, with the thickness ratio of the sum of the metal layer-thicknesses to the thermoplastic core layer thickness being determined as described hereinabove;

(b) laminating the thermoplastic core layer and the metal layers by subjecting the combination to elevated temperatures and a pressure sufficient to maintain face-adhering contact; and (c) cooling to ambient temperatures.

BRIEF DESCRIPTION OF THE DRAWINGS

The present invention will be more readily understood by reference to the accompanying drawings in which:

FIG. 3 is a plot correlating a normalized heat distortion temperature (HDT) variable, $(HDT_l-HDT_c)/(T_{mc}-HDT_c)$, with $TR(YS_m/TS_c)$ for laminates both within and without the scope of the present invention.

DETAILED DESCRIPTION OF THE INVENTION

1. Critical Service Properties

Figure 1:
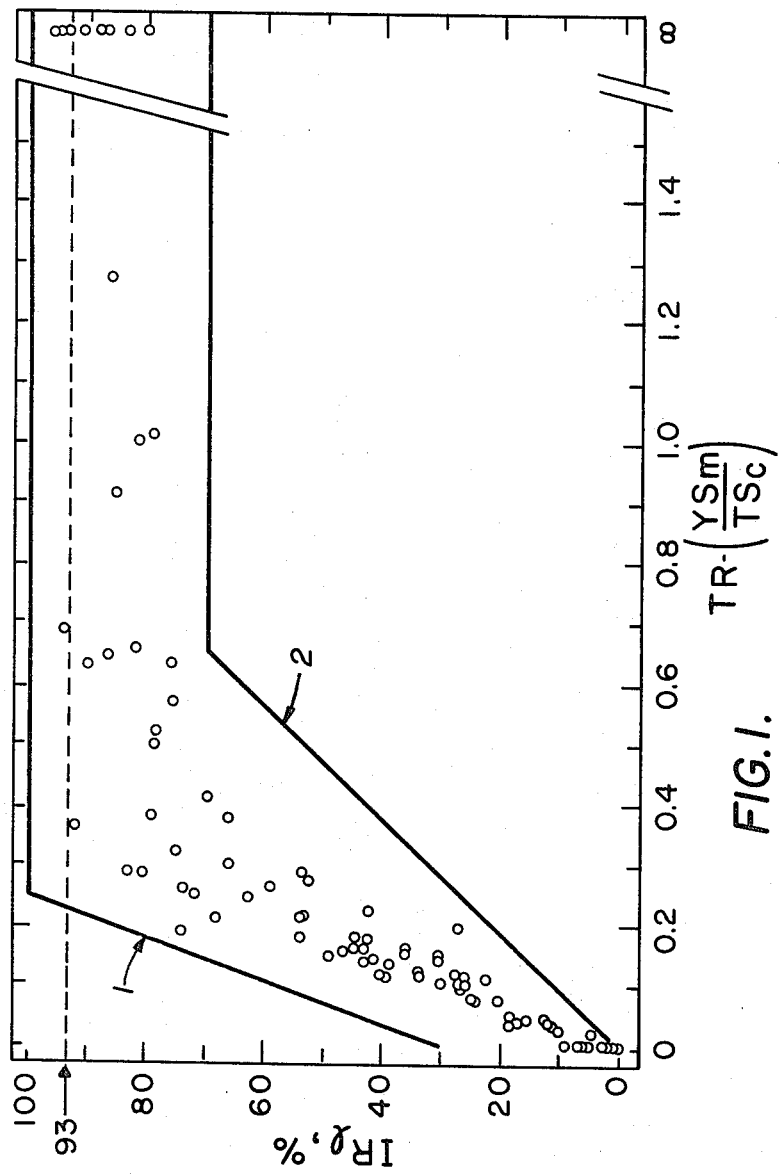
FIG. 1 is a plot correlating inelastic ratio, $IR_l$, with $TR(YS_m/TS_c)$ for laminates both within and without the scope of the present invention.

The metal-thermoplastic-metal laminates of the present invention are constructed of a thermoplastic core layer and two metal layers, one metal layer laminated on each side of the thermoplastic core layer. The laminates are characterized by a combination of critical service properties—high heat distortion temperature, low coefficient of linear thermal expansion, low inelastic ratio (good elasticity in flexure), and lightness in weight—as well as certain other desirable properties, which make them excellent for use as construction panels.

The high heat distortion temperature of the laminates ($HDT_l$) within the scope of this invention is a unique property and must be greater than about 130° C. (266° F.) to survive various conditions encountered in use. It is particularly important in applications requiring good dimensional stability under engineering loads and wherein the laminates may be subjected to elevated temperature conditions. For example, when the laminates are employed as construction panels for automotive applications, they are subjected to elevated temperature conditions extant in paint-curing ovens—at least about 135° C. (275° F.). In such an instance, a $HDT_l$ of at least about 135° C. is necessary with about 163° C. (325° F.) being preferred in order to provide adequate dimensional stability at even higher temperatures extant in many paint-curing ovens. It will be apparent of course that the laminates must be able to withstand exposure to such elevated temperature conditions extant in paint-curing ovens without buckling, warping, flattening out (if already formed into a shaped structure), and the like.

Heat distortion temperature, also known as deflection temperature under flexural load, is measured according to a specific modification of ASTM D 648-72 test method for plastics. In this modification, the sheet specimen width, b, is about 2.22 cm (0.875 inch), the length is about 7.62 cm (3 inches), the span between the supports is 5.08 cm (2 inches), and the maximum stress in the specimen is $1.82 \times 10^6$ N/m² (264 psi).

Surprisingly and unexpectedly, the heat distortion temperature of the laminates ($HDT_l$) within the scope of the present invention optimally can approach essentially that of the crystalline melting point of the thermoplastic core material ($T_{mc}$). As a result, the heat distortion temperature of the laminates may exceed that of the thermoplastic core material by several hundred degrees. For example, a laminate (EXAMPLE 3) comprising two 0.0127 cm (0.005 inch, 5 mils) thick 1100-0 aluminum layers and a 0.295 cm (0.116 inch, 116 mils) thick nylon 6,6 core layer interposed therebetween and laminated thereto had a heat distortion temperature of 228° C. (442° F.) compared to only 77° C. (171° F.) for the nylon 6,6 layer alone. Excellent dimensional stability under engineering stresses at elevated temperature is, therefore, a prime characteristic of the laminate, particularly when compared with the thermoplastic core materials alone.

The crystalline melting points of thermoplastics ($T_{mc}$) is determined by differential scanning calorimetry (DSC) using a heating rate of 10° C. per minute. The values for crystalline melting point are taken as either the temperature at which the apparent melting rate was maximum, or the temperature at which essentially the last traces of melting are detected, the latter being preferred in instances where the difference between the two is substantial, for example, greater than 10° C.

The marked increase in heat distortion temperature shown by the metal-thermoplastic-metal laminates over that of the thermoplastic core layer alone clearly illustrates the advantages of the present invention. Comparison of the heat distortion temperatures shown by laminates within the scope of the present invention with those shown by similar laminates having an amorphous thermoplastic core layer demonstrates that such laminates (those having an amorphous thermoplastic core layer) fail to show the same or similar marked increase shown by laminates of the present invention. For example, a laminate (EXAMPLE 69) comprising two 0.0127 cm (0.005 inch, 5 mils) thick 1100-0 aluminum layers and a 0.208 cm (0.082 inch, 82 mils) thick PARN 56/44 (nylon 56% 6, terephthalic acid-co-44% 6, isophthalic acid) layer having a degree of crystallinity of 35% (that is, partly crystalline) interposed therebetween and laminated thereto had a heat distortion temperature of 207° C. (405° F.) compared to only 117° C. (243° F.) for the PARN 56/44 alone, an increase of 90° C. (162° F.). On the other hand, a similar laminate (EXAMPLE 70) comprising two 0.0127 cm (0.005 inch, 5 mils) thick 1100-0 aluminum layers and 0.178 cm (0.070 inch, 70 mils) thick amorphous PARN 56/44 as the thermoplastic core layer had a heat distortion temperature of only 122° C. (252° F.) as compared to 117° C. (243° F.) for the PARN 56/44 alone, an increase of only 5° C. (9° F.).

Low coefficient of linear thermal expansion in the plane of the laminate ($CLTE_l$) [less than about $63 \times 10^{-6}$ cm/cm/°C. (°C.$^{-1}$)($35 \times 10^{-6}$°F.)] is another critical property of the metal-thermoplastic-metal laminates of the present invention because in the construction applications contemplated, changes in part sizes due to temperature variations must be minimal in order to lessen the possibility of unsightly bulges and gaps between metal and concrete components and parts made with the laminates of this invention. The coefficient of linear thermal expansion is measured according to ASTM D696-70 test method for plastics. It can also be determined by measuring the distance between two finely scribed parallel lines on the surface of the specimen with a calibrated traveling microscope or cathetometer. The specimen is contained in a rectangular hole in a heavy copper block which can be thermostatically controlled at various, widely separated temperatures. The rectangular hole in the copper block is only slightly larger than the cross-section of the specimen, and the scribed lines on the surface of the specimens are visible through a narrow slit machined into the copper block.

While certain plastic materials are light weight and have high energy absorption capability (high impact strength), making them desirable for use as construction panels, they suffer from the disadvantage that their coefficients of linear thermal expansion are 4 to 5 and even 10 times that of most metallic and vitreous construction materials, for example, aluminum, steel, and concrete. Their use for construction panels on metal or concrete structural frames often are precluded by the high differential thermal expansivity which leads to problems of fastening, and, in addition, by the unsightly gaps which would result between panels at low temperatures and/or the buckling of panels at high temperatures.

The normal procedure for lowering the coefficient of linear thermal expansion of plastics is to incorporate glass fibers. Usually, 30 to 40 weight percent of glass is sufficient to reduce the coefficient of linear thermal expansion of a plastic to about that of aluminum (about $23.4 \times 10^{-6}$°C.$^{-1}$). This, however, usually results in a strong but brittle material having very low elongation to break. That is, the composite cracks at very low impact regardless of whether the plastic per se is a strong but brittle resin, such as a thermoset polyester, or a tough polymer with high extensibility with high elongation to break, such as nylon 6,6. It will be noted, however, that the decreased multiaxial impact resistance of glass-filled plastics does not preclude the use of glass fibers in the thermoplastic core layer materials of the present invention in that lamination of suitable metal layers thereon as described hereinbelow tends to offset (at least in part) the undesirable properties of the glass-filled thermoplastics.

Metals, of course, do not suffer the disadvantage of high coefficients of linear thermal expansion as do plastics. However, they generally are not lightweight, particularly at thicknesses sufficient for use as construction panels. Also, their elastic recovery from bending and denting generally is very poor.

Thus, the metal-thermoplastic-metal laminates of the present invention provide the best of both worlds. That is to say, they are not only lightweight, but in addition, are characterized by a combination of high heat distortion temperatures, low inelastic ratios (good flexural elasticities), and low coefficients of linear thermal expansion. The coefficient of linear thermal expansion must be less than about $63 \times 10^{-6}$°C.$^{-1}$. However, in certain applications requiring low thermal expansivity such as in the case of an automobile panel, the $CLTE_l$ preferably is less than about $54 \times 10^{-6}$°C.$^{-1}$ and more preferably less than $45 \times 10^{-6}$°C.$^{-1}$. The low $CLTE_l$ values obtainable by the laminates of this invention (less than $63 \times 10^{-6}$°C.$^{-1}$), although somewhat greater than those of steel (about $15.3 \times 10^{-6}$°C.$^{-1}$) and aluminum (about $23.4 \times 10^{-6}$°C.$^{-1}$), are sufficiently low for demanding construction applications.

An example of the low coefficient of linear thermal expansion exhibited by laminates of the present invention is as follows. A laminate (EXAMPLE 5) comprised of two 0.0127 cm (0.005 inch, 5 mils) thick 1100-0 aluminum layers laminated on either side of a 0.180 cm (0.071 inch, 71 mils) thick nylon 6,6 layer had a coefficient of linear thermal expansion of $29.0 \times 10^{-6}$°C.$^{-1}$ compared to $23.6 \times 10^{-6}$°C.$^{-1}$ for the aluminum alone and the relatively high value of $110.2 \times 10^{-6}$°C.$^{-1}$ for the nylon 6,6 alone.

Low inelastic ratio ($IR_l$) (good flexural elasticity) (less than about 93%) is a critical property of the metal-thermoplastic-metal laminates. The inelastic ratio characterizes the elastic recovery of such laminate panels after being subjected to deflection sufficient to produce a substantial strain (for example, 5%) in the outer metal layers at the point of maximum deflection. It is measured according to a specific modification of ASTM D 790-71. The method may be described as follows:

A sheet specimen with rectangular cross section of width b=1.27 cm (0.5 inch), a thickness or depth d in cm (inches), and a length l=(L+ε), where L is the span of the flexural test in cm (inches) and ε>1.27 cm (0.5 inch), is set horizontally into a three-point flexural test fixture (i.e., with the 1.27 cm (0.5 inch) width horizontal and the depth d vertical) and deflected vertically at a crosshead deflection rate D of 0.0212 cm/s (0.5 inch/minute) to a deflection $D_o$ in cm (inches) such that the strain r in the central portion of the outer skin of the specimen is, except where noted otherwise, 5%, as computed in percent by the formula $r = 600dD_o/L^2$. The span L used is approximately 16 times the depth d, except for thicknesses or depths d<0.172 cm (0.065 inches), whereupon the span used is 2.54 cm (1.00 inch). After bending the specimen to the specified deflection $D_o$, the flexural loading is immediately removed at a crosshead deflection rate of 0.846 cm/s (20 inches/minute). Then the specimen is immediately removed from the flexural test fixture, set on its edge on a flat surface and allowed to freely relax. Periodically, the specimen is placed in a fixture with the same span and configuration used in bending it, and its residual deflection $D_4$ measured with a dial gauge. When the residual deflection $D_r$ has reached its limiting, equilibrium value, $D_r = D_R$, the inelastic ratio is computed according to the formula $IR = 100 (D_R/D_o)$, in percent. The limiting, equilibrium value $D_R$ is attained usually within a period of one to two days, but always within one week.

As noted hereinabove, the inelastic ratio ($IR_l$) is a critical and important characterization of the elastic recovery of laminate panels after they have been deflected sufficiently to produce substantial strain in their outer surfaces. If $IR_l$ is too high (low elasticity), both the degree of recovery of the laminates to their original shape after being strained substantially and the ability of the laminates to recover totally their original shape after being deflected in use to some lesser degree of strain will be inadequate under demanding use conditions. And, since one of the principal objects of the present invention is the provision of a metal-thermoplastic-metal laminate having an improved combination of service properties considered important for demanding construction applications, an important limitation of the present invention is the upper limit on $IR_l$.

In general, materials having an inelastic ratio greater than 93% are too inelastic and/or too weak to be employed as construction panels under conditions demanding or requiring any elasticity (or more specifically, elastic recovery) at all. The upper limit for the inelastic ratio of the laminates within the scope of the present invention as noted hereinabove, is therefore about 93%. Moreover, laminates having inelastic ratios in the following ranges, determined at 5% strain in the outer metal layers at the point of maximum deflection as described hereinabove, are rated as follows:

| INELASTIC RATIOS, $IR_l$ | RATING |
|---|---|
| >93% | very poor |
| 84-93% | marginal |
| 75-84% | fair |
| 30-75% | good |
| <30% | excellent |

Since both the degree of recovery of the laminate to its original shape after being strained substantially and the tendency of the laminate to totally recover without experiencing any permanent dents and creases after being strained to some smaller degree increase as the inelastic ratio decreases, the lower the inelastic ratio becomes the more desirable the laminate becomes for demanding construction applications. Thus, laminates having inelastic ratios within the good and excellent ranges (<75%) are preferred.

It will be recognized, of course, that while IR as employed herein is determined (except where noted otherwise) at a strain r of 5%, other strain values, either lower or higher, can be employed. However, IR values determined at strain values other than 5% generally will differ from those determined at 5%. For example, an IR value determined at a strain less than 5% (such as 1.5%) will in general be lower than that determined at 5%. Conversely, an IR value determined at a strain greater than 5% (such as 8%) generally will be higher than that determined at 5%.

It will be noted that the inelastic ratio for the laminates within the scope of the present invention, surprisingly, is always lower than that for the metal layer materials alone which have an inelastic ratio ($IR_m$) upper limit of about 95% (for very soft 1145-0 aluminum). As an example, a laminate (EXAMPLE 5) comprised of two 0.0127 cm (0.005 inch, 5 mils) thick 1100-0 aluminum layers and a 0.180 cm (0.071 inch, 71 mils) thick layer of nylon 6,6 interposed therebetween and having good adhesion thereto had an inelastic ratio of only 27% compared to the very high inelastic ratio of 94% obtained for sheets of 1100-0 aluminum alone. Good elasticity (low $IR_l$), and consequently good dent recovery, is therefore a prime characteristic of the laminates of the present invention, particularly when compared to a conventional construction sheeting or panels made of metal alone.

Lightness in weight of the laminate of the present invention is of particular interest because it results in a substantial weight savings in the total weight of a constructed object. For example, if the constructed object is an automobile, the weight savings should result in an increase in fuel economy for the particular automobile. It will be recognized, of course, that the total weight savings realized will depend upon the materials comprising the laminate, the total amount of the laminate employed, and the materials for which the laminate is being substituted. It will be apparent that when steel is employed as the laminate's metal layers, weight saving over steel itself [for example, 0.0813 cm (0.032 in., 32 mils) thick steel—the most common type and thickness of automotive body panel material] will not be as great as when comparably dimensioned laminates having aluminum metal layers are employed. The weight reduction for laminates having steel layers is nevertheless substantial. For example, when a laminate (EXAMPLE 25) is prepared from two 0.00254 cm (0.001 inch, 1 mil) thick steel layers and 0.182 cm (0.0715 inch, 71.5 mils) nylon 6,6, its weight per unit area is only 38.5% (2.44 kg/m², 0.500 lb./ft.²) of the 6.34 kg/m² (1.3 lb./ft.² weight of a 0.0813 cm (0.032 in.) thick steel sheet.

For certain construction applications demanding very high strength and stiffness such as in portions of some automotive vehicle bodies and in some building surfaces, steel sheeting weighing as much as about 9.76 kg/m² (2 lb./ft.²) is used. Thus, the maximum weight of the laminates within the scope of the present invention, is about 9.76 kg/m², with values substantially below this weight being preferred. Values less than 6.34 N/m² (1.3 lb./ft.²), however, are most preferred, particularly for automobile applications.

While each of the critical properties—high heat distortion temperature [greater than about 130° C. (266° F.), low coefficient of linear thermal expansion (less than about $63 \times 10^{-6} °C.^{-1}$), low inelastic ratio (less than about 93%), and lightness in weight (no more than about 9.76 kg/m²)—is highly desirable, either taken alone is not sufficient. They must exist in combination. That is to say, in order to be broadly suitable for a wide variety and range of high performance construction applications, the metal-thermoplastic-metal laminates must have in combination a heat distortion temperature ($HDT_l$) greater than about 130° C. (266° F.), a coefficient of linear thermal expansion ($CLTE_l$) less than about $63 \times 10^{-6} °C.^{-1}$, an inelastic ratio ($IR_l$) less than about 93%, and a maximum weight of no more than about 9.76 kg/m².

2. Correlation of Critical Service Properties and Thickness Ratio

The critical and important service properties of the laminates of this invention—$IR_l$, $CLTE_l$, and $HDT_l$—are related to the ratio of the thicknesses of the component layers of the laminates via the product of the thickness ratio of the sum of the metal layer-thicknesses to the thermoplastic core layer thickness times the ratio of the strengths of the component layers of the laminate, or in mathematical symbols, via the following dimensionless parameter:

$$TR(YS_m/TS_c)$$

wherein

TR is the thickness ratio of the sum of the metal layer-thicknesses to the thermoplastic core thickness;

$YS_m$ is the thickness-weight-average tensile yield strength of the two metal layers—that is, the sum of the products of the thickness of each metal layer times its tensile yield strength at an offset of 5% elongation divided by the sum of the metal layers thicknesses, or in mathematical symbols, $$(t_i y s_i + t_{ii} y s_{ii})/T_m$$

wherein $t_i$, $t_{ii}$, $ys_i$, and $ys_{ii}$ are as defined hereinbelow; and $T_m$ is the sum of the metal layers thicknesses or $(t_i + t_{ii})$; and $TS_c$ is the tensile strength of the thermoplastic core material.

The tensile yield strength at an offset of 5% elongation for the metal layers (ys) is determined substantially in accordance with ASTM D638-72, entitled, "Standard Method of Test for Tensile Properties of Plastics". Type I specimens are employed and the speed of testing is 5.0 mm per minute. The metal test specimens herein were preconditioned at 23° C. at 50% relatively humidity for at least 18 hours and testing was conducted at 23° C. and 50% relative humidity. The value for ys is that of the metal after being subjected to the thermal conditions of lamination. In many cases this value for ys will not be substantially different from that of the metal before lamination since for many metals no significant change in ys occurs under typical lamination thermal conditions. In those cases where the value for ys must be determined on the metal after having been subjected to the thermal conditions of lamination, the metal could be separated from the core of the laminate for such a determination; for example, the thermoplastic core could be dissolved and the metal layers isolated for such a determination.

It is recognized that some metal layers may experience break before a strain of 5% offset. For such metals the maximum tensile strength for the material is to be used as the value for ys.

The tensile strength of the thermoplastic core material ($TS_c$) is also determined substantially in accordance with ASTM D638-72. Type I test specimens are employed and the speed of testing is 5.0 mm per minute. Specimens were pre-conditioned at 23° C. for at least 18 hours. All nonlaminated polyamide specimens were kept dry, as molded in sealed cans with anhydrous magnesium perchlorate or anhydrous calcium sulfate desiccants during the preconditioning period and all other specimens were pre-conditioned at 50% relative humidity. The tensile strength of the thermoplastic materials is taken as the tensile stress at yield or in the absence of a yield point, the tensile stress at fail (break). The value of $TS_c$ is of the core after subjection to lamination thermal conditions, which in general will be the same as the thermoplastic material before lamination. In instances where the thermoplastic is such that significant changes in $TS_c$ would likely occur during lamination, the value of $TS_c$ can be determined, for example by subjecting a representative sample of the thermoplastic material alone to the lamination thermal conditions and taking a measurement on the resultant material.

The thickness ratio (TR) is described by the region of numerical overlap of the parameter $TR(YS_m/TS_c)$ as determined from the areas defined by the relationships of $TR(YS_m/TS_c)$ to $IR_l$ (FIG. 1), $CLTE_l$ (FIG. 2), and $(HDT_l - HDT_c)/(T_{mc} - HDT_c)$ (FIG. 3). The lower boundary of such areas is defined by the equation for a straight line $$y = mx + b$$

in which y is the y-axis (vertical-axis) parameters of $IR_l$, $CLTE_l$, and $(HDT_l - HDT_c)/(T_{mc} - HDT_c)$, x is the x-axis (horizontal-axis) parameter of $TR(YS_m/TS_c)$, m is the slope of the straight line, and b is the intercept on the y-axis.

When y is $IR_l$, m is 108 and b is zero (0) for values of x from zero (0) to 0.65, and m is zero (0) and b is 70 for values of x greater than 0.65.

When y is $CLTE_l$, m is $-3.6 \times 10^{-4}$ and b is $45 \times 10^{-6}$ for values of x from zero (0) to 0.1, and m is zero (0) and b is $9 \times 10^{-6}$ for values of x greater than 0.1.

When y is $(HDT_l - HDT_c)/(T_{mc} - HDT_c)$, m is 1 and b is zero (0) for values of x from zero (0) to 0.05, m is 10 and b is $-0.45$ for values of x from 0.05 to 0.12, and m is zero (0) and b is 0.75 for values of x greater than 0.12.

The upper boundary of the areas defined by the relationships of $TR(YS_m/TS_c)$ to $IR_l$ (FIG. 1), $CLTE_l$ (FIG. 2), and $(HDT_l-HDT_c)/(T_{mc}-HDT_c)$ (FIG. 3) is also defined by the equation for a straight line defined hereinabove for the lower boundary of such areas. When y is $IR_l$, m is 280 and b is 30 for values of x from zero (0) to 0.25, and m is zero (0) and b is 100 for values of x greater than 0.25.

When y is $CLTE_l$, m is $-2.88 \times 10^{-3}$ and b is $216 \times 10^{-6}$ for values of x from zero (0) to 0.05, m is $-1.29 \times 10^{-4}$ and b is $78.5 \times 10^{-6}$ for values of x from 0.05 to 0.26, and m is zero (0) and b is $45 \times 10^{-6}$ for values of x greater than 0.26.

When y is $(HDT_l-HDT_c)/(T_{mc}-HDT_c)$, m is 112.5 and b is zero (0) for values of x from zero and (0) to 0.004, m is 15.3 and b is 0.389 for values of x from 0.004 to 0.04, and m is zero (0) and b is 1 for values of x greater than 0.04.

Referring to FIG. 1, it is readily seen that all of the data falls within a band defined at its outer limits by curves 1 and 2, which are, respectively, the upper and lower boundaries of the area defined by the relationship of $TR(YS_m/TS_c)$ to $IR_l$. Thus, where it is desirable to have a laminate possessing a specified inelastic ratio, $IR_l$ (less than the maximum value of 93% noted hereinabove), the thickness ratio of the laminate is readily determined by drawing a horizontal line from the desired $IR_l$ value to the point of intersection at curve 1 (and curve 2, where possible), which value(s) can be read from the $TR(YS_m/TS_c)$ axis. The point of intersection at curve 1 (at $IR_l$ greater than about 30%) will establish a minimum value for the dimensionless parameter. TR itself can then be readily determined by substituting easily determined and/or known values of $YS_m$ and $TS_c$ for chosen metal and thermoplastic core layers in the dimensionless parameter.

If the same horizontal line drawn to intersect curve 1 also intersects curve 2, then an upper limit for $TR(YS_m/TS_c)$ as well as TR alone can also be determined in the same manner as described for the lower limits. In such an instance, a range of values for $TR(YS_m/TS_c)$ and hence TR will be established. On the other hand, where the horizontal line drawn to intersect curve 1 does not also intersect curve 2, then, consistent with the thickness and weight limitations discussed hereinabove, there is no upper limit for $TR(YS_m/TS_c)$.

Figure 2:
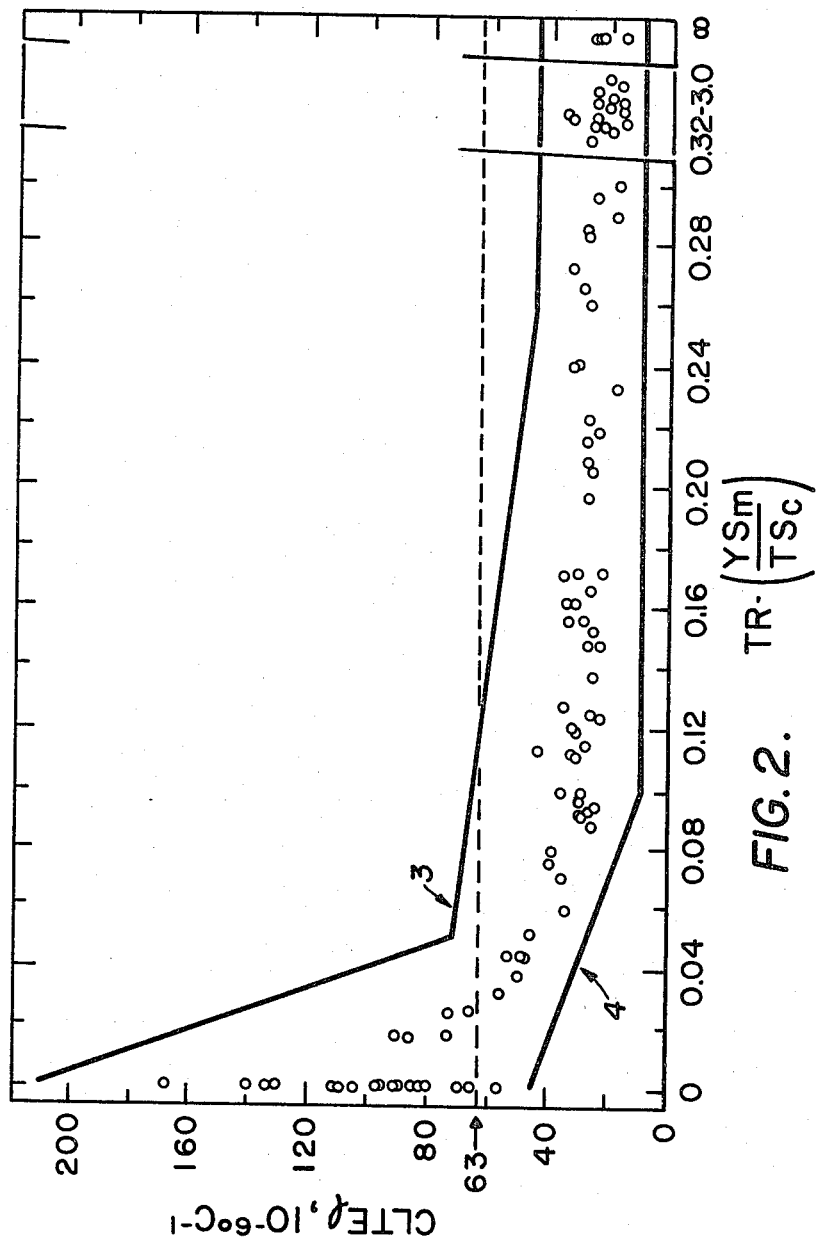
FIG. 2 is a plot correlating coefficient of linear thermal expansion $CLTE_l$ with $TR(YS_m/TS_c)$ laminates both within and without the scope of the present invention.

Referring to FIG. 2, it is readily seen that all of the data also falls within a band defined at its outer limits by curves 3 and 4, the upper and lower boundaries, respectively, of the area defined by the relationship of $TR(YS_m/TS_c)$ to $CLTE_l$. In a manner similar to that described for FIG. 1, once a desired $CLTE_l$ (less than $63 \times 10^{-6} °C.^{-1}$) is specified, the value (or values) for $TR(YS_m/TS_c)$ and hence TR itself can be readily determined.

Referring to FIG. 3, again it is readily seen that all of the data falls within a band defined at its outer limits by curves 5 and 6, which are the upper and lower boundaries, respectively, of the area defined by the relationship of $TR(YS_m/TS_c)$ to $(HDT_l-HDT_c)/(T_{mc}-HDT_c)$. Once a desired value for HDT [greater than the minimum value of about 130° C. (266° F.)] is specified, known values of $HDT_c$ and $T_{mc}$ for chosen thermoplastics can be substituted in the normalized HDT variable, $$(HDT_l-HDT_c)/(T_{mc}-HDT_c)$$

to obtain a value between zero (0.0) and 1.0. Once that value is determined, the $TR(YS_m/TS_c)$ value (or values) can be determined as described for FIGS. 1 and 2 by drawing a horizontal line from the desired $(HDT_l-HDT_c)/(T_{mc}-HDT_c)$ value to the point of intersection at curve 5 (and curve 6, where possible).

Thus the optimum and preferred TR range for any given laminate having a specified balance of $IR_l$, $CLTE_l$, and $HDT_l$ can be readily ascertained by correlating the $TR(YS_m/TS_c)$ values obtained from FIGS. 1, 2 and 3 and determining the region of numerical overlap of such values. In general, since the combination of low $IR_l$, low $CLTE_l$, and high $HDT_l$ is preferred, a $TR(YS_m/TS_c)$ within the range between about 0.08 and 0.6 is preferred, although as indicated by FIGS. 1, 2 and 3, other values are also suitable.

It will be noted, however, that regardless of the TR value, the minimum thickness of each metal layer must be at least about 0.00127 cm (0.0005 inch (0.5 mils) and the maximum weight of the laminate must be no more than about 9.7 kg/m² (2 lb./ft.²). Moreover, as a practical matter, TR must be greater than zero (0) (thermoplastic alone) and less than absolute infinity (metal alone) in that the metal-thermoplastic-metal laminates within the scope of the present invention cannot be comprised of either metal or thermoplastic alone.

Once TR is determined, if a thickness is chosen for either the metal layers or the thermoplastic core layer, the thickness for the remaining component layer is readily determined. It will be noted, however, that in the specific instance wherein the metal layers have different compositions (that is, $ys_i$ and $ys_{ii}$, as defined hereinbelow, are not equal, the relative thicknesses of the metal layers must be specified in order to determine the value of $YS_m$ which in turn is required in order to calculate TR from the $TR(YS_m/TS_c)$ relationship as illustrated hereinbelow. Of course, once TR is determined and since $T_m$ (from $t_i + t_{ii}$ where $t_i$ and $t_{ii}$ are the thicknesses of the respective metal layers arbitrarily labeled as "i" and "ii") is known, the required thermoplastic core layer thickness is readily determined.

The manner by which FIGS. 1, 2 and 3 described hereinabove are employed to establish values for $TR(YS_m/TS_c)$ and hence TR alone is to choose values for the properties—$IR_l$, $CLTE_l$, and $HDT_l$—commensurate with the intended end use. For example, if the end-use application would require an $IR_l$ of 33%, then a value for $TR(YS_m/TS_c)$ renging from about 0.010 to about 0.31 would be indicated by FIG. 1. If the end-use application would also require a $CLTE_l$ of $24.3 \times 10^{-6} °C.^{-1}$, then a $TR(YS_m/TS_c)$ value ranging from about 0.057 to approximately infinity (or simply a value of at least about 0.057 would be indicated by FIG. 2. And, if a $HDT_l$ of 218° C. would be required for the contemplated end use, choosing nylon 6 ($HDT_c = 65°$ C.; $T_{mc} = 220°$ C.) as the thermoplastic core layer for illustrative purposes, the normalized variable $$(HDT_l-HDT_c)/(T_{mc}-HDT_c)$$

can be readily solved [(218° C. $-65°$ C.)/(220° C. $-65°$ C.)] to give a value of 0.99. This normalized HDT variable value would require, according to FIG. 3, a $TR(YS_m/TS_c)$ value ranging from about 0.039 to approximately infinity (or again, simply a value of at least about 0.039).

The optimum $TR(YS_m/TS_c)$ values for a laminate having an $IR_l$ of 33%, a $CLTE_l$ of $24.3 \times 10^{-6} °C.^{-1}$, a $HDT_l$ of 218° C., and nylon 6 as the thermoplastic core layer would be the region of numerical overlap, namely, between 0.057 and 0.31.

The optimum values for TR itself can be readily determined once the metal layers—for example, aluminum and more particularly the specific composition (type) and thickness of aluminum—are specified. Since $$TR(YS_m/TS_c) = 0.057 \text{ to } 0.31$$

then $$TR = 0.057(TS_c/YS_m) \text{ to } 0.31(TS_c/YS_m)$$

If, for illustrative purposes, 1100-0 aluminum [$t_i$=$t_{ii}$=0.0127 cm(0.000127 m, 0.005 inch 5 mils)]; $ys_i$=$ys_{ii}$=58.25×10$^6$ N/m$^2$ (8.45×10$^3$ lb./in.$^2$) at an offset of 5% elongation; $YS_m$=$(t_i ys_i + t_{ii} ys_{ii})/T_m$=[(0.000127 m×58.25×10$^6$ N/m$^2$)+(0.000127 m×58.25×10$^6$ N/m$^2$)]/0.000254=58.25×10$^6$ N/m$^2$ is chosen as the metal layers and nylon 6 [$TS_c$=75.14×10$^6$ N/m$^2$ (10.9×10$^3$ lb./in.$^2$)] as noted hereinabove, is chosen as the thermoplastic core layer, then $$TR = 0.057 \left( \frac{75.14 \times 10^6 \, N/m^2}{58.25 \times 10^6 \, N/m^2} \right) = 0.057 \times 1.29 = 0.074$$

and $$TR = 0.31 \left( \frac{75.14 \times 10^6 \, N/m^2}{58.25 \times 10^6 \, N/m^2} \right) = 0.31 \times 1.29 = 0.40$$

Thus TR should range between about 0.074 and 0.40 for the above-specified balance of $IR_l$, $CLTE_l$, and $HDT_l$ values for a laminate comprised of equally thick sheets of 1100-0 aluminum as the metal layers and nylon 6 as the thermoplastic core layer. An experimental laminate possessing the above-specified combination of properties with TR having the value of 0.151 is described in EXAMPLE 67.

In similar manner, if an end-use application for a laminate comprised of equally thick sheets of 1100-0 aluminum ($YS_m$=58.25×10$^6$ N/m$^2$) as the metal layers and poly(ethylene terephthalate) ($HDT_c$=89° C.; $T_{mc}$=252° C.; $TS_c$=77.21×10$^6$ N/m$^2$) as the thermoplastic core layer would require an $IR_l$ of 30.1%, a $CLTE_l$ of 29.5×10$^{-6}$°C.$^{-1}$ and $HDT_l$ of 240° C., the region of overlap for TR($YS_m/TS_c$) values as determined from FIGS. 1, 2 and 3 would indicate an optimum range between about 0.042 and 0.285, and hence a TR range between about 0.056 and 0.38. An experimental example of such a laminate with a TR value of 0.165 is EXAMPLE 71.

It will be noted that since the laminates of this invention have two metal layers, one on each side of the thermoplastic core layer, the metal layers can have either the same or different compositions as long as the combination of critical service properties are met. Metal layers having different thicknesses also may be employed so long as such thicknesses come within the limits established by the metal layers' minimum thickness requirement and the maximum weight requirement of the resultant laminate, and the combination of critical and important service properties are met. When metal layers having different compositions and/or thicknesses are employed, it is preferred that certain important characteristics of the metal layers be substantially balanced in order to avoid problems such as warping, buckling, and the like when such laminates are exposed to variations in temperature. The important characteristics of the metal layers should be balanced unsofar as practicable such that:

(a) $CLTE_i$=$CLTE_{ii}$;
(b) $t_i E_i$=$t_{ii} E_{ii}$; and
(c) $t_i ys_i$=$t_{ii} ys_{ii}$;

wherein $CLTE_i$ and $CLTE_{ii}$, $t_i$ and $t_{ii}$, $E_i$ and $E_{ii}$, and $ys_i$ and $ys_{ii}$ are, respectively, the coefficients of linear thermal expansion, thicknesses, elastic moduli, and tensile yield strengths of the respective metal layers arbitrarily labeled as "i" and "ii". However, as a practical matter, generally it is preferred that both metal layers be of the same composition and thickness.

As an example wherein metal layers having different compositions (and different thicknesses) are employed—0.00508 cm (0.0000508 m, 0.002 inch, 2 mils) thick 304 stainless steel—annealed and 0.0152 cm (0.000152 m, 0.006 inch, 6 mils) 0.0152 centimeter) thick 6061-0 aluminum, arbitrarily labeled as $t_i$ and $t_{ii}$, respectively, for example—and wherein, for illustrative purposes, nylon 6,6 is employed as the thermoplastic core layer, if the end use application would require an $IR_l$ of 45%, then a value for TR($YS_m/TS_c$) ranging from about 0.051 to about 0.42 would be indicated by FIG. 1. If the end use application would also require a $CLTE_l$ of 32.8×10$^{-6}$°C.$^{-1}$, then a TR($YS_m/TS_c$) value ranging from about 0.034 to approximately infinity (or simply a value of at least about 0.034) would be indicated by FIG. 2. And, if a $HDT_l$ of 250° C. (or higher) would be required for the contemplated end use, using nylon 6,6 ($HDT_c$=77° C.; $T_{mc}$=263° C.), as noted hereinabove, as the thermoplastic core layer, the normalized HDT variable can be readily solved [(250° C.−77° C.)/(263° C.−77° C.)] to give a value of 0.93. This normalized HDT variable value would require, according to FIG. 3, a value ranging from about 0.035 to approximately infinity (or again, simply a value of at least about 0.035).

The optimum values for TR($YS_m/TS_c$) for a laminate having an $IR_l$ of 45%, a $CLTE_l$ of 32.8×10$^{-6}$°C.$^{-1}$, and an $HDT_l$ of 250° C. (482° F.) would be between 0.051 and 0.42, the region of numerical overlap for FIGS. 1, 2 and 3.

The optimum values for TR itself can be readily determined since, as noted hereinabove, 304 stainless steel-annealed ($t_i$=0.0000508 m; $ys_i$=369.52×10$^6$ N/m$^2$ (53.6×10$^3$ lb./in.$^2$) at an offset of 5% elongation and 6061-0 aluminum ($t_{ii}$=0.000152 m; $ys_{ii}$=112.37×10$^6$ N/m$^2$ (16.3×10$^3$ lb./in.$^2$) at an offset of 5% elongation) are employed as the metal layers. Since $$TR(YS_m/TS_c) = 0.051 \text{ to } 0.42$$

then $$TR = 0.051 \, (TS_c/YS_m) \text{ to } 0.042 \, (TS_c/YS_m)$$

The strength values ($YS_m$ and $TS_c$) are as follows:

$$\begin{aligned}
YS_m &= (t_i ys_i + t_{ii} ys_{ii})/T_m \\
&= [(0.0000508 \times 369.52 \times 10^6) + (0.000152 \times 112.37 \times 10^6)]/0.0002028 \\
&= (18771.62 + 17080.24/0.0002028 = 35811.86/0.0002028 \\
&= 176.78 \times 10^6 \, N/m^2 \\
TS_c &= 83.42 \times 10^6 \, N/m^2
\end{aligned}$$

Therefore, $$TR = 0.051 \left( \frac{83.42 \times 10^6 \, N/m^2}{176.78 \times 10^6 \, N/m^2} \right) = 0.051 \times 0.47 = 0.024$$

and $$TR = 0.42 \left( \frac{83.42 \times 10^6 \, N/m^2}{176.78 \times 10^6 \, N/m^2} \right) = 0.42 \times 0.47 = 0.20$$

Thus, TR should range between about 0.024 and about 0.20 for the above-specified balance of $IR_l$, $CLTE_l$, and $HDT_l$ values for a laminate comprised of a 0.00508 cm thick sheet of 304 stainless steel-annealed and a 0.0152 cm thick sheet of 6061-0 aluminum as the metal layers and nylon 6,6 as the thermoplastic core layer. An experimental example of such a laminate having a TR value of 0.0768, with $IR_l$ measured with steel on the tension side and with $CLTE_l$ measured on the steel side is described in EXAMPLE 55.

It will be noted that if $IR_l$ and $CLTE_l$ were in turn measured from the aluminum side for the above-described laminate, $TR(YS_m/TS_c)$ and TR would vary slightly from the above-indicated values due to the lack of an absolute balance between $CLTE_i$ and $CLTE_{ii}$, $t_iE_i$ and $t_{ii}E_{ii}$, and $t_iys_i$ and $t_{ii}ys_{ii}$. For example, $IR_l$ as measured with the 6061-0 aluminum on the tension side had a value of 43% and $CLTE_l$ as measured from the aluminum side had a value of $35.5 \times 10^{-6}$°C.$^{-1}$. $HDT_l$, however, remained unchanged in this instance. These values would require a range of $TR(YS_m/TS_c)$ values between about 0.045 and about 0.405, as indicated by FIG. 1, a value of at least about 0.026 as indicated by FIG. 2, and a value of at least about 0.035 as indicated by FIG. 3, with the range between 0.045 and 0.405 (FIG. 1) defining the region of numerical overlap. The value for TR alone would therefore be between about 0.021 and about 0.19, which range correlates quite well with the TR value of 0.0768 for the laminate described in EXAMPLE 55.

3. Other Important Properties

In addition to the above critical construction application properties, most of the laminates within the scope of the present invention also have excellent flexural stiffness, high flexural modulus, excellent formability at elevated temperatures, very good ductility, and high energy absorption ability.

Excellent flexural stiffness and high effective flexural modulus (a measure of unit flexural stiffness) are highly desirable properties which the laminates preferably should possess. The desirability resides in the fact that the laminates must be sufficiently stiff so as to minimize the need for structural framing and/or to minimize flexural deflection of the laminate panels from wind, marine hydraulic, and other loads. The ability of the laminates to resist wind and hydraulic pressures is particularly significant when they are used, for example, as automotive vehicle body panels, boat body panels, and as outer panels in building construction.

Flexural stiffness m is measured according to a specific version of ASTM D 790-71. The specific version can be described as follows:

A sheet specimen with a rectangular cross-section of width $b = 1.27$ cm (0.5 inch), a thickness or depth d in cm (inches), and a length $l = (L + \epsilon)$, where L is the span of the flexural test in cm (inches) and $\epsilon > 1.27$ cm (0.5 inch), is set horizontally into a three-point flexural test fixture [i.e., with the 1.27 cm (0.5 inch) width horizontal and the depth d vertical] and deflected vertically at a cross-head rate D of 0.00212 cm/s (0.05 inch/minute). The applied load P in N (lb.) is recorded, as the deflection D in cm (inches) increases at the specified constant rate. For thicknesses or depths $d \leq 0.165$ cm (0.065 inches), the span L is 2.54 cm (1.00 inch). Otherwise, the span is approximately 16 times the thickness or depth of the sheet specimen. The effective flexural modulus $E_b$ in $N/m^2$ (psi) is computed from the formula $E_B = L^3 m_e/4bd^3$, where $m_e$ in N/m (lb./in.) is the experimental slope of the initial, linear portion of the load versus deflection curve. The flexural strength S in $N/m^2$ (psi) is computed from the formula $S = 3PL/2bd^2$; unless otherwise specified, this strength is computed as the stress at which the strain in outer skin of the central portion of the specimen is $r = 600dD/L^2 = 5\%$. The flexural stiffness m is computed as $m = 4bd^3 E_B/L^3$ for the specific case of $b = 2.54$ cm (1.00 inch) and $L = 2.54$ cm (1.00 inch).

A flexural stiffness of about $52.53 \times 10^3$ N/m (300 lb./in.) is the lowest value that can be utilized for sheeting or panels in construction and building applications, even where framing is maximized and requirements on flexural deflection of the panels is minimal. This flexural stiffness is characteristic of 0.0508 cm (0.020 inch, 20 mils) thick sheets of relatively weak and inelastic 5052-0 aluminum weighing 1.37 kg/$m^2$ (0.280 lb./ft.$^2$). This lowest useful flexural stiffness of about $52.53 \times 10^3$ N/m, as well as even higher values of at least about $131.85 \times 10^3$ N/m (753 lb./in.), is readily achieved with the laminates of the present invention. For example, as shown in the following table, a laminate (EXAMPLE 23) comprised of two 0.0127 cm (0.005 inch, 5 mils) thick layers of 5052-0 aluminum laminated on each side of a 0.0711 cm (0.028 inch, 28 mils) thick layer of nylon 6,6 had a flexural stiffness of $161.44 \times 10^3$ N/m (922 lb./in.) [an effective flexural modulus of $28.95 \times 10^9$ $N/m^2$ ($4.2 \times 10^6$ psi)] and a weight of 1.49 kg/$m^2$ (0.306 lb./ft.$^2$) compared to a stiffness of $38.00 \times 10^3$ N/m (217 lb./in.) for a 0.133 cm (0.0523 inch, 52.3 mils) thick sheet of nylon 6,6 alone weighing 1.51 kg/$m^2$ (0.310 lb./ft.$^2$). Thus, the laminate gives much higher stiffness than an aluminum sheet of only slightly less weight per unit area and even higher stiffness relative to that of a much thicker sheet of nylon 6,6 alone having equivalent weight per unit area.

| SHEETING[a] | FLEXURAL STIFFNESS[b] m, $10^3$ N/m | WEIGHT[c] W, kg/$m^2$ | EFFECTIVE FLEXURAL MODULUS $E_B$ $10^9$ $N/m^2$ | DENSITY D, kg/$m^2$-cm |
|---|---|---|---|---|
| 0.0508[0.0508, 5052-0 Al] | 52.53 | 1.37 | 64.11[d] | 26.88[e] |
| 0.0965[0.0127, 5052-0 Al/nylon 6,6/5052-0 Al] | 161.44 | 61.49 | 28.95 | — |
| 0.133[0/nylon 6,6/0] | 38.00 | 1.51 | 2.62[d] | 11.37 |
| 0.152[0.0152, 6061-T6 Al/nylon 6,6/6061-T6 Al] | 606.72 | 2.21 | 27.64 | — |

| SHEETING[a] | FLEXURAL STIFFNESS[b] m, $10^3$ N/m | WEIGHT[c] W, kg/m² | EFFECTIVE FLEXURAL MODULUS $E_B$, $10^9$ N/m² | DENSITY D, kg/m²-cm |
|---|---|---|---|---|
| 0.0813[0.0813, Autobody Steel] | 443.00 | 6.34 | 133.05[d] | 78.14[e] |
| 0.0813[0.0813, 6061-T6 Al] | 226.93 | 2.20 | 68.18 | 27.07[e] |
| 0.102[0.102, 6061-T6 Al] | 434.25 | 2.75 | 66.80[d] | 27.07[e] |
| 0.194[0/nylon 6,6/0] | 117.84 | 2.20 | 2.62[d] | 11.37 |

[a] Sheet thickness d (cm) [metal layers i and ii thickness (cm) metal layer i type/thermoplastic core layer type/metal layer ii type].
[b] Result computed from $E_B$ using $m = d^3 E_B$.
[c] Result computed from component thickness(es) and density(ies).
[d] Result obtained for same type of sheeting of different thickness, d.
[e] Taken from: Lynch, Handbook of Materials of Science, Vol. II, CRC Press, Cleveland, 1975.

As shown in the above table, a laminate (EXAMPLE 38) comprised of two 0.0152 cm (0.006 inch, 6 mils) thick 6061-T6 aluminum layers laminated to each side of a 0.122 cm (0.048 inch, 48 mils) thick nylon 6,6 layer had a flexural stiffness of 606.72×10³ N/m (3465 lb./in.) [an effective flexural modulus of 27.64×10⁹ N/m² (4.01×10⁶ psi)] and a weight of 2.21 kg/m² (0.453 lb./ft.²), compared to:
 (a) a flexural stiffness of 443.00×10³ N/m (2530 lb./in.) and a weight of 6.34 kg/m² (1.3 lb./ft.²) for 0.0813 cm (0.032 inch, 32 mils) thick automobile body steel;
 (b) a flexural stiffness of 226.93×10³ N/m (1296 lb./in.) and a weight of 2.20 kg/m² (0.451 lb./ft.²) for 0.0813 cm (0.032 inch, 32 mils) thick 6061-T6 aluminum alone;
 (c) a flexural stiffness of 434.25×10³ N/m (2480 lb./in.) and a weight of 2.75 kg/m² (0.564 lb./ft.²) for 0.102 cm (0.040 inch, 40 mils) thick 6061-T6 aluminum alone; and
 (d) a flexural stiffness of 117.84×10³ N/m (673 lb./in.) and a weight of 2.20 kg/m² (0.451 lb./ft.²) for 0.194 cm (0.0762 inch, 76.2 mils) thick sheet of nylon 6,6 alone.

Thus, the laminate is 37% stiffer in flexure and 65% lower in weight per unit area than the 0.0813 cm thick steel. The laminate is more than 2.5 times stiffer in flexure than the 6061-T6 aluminum alone at equivalent weight per unit area and 37% stiffer than the 6061-T6 aluminum alone having a weight per unit area more than 20% higher than that of the laminate. And the laminate is more than five times stiffer than nylon 6,6 alone having substantially the same weight per unit area.

It will be noted that in applications demanding relatively high flexural stiffness such as in automotive vehicle body panels and the like, a flexural stiffness of at least about 262.65×10³ N/m (1500 lb./in.) is preferred, with values of at least about 437.75×10³ N/m (2500 lb./in.) or higher being even more preferred.

Excellent formability is a necessary property for the laminates if they are to be formed into shaped structures subsequent to preparation; that is, subjected to post-forming operations. The excellent formability and very good ductility of the metal-thermoplastic-metal laminates prepared from ductile metal layers and a ductile thermoplastic core layer ensure that such laminates can be formed into a variety of shapes—from slightly curved to deep drawn—without failure or rupture.

The terms "ductile" and "ductility" as employed herein to describe the metal and thermoplastic core layer components and the laminates within the scope of the present invention refer to such materials having a tensile elongation at break or fail of at least 10% as measured by ASTM D 638-72 test method for plastics.

The forming (or, more accurately, post-forming) of the laminate can be readily accomplished by procedures known to those skilled in the art. Once such procedure suitable for use herein involves subjecting the laminate to forming pressures at elevated temperatures, that is, a temperature which is sufficiently high to soften the thermoplastic core layer and permit the forming operation to be carried out without concurrent delamination, weakening of the metal layers and/or the thermoplastic core layer, and the like. For most of the laminates of the present invention the forming operation at or near ambient temperatures is to be avoided since most of the laminates within the scope of the invention would not be expected to be cold formable at such temperatures. Herein laminates are not considered to be cold formable if at or near ambient temperature performance in a deep draw test is poor and/or the degree of bending sustainable is low and/or performance in the Olsen Cup Test is poor, such tests being further discussed hereinafter. Moreover, an additional advantage in carrying out the forming operation at elevated temperatures is that such temperatures would usually effectively destroy the ambient-temperature memory of the laminate, and thus its tendency to recover to its straightened and/or flattened configuration upon removal of the forming pressure. This loss of memory (or reset) is retained up to substantially the original forming temperatures and for many laminates even higher. As a result, at elevated temperatures laminates of the present invention prepared, for example, from ductile metal layers and a ductile thermoplastic core layer are formable into permanently shaped structures.

An important measure of the formability of the laminates within the scope of the present invention may be gained in a deep-drawing test, typical conditions for which are shown in the table below. In this test, a flat, circular sheet of laminate is forced into a female die by a male punch, to form a cup. A successful deep-draw with a high draw ratio (ratio of blank diameter to punch diameter) is desirable. Draw ratios comparable to those of drawing quality steel of equivalent stiffness are preferred. Values which are 50 percent lower than such steel are acceptable for many applications but values much lower than this would usually be considered poor. For example, as shown in the following table, a very good draw ratio between about 2.00 and about 2.31 is obtained with aluminum/nylon 6,6/aluminum or aluminum/polyester-polyether block copolymer-modified PET/aluminum laminates when the tests are conducted at temperatures between about 80° C. (176° F.) and 200° C. (392° F.). This ratio is comparable to the value of about 2.4 for drawing quality steel and, in many instances, better than the value of about 2.1 for drawing quality aluminum. Laminates which have a core of nylon 6,6 and metal layers of ductile low carbon steel have been found to perform well in the deep-draw test at ambient conditions.

It will be noted, however, that the draw ratios shown in the table below are not limiting values, and therefore even higher draw ratios for such laminates are contemplated.

| RUN | 1 | 2 | 3 | 4 | 5 |
|---|---|---|---|---|---|
| EXAMPLE | 5/82 | 5/82 | 5/82 | 42 | 58 |
| BLANK DIAMETER, cm | 7.19 | 7.62 | 7.26 | 6.86 | 6.65 |
| BLANK TEMPERATURE, °C. | 180 | 150 | 150 | 130 | 150 |
| DIE TEMPERATURE, °C. | 140 | 140 | 140 | 130 | 150 |
| BANK HOLDER PRESSURE, $10^3$ N/m² | 0 | 689.40/ 1378.80 | 689.40 | 689.40 | 1861.38 |
| BLANK HOLDER TEMPERATURE, °C. | 140 | 150 | 150 | 130 | 150 |
| PUNCH DIAMETER, cm | $3.3^a$ | $3.3^a$ | $3.3^a$ | $3.3^a$ | $3.3^b$ |
| PUNCH TEMPERATURE, °C. | 25 | 25 | 25 | 25 | 25 |
| LUBRICANT | Hydro-Carbon Grease | Hydro-Carbon Grease | Carbo-Wax 20M | Hydro-Carbon Grease | Hydro-Carbon Grease |
| DRAW SPEED, cm/s | 0.51 | 0.51 | 2.33 | 0.51 | 0.51 |
| DRAW RATIO | 2.18 | 2.31 | 2.20 | 2.08 | 2.02 |

$^a$Polished Punch.
$^b$Smooth Punch.

Another important measure of the formability of the laminates is the degree to which they can be bent without fracture. The degree of bending sustainable by most laminates of the present invention without fracture is extremely poor at ambient temperatures and would in many cases be unsuitable for any applications requiring simple bending around even fairly large radii. Bending would be in general considered poor if the laminate would not sustain a 90° bend around a radius two times the thickness of the laminate. At elevated temperatures many of the laminates can readily be bent, without fracture, around radii sufficiently small for many applications. It should be pointed out, however, that certain laminates within the present invention have been found to have good bending capability at ambient temperature, for example, laminates which had a nylon 6,6 core and ductile low carbon steel metal layers. It would be expected that other laminates within the present invention may also perform well in bending tests at ambient conditions.

Still another test of formability is a ball punch deflection test, such as the Olsen Cup Test, which involves only stretch (not draw) and wherein a sheet of laminate sample is securely clamped in a ring die and stretch-formed to failure (first appearance of a fracture) with a hemispherical punch. Test herein was under conditions as shown in the table below. One measure of performance is the forming ratio [ratio of punch penetration depth (deflection) to punch diameter], with a high ratio being desirable. Using the test described herein at low punch deflection rates (about 1.27 cm./min.) and ambient temperatures, very good forming ratios of between about 0.300 and about 0.400 have been obtained for laminates within the scope of the present invention, for example, laminates which had a nylon 6,6 core and ductile low carbon steel metal layers and other laminates as shown in the table below. These values are comparable to (and in many instances better than) the values obtained for aluminum and steel. Ratios even lower than 0.300, for example as low as 0.150, are acceptable for some applications but values much lower than this would be considered poor performance in this test.

| EXAMPLE | METAL TYPE | THICKNESS,$^a$ cm | THERMOPLASTIC TYPE | THICKNESS, cm | PUNCH$^f$ DIAMETER cm | DEFLECTION cm | FORMING RATIO |
|---|---|---|---|---|---|---|---|
| 12 | 5052-0 Aluminum | 0.00762 | Nylon 6,6 | 0.173 | 5.08 | $1.524^b$ | 0.300 |
| 14 | " | 0.0127 | " | 0.160 | 5.08 | 1.778 | 0.350 |
| 20 | " | 0.0127 | " | 0.168 | 5.08 | $1.727^c$ | 0.340 |
| 42 | 6061-0 Aluminum | 0.0152 | " | 0.160 | 5.08 | $1.981^c$ | 0.390 |
| — | Autobody Steel$^d$ | 0.0838 | — | — | 5.08 | $1.956^c$ | 0.385 |
| — | 6061-T4 Aluminum | 0.132 | — | — | 5.08 | $1.549^c$ | 0.305 |
| — | " | 0.0813 | — | — | 5.08 | $1.346^c$ | 0.265 |
| — | 6061-0 Aluminum | 0.0152 | — | — | 5.08 | $1.321^c$ | 0.260 |
| — | 5052-0 Aluminum | 0.0127 | — | — | 5.08 | $1.229^{c,e}$ | 0.242 |
| — | " | 0.00762 | — | — | 5.08 | $0.993^{c,e}$ | 0.195 |
| — | 1100-0 Aluminum | 0.0102 | — | — | 5.08 | $1.821^c$ | 0.358 |
| — | " | 0.0127 | — | — | 5.08 | $1.603^{c,e}$ | 0.316 |

$^a$Thickness for each metal layer.
$^b$Slight localized necking observed.
$^c$Sample deflected to fracture.
$^d$Sample taken from a 1977 Chevrolet Monte Carlo Hood.
$^e$Average of two runs.
$^f$Nose of punch was polished hard steel; testing was with no lubrication between punch and specimen.

Since successful deep-drawing and bending of most laminates within the scope of this invention requires the use of elevated temperatures, it is decidedly advantageous to carry out the forming operation at elevated temperatures for most of the laminates, particularly for most laminates which are to be subjected to elevated temperature conditions subsequent to being formed into the desired shape. And, as noted hereinabove, laminate temperatures between about 80° C. (176° F.) and about 200° C. (392° F.) generally are suitable for carrying out post-forming operations.

It will be apparent, of course, that the laminates within the scope of the present invention, when considered with respect to the combination of critical properties which they possess as well as excellent formability in most cases, indicated by the high-draw ratio, bending and stretching characteristics obtained in drawing, bending and stretching tests, provide clear advantages over known laminates and other construction panel materials for use as construction panels. When compared with metals per se, the combination of critical and important service properties—high heat distortion temperature, low coefficient of linear thermal expansion, low inelastic ratio, lightness in weight and excellent formability in most cases, —makes the laminates even more desirable for use as construction panels.

Very good ductility at ambient temperatures is exhibited by the laminates of the present invention when both the metal layers and the thermoplastic core layer are in ductile states. It will be recognized that while it is possible to use non-ductile forms of suitable metals in which higher flexural strength and higher effective flexural-modulus laminates are obtained, the formability discussed hereinabove is substantially reduced. However, where shaped structures are not required or desired, and substantially flat structures are suitable, non-ductile forms of suitable metals may be employed. One measure of the ductility of the laminates may be obtained via the aforementioned Olsen Cup Test. Other measures of ductility include tensile elongation which is measured according to ASTM D 638-72 test method for plastics, and multiaxial impact strength which is measured via the Gardner Impact Strength (GIS) Test.

In the Gardner Impact Strength Test, a sheet of test specimen at least 5.08 cm by 5.08 cm (2 inches by 2 inches) in area is placed on the flat horizontal surface of a heavy steel test anvil. The specimen is centered over a vertical cylindrical hole [3.18 cm (1.25 inch) inside diameter] in the test anvil. A light-weight polished steel punch with a 1.59 cm (0.625 inch) diameter hemispherical tip is placed on the top center of the specimen. A 1.82 kg (4 lb.) hammer is dropped from a selected height onto the punch, thereby subjecting the specimen to an impact energy in N-m (in.-lb.) determined by the product of the weight of the hammer and its initial height in cm (inches). Each laminate specimen is impacted only one time, and the formation of any crack on either side of the specimen is considered a failure for the particular impact. The test usually requires a fairly large number of test specimens (usually at least 12 to 16 for each test), and the maximum height at which more than half of the specimens pass without failure is used to calculate the GIS to within ±0.226 N-m (2 in.-lb.). From these measurements, it was determined that ductile laminates within the scope of the present invention having 20 to 30 percent less weight (mass)/m$^2$ than 0.0813 cm (0.032 inch) thick automobile body steel show no failure at impact energies up to at least 18.08 N-m (160 in.-lb.) and exhibit significantly smaller dents at these impacts than do the 0.0813 cm thick steel panels. Similar results are also obtained when compared with aluminum panels. Thus, the metal-thermoplastic-metal laminates also possess high energy absorption ability in that they are capable of absorbing high impact forces with little, if any, denting, and, as an additional feature, any dents which do occur can be readily hammered out without damage.

Excellent weathering resistance is another valuable property exhibited by the laminates of the present invention. It will be apparent, of course, that the metal layers, if unprotected steel and the like, will corrode upon long and continuous exposure to the weathering elements. However, the adhesion between the metal layers and the thermoplastic core layer is highly resistant to weather. For example, little or no loss in adhesion occurs with aluminum-nylon-aluminum laminates after one month in boiling water. Further, aluminum-nylon-aluminum laminates show no loss in peel strength after 13 months in water, or after 11 months in saturated aqueous calcium chloride or sodium chloride solutions, all at ambient temperatures.

The adhesive peel strength of the layers of the laminates of the invention are not narrowly critical and can vary over wide limits. There is no particular upper limit on the peel strength since in the construction applications contemplated, the stronger the adhesion, generally the more suitable is the laminate, particularly in post-forming operations. A lower limit on peel strength of the metal layer-thermoplastic core layer adhesion, however, is much more important and generally should be greater than about $1.75 \times 10^3$ N/m (10 pounds/linear inch) as measured by ASTM D 903-49 (Reapproved 1972).

It will be apparent that, in addition to each of the properties ennumerated and discussed hereinabove, the metal-thermoplastic-metal laminates possess smooth metal surfaces. Since among the metals listed hereinbelow as being suitable, certain of the surfaces—for example, steels, iron, and the like corrode upon continued exposure to weathering elements, it is highly advantageous to be able to easily apply a protective surface coating to such corrosion-prone metal surface and cure such protective coating so as to enhance the strength and hardness of the coating and securely adhere it to the metal surface.

Thus, the laminates—shaped, as well as substantially flat—are readily protected by applying conventional metal protective coatings to at least one of the metal surfaces and curing the same at elevated temperatures. As an example, since the most common of such protective coatings is paint, the metal surfaces are easily primed and painted. The paint may be cured at elevated temperatures, without the laminate undergoing any distortion. For example, with respect to automobiles, curing of the paint often is carried out at temperatures as high as about 163° C. (325° F.). The painted laminate is thereafter cooled to ambient temperatures. It will be recognized, however, that the actual temperature employed to cure the protective coating may vary according to the protective coating. But regardless of the actual temperature employed, whether lower or higher, it is contemplated that the protective coating will be cured at an appropriate temperature easily determined by those skilled in the art.

4. Component Materials of the Laminates

Materials useful within the scope of the present invention must of necessity possess those properties and characteristics which will yield the laminate having an improved combination of service properties considered important and critical for demanding construction applications. Such critical combination of properties, as noted hereinabove, includes, among others, a heat distortion temperature of at least about 130° C. (266° F.), a coefficient of linear thermal expansion less than about $63 \times 10^{-6}$°C.$^{-1}$, an inelastic ratio less than about 93%, and a weight less than about 9.76 kg/m$^2$ (2 lb./ft.$^2$)

The thermoplastic core layer materials are selected from the group consisting of partly crystalline polyamides and polyesters. These thermoplstics possess the necessary properties to meet the requirements demanded of thermoplastics useful within the scope of the present invention. Included among the property requirements are:

(a) the thermoplastic core layer material must be partly crystalline; and
(b) the thermoplastic core layer material must have a crystalline melting point greater than 130° C. (266° F.).

The term "partly crystalline polyamides and polyesters" is employed herein to describe polyamide- and polyester-based thermoplastic compositions, at least 40% by weight of which is organic thermoplastic polymer (s), with at least 50% by weight of the organic thermoplastic polymer (s) being polyamide or polyester polymer chains or chain segments having a degree of crystallinity (DC) greater than about 15% (this at least 50% by weight is referred to herein as the partly crystalline polyamide or polyester portion). The degree of crystallinity is specified by the following formula:

$$DC = (d_{pc} - d_{oc})/(d_{100c} - d_{oc}) \times 100 \text{ wherein:}$$

$d_{pc}$ is the density of the partly crystalline polyamide or polyester portion of the thermoplastic composition at 23° C., exclusive of substantial volume fraction (s) of other non-crystallizable organic-polymer-modifier or inorganic-filler phases which the thermoplastic core composition may contain;

$d_{oc}$ is the density of the amorphous fraction (DC=0%) of the partly crystalline polyamide or polyester portion of the thermoplastic composition at 23° C.; and $d_{100c}$ is the density of the crystalline fraction (D=100%) of the partly crystalline polyamide or polyester portion of the thermoplastic composition at 23° C.

The value of $d_{100c}$ may be calculated from the crystal type and crystal lattice parameters obtained from wideangle X-ray diffraction measurements. The value of $d_{oc}$ may be obtained via density measurements on quenched samples exhibiting no apparent degree of crystallinity by X-ray diffraction or differential scanning colorimetric measurements. Alternatively, the value of $d_{oc}$ may be obtained by extrapolating the dependence of density of partly crystalline samples of the organic polymer with known finite values of apparent degree of crystallinity ($DC_a$) to the value of density $d_{Oc}$ at which $DC_a$ is zero. Values of $DC_a$ for the partly crystalline organic polymer samples may be determined either via wideangle X-ray diffraction, as that percent the X-ratiation diffracted at wide angles by the polymer crystallites is of the total X-radiation both diffracted and scattered at wide angles by both the polymer crystallites and the amorphous portions of the polymer, or by differential scanning calorimetric measurements of the latent heat of melting, whereupon the apparent degree of crystallinity $DC_a$ is that percentage the measured heat of melting is of an estimated fixed value for the perfect polymer crystal.

In addition to the property requirements (a) and (b) listed hereinabove, the thermoplastic core layer preferably should be ductile, particularly in those laminates which are to be subjected to post-forming operations and have a void level less than about 15% in that higher void levels tend to adversely affect the multiaxial impact resistance and formability of the laminates fabricated therefrom.

Materials which meet the above requirements of the thermoplastic core layer, as noted hereinabove, are selected from the group consisting of partly crystalline polyamides and polyesters having crystalline melting points greater than 130° C. (266° F.). Illustrative of suitable partly crystalline polyamides are various nylons, for example, nylon 6 or poly(ε-caprolactam) or poly(imino-1-oxohexamethylene), nylon 11 or poly(11-aminoundecanoic acid) or poly(imino-1-oxoundecamethylene), nylon 12 or poly(lauryl lactam) or poly(12-aminododecanoic acid) or poly(imino-1-oxododecamethylene), nylon 6,6 or poly(hexamethylene adipamide) or poly(iminoadipolyiminohexamethylene), nylon 6,9 or poly(hexamethylene azelaamide) or poly(hexamethylene nonandiamide) or poly(iminohexamethyleneiminoazelaoyl), nylon 6,10 or poly(hexamethylene sebacamide) or poly(hexamethylene decanediamide) or poly(iminohexamethyleneiminosebacoyl), nylon 6,12 or poly(hexamethylene dodecanoamide) or poly(iminohexamethyleneiminododecanedioyl), and nylon 4 or poly(ε-butyrolactam) or poly(imino-1-oxotetramethylene), nylon 7 or poly(7-aminoheptanoic acid) or poly(7-aminooenanthylic acid) or poly(imino-1-oxoheptamethylene), nylon 8 or poly(8-aminocaprylic acid) or poly8-aminooctanoic acid) or poly(imino-1-oxooctamethylene), nylon 10,6 or poly(decamethylene adipamide) or poly(iminoadipoyliminodecamethylene) and numerous partially aromatic nylons (PARNs). PARNs result when an aromatic residue or unit is substituted in whole or in part for a aliphatic residue or unit in an aliphatic nylon polymer. For example, substitution of all of the adipic acid [HOOC-$(CH_2)_4$-COOH] residues in nylon 6,6 by those from mixtures of about 50–70% terephthalic acid (TA, or p-HOOC-$C_6H_5$-COOH)/ 50–30% isophthalic acid(IA, or m-HOOC-$C_6H_5$-COOH) gives suitable PARNs which are high-melting, partly crystalline nylons 6,TA-co-6,IA or poly(hexamethylene tere-co-isophthalamides) or poly(iminohexamethyleneiminoterephthaloyl-co-isophthaloyls).

Other suitable PARNs are partly crystalline nylons 6,6-co-6,-TA, nylons 6,6-co-6,IA, nylons 6,6-co-6,TA-co-6,IA, and other similar PARNs, including partly crystalline PARNs wherein some or all of the diamine residues have aromatic character and those containing lactam residues, such as nylons 6-co-6,6-co-6,TA.

Various other types of copolyamides also are suitable. Examples are partly crystalline copolyamides of nylons 6-co-11; nylons 6-co-12/ nylons 6-co-6,6; nylons 6-co-6,9; nylons 6-co-6,12; nylons 11-co-12; nylons 11-co-6,6; nylons 11-co-6,9; nylons 11-co-6,12; nylons 6-co-6,6-co-6,10; nylons 6,6-co-6,9-co-6,10; nylons 6,9-co-6,TA-co-6,IA and many other similar partly crystalline copolyamides.

Various block copolymers with partly crystalline polyamide hard blocks or chain segments also are suitable. Examples of such materials are nylon 6-block-poly(tetramethylene oxide), nylon 6-block-poly(polypropylene oxide) nylon 6-block-poly(ε-caprolactone), nylon 6-block-poly(butadiene), nylon 6-block-poly(dimethylsiloxane), nylon 6,6-block-poly(tetramethylene oxide), nylon 6,6-block-poly(propylene oxide), nylon 6,6-block-poly(butadiene), nylon 6,6-block-poly(dimethylsiloxane), and many other similar block copolymers with partly crystalline polyamide blocks or chain segments, including those with partly crystalline copolyamide blocks or chain segments, such as (nylon 6,6-co-6)-block-poly(tetramethylene oxide), (nylons 6,TA-co-6,IA)-block-poly(tetramethylene oxide). These block copolymers with partly crystalline chain segments and soft or rubbery or elastomeric blocks or chain segments can exhibit low-notch sensitivity and high toughness and resistance to impact, even at low temperatures. Other suitable types of block copolymers are those with more than one type of crystallizable hard blocks, such as nylon 6,6-block-poly(ethylene terephthalate), nylon 6,6-block-poly(tetramethylene terephthalate), and block copolymers where both types of blocks or chain segments are hard, but only the polyamide or copolyamide blocks or chain segments are crystallizable, such as nylon 6,6-block-poly-(oxy-1,4,-phenylenesulfonyl-1,4-phenyleneoxy-1,4-phenyleneisopropylidene-1,4-phenylene).

Numerous graft copolymers with partly crystalline polyamide or copolyamide blocks or chain segments also are suitable. Examples of such materials are poly-(ethylene-co-propylene)-graft-nylon 6, poly(ethylene-co-propylene)-graft-nylon 6,6 poly(ethylene-co-propylene)-graft-nylon 6,6, poly(ethylene-co-propylene)-graft-(nylon 6,TA-co-6,IA), poly(butyl acrylate)-graft-nylon 6,6, poly(butyl acrylate)-graft-(nylon 6,TA-co-6,IA), polyisobutylene-graft-(nylon 6,TA-co-6,IA). As in the case of certain block copolymers, soft, rubbery or elastomeric polymers grafted with partly crystalline polyamides or copolyamides can have low notch sensitivity and high toughness and resistance to impact even at low temperatures.

Also suitable as the thermoplastic core layer in the laminates of this invention are blends or mixtures of the above partly crystalline polyamides, and polyamide and copolyamide block and graft copolymers. Examples are blends of nylon 6 with nylon 6-block-poly-(tetramethylene oxide), nylon 6,6 with nylon 6-block-poly(propylene oxide), nylon 6,6 with poly(ethylene-co-propylene)-graft-nylon 6,6, nylon 6,6 with poly(butyl acrylate)-graft-nylon 6,6 and many other similar blends. Such materials also can exhibit low-notch sensitivity and high toughness and resistance to impact, even at low temperatures.

Illustrative of suitable polyesters are partly crystalline poly(alkylene terephthalates) having alkylene groups or residues with two to about ten carbon atoms, such as poly(ethylene terephthalate), poly(butylene terephthalate) or poly(tetramethylene terephthalate), poly(decamethylene terephthalate, poly(1,4-cyclohexyldimethylol terephthalate) and many similar partly crystalline poly(alkylene terephthalates).

Partly crystalline poly(alkylene terephthalate-co-isophthalates) having alkylene groups with two to about eight carbon atoms and a terephthalate residue/isophthalate residue ratio greater than about 2.5 also are suitable. Examples are partly crystalline poly(ethylene 70-100% terephthalate-co-30-0% isophthalates), polybutylene 70-100% terephthalate-co-30-0% isophthalates), poly(1,4-cyclohexyldimethylol 70-100% terephthalate-co-30-0% isophthalates), and numerous other partly crystalline alkylene glycol-terephthalates copolyesters, such as partly crystalline poly(ethylene-co-butylene terephthalates), poly(ethylene-co-neopentylene terephthalates), poly(butylene-co-cyclohexyldimethylol terephthalates), poly(ethylene-co-cyclohexyldimethylol terephthalates), and poly(ethylene-co-cyclohexyldimethylol terephthalate-co-isophthalates).

Partly crystalline copolyesters of alkylene glycols with other aromatic dicarboxylic acids are also suitable. Examples are partly crystalline poly(ethylene terephthalate-co-2,2'-biphenyldicarboxylates), poly-(butylene terephthalate-co-4,4'-biphenyldicarboxylates), poly(butylene terephthalate-co-phenylindanedicarboxylates), poly(butylene terephthalate-co-t-butylisophthalates), and poly(butylene terephthalate-co-2,6-naphthalenedicarboxylates).

Partly crystalline copolyesters containing some aliphatic dicarboxylic acid residues, and which have high crystalline melting points [i.e., above 130° C. (266° F.)] are also suitable. Examples are high melting, partly crystalline poly(ethylene terephthalate-co-adipates), poly(1,4-cyclohexyldimethylol terephthalate-co-adipates), and poly(butylene terephthalate-co-adipates).

Numerous partly crystalline aromatic polyesters and copolyesters are also suitable. Examples are poly[bis-(4-hydroxy-phenyl)-1,2-ethane isophthalate], poly[bis(4-hydroxyphenyl)methane isophthalate], poly[p-hydroxybenzoyl-co-ethylene terephthalates], poly[p-hydroxybenzoyl-co-ethylene terephthalate-co-isophthalates], poly[bis(4-hydroxyphenyl)-1,2-ethane isophthalate-co-azelaoates], and poly[bis(4-hydroxyphenyl)-1,2-ethane terephthalate-co-azelaoates].

Just as block copolymers with partly crystalline polyamide chain segments are suitable as the thermoplastic core layer in the laminates of the present invention, so too are block copolymers with high-melting, partly crystalline polyester of co-polyester blocks or chain segments. A few examples of such block copolymers are poly(ethylene terephthalate)-block-poly-(tetramethylene oxide), poly(butylene terephthalate)-block-poly-(tetramethylene oxide), poly(butylene terephthalate-co-isophthalate)-block-poly(tetramethylene oxides), poly(ethylene terephthalate)-block poly(ε-caprolactone), and poly(tetramethylene terephthalate-co-isophthalate)-block-poly(butadienes). These types of block copolymers also can have low-notch sensitivity and high toughness and resistance to impact, even at low temperatures.

Graft copolymers with high-melting, partly crystalline polyester of copolyester blocks or chain segments also are suitable as the thermoplastic core layer. A few examples are high-melting, partly crystalline polyisobutylene-graft-poly(ethylene terephthalate), polyisobutylene-graft-poly(butylene terephthalate), poly(ethylene-co-propylene)-graft-poly(butylene terephthalate-co-isophthalates), and poly(butadiene)-block-poly(butylene terephthalate). These types of graft copolymers also can have low notch sensitivity and high toughness and impact strength, even at low temperatures.

The thermoplastic materials can be modified with fillers, reinforcing agents, plasticizers, stabilizers, flame retardants, and other polymer modifiers, as are well-known in the art, in order to alter their properties and thereby enlarge the scope of applicability. One such modification comprises reinforcing the thermoplastic materials with mineral and/or organic fillers and fibers which may have been treated with adhesion promoters or coupling agents capable of increasing the adhesion of the fillers and fibers to the thermoplastic matrix molecules. A large number or organosilane compounds (discussed hereinbelow) have been found to be especially capable of performing the task of improving the adhesion between thermoplastics and mineral fillers and glass fibers, thereby creating a synergistic effect when compared to non-treated fillers and fibers.

Preferred mineral fillers include small-particle-size quartz, wollastonite, feldspar, calcined kaolinite clay, and the like. The concentration of such mineral fillers, when employed, can vary from very small amounts, such as one or two percent by weight, up to about 50% by weight, or even higher, with concentrations between about 20% and about 45% by weight being preferred.

Fibers suitable for use as modifying agents include glass fibers and other high modulus, high performance fibers, such as graphite, boron, steel, aromaticpolyamide fibers, potassium titanate wiskers and the like. It will be noted that while such high modulus, high performance fibers—glass fibers, for example—improve the strength and flexural modulus of the thermoplastics such as herein employed, they result in a decreased multiaxial impact resistance. In spite of this apparent drawback, however, concentrations of fibers up to about 10% by weight or even higher (for example, about 45% by weight) may be advantageously employed for certain property enhancement, where desired.

Metals which are useful within the present invention are fairly wide in scope. Such metals, however, must meet certain requirements. These requirements are:

(a) the metal must have a melting point greater than the crystalline melting point of the thermoplastic core layer, that is, greater than at least 130° C. (266° F.);

(b) each metal layer must have a minimum thickness of at least about 0.00127 cm (0.0005 inch, 0.5 mil).

In addition to requirements (a) and (b), the metals preferably should have a tensile yield strength at an offset of 0.2% elongation greater than $1.82 \times 10^6$ N/m$^2$ (264 lb./in.$^2$) at temperatures greater than the crystalline melting point of the thermoplastic core layer, a modulus of elasticity in tension greater than about $34.47 \times 10^9$ N/m$^2$ ($5 \times 10^6$ psi) at ambient temperatures, and the metals preferably should be ductile, particularly when the resultant laminates are to be subjected to post-forming operations. The tensile yield strength at an offset of 0.2% elongation and the modulus of elasticity in tension are determined in accordance with ASTM D638-72 discussed hereinbefore.

Metals which meet the above requirements, that is, those which result in laminates possessing in combination the critically important heat distortion temperature of at least about 130° C. (266° F.), coefficient of linear thermal expansion less than about $63 \times 10^{-6}$°C.$^{-1}$, inelastic ratio less than about 93%, and weight less than about 9.76 kg/m$^2$ (2 lb./ft.$^2$), may be either ferrous or non-ferrous. Exemplary of the ferrous metals are steels, particularly low-carbon steels, stainless steels, galvanized iron, and the like. Non-ferrous metals are exemplified by aluminum, magnesium, zinc, tin, nickel, titanium, copper, cobalt, beryllium, and high melting [that is, greater than 130° C. (266° F.)] alloys of each of these metals, such as various brasses and bronzes.

The thermoplastic core layer and the metal layers are uniformly and securely laminated together to form the laminates. If desired, a suitable adhesion agent from among those listed hereinbelow may be employed to facilitate the formation of laminates possessing the critically important properties discussed in detail hereinabove.

It will be noted that while the employment of an adhesion agent in the laminates is not essential, in general it is preferred to employ an adhesion agent to ensure strong metal-thermoplastic adhesion. For example, a peel strength of at least about $1.75 \times 10^3$ N/m generally is adequate. It will be apparent, however, that even stronger metal-thermoplastic adhesion is preferred.

Adhesion agents, when employed, which are suitable for anchoring the metal layers to the thermoplastic core layer to provide adequate adhesion of the metal layers to the thermoplastics core layer are not narrowly critical. All that is necessary is that such adhesion agents are compatible with the laminate component layers and provide adhesion between the facing metal and thermoplastic core layers' surfaces adequate for the contemplated end use. Such adhesion agents include, for example, organosilane adhesion promoters or coupling agents.

Illustrative of classes of suitable organosilane adhesion agents are amino-functional alkyltrialkoxysilanes, epoxy-functional alkyltrialkoxysilanes, glycidoxy-functional alkyltrialkoxysilanes, and mixtures thereof. These classes of organosilanes are exemplified, respectively, by gamma-aminopropyltriethoxysilane and N-beta-(aminoethyl)-gamma-aminopropyltrimethoxysilane, beta-(3,4-epoxycyclohexyl)ethyltrimethoxysilane, gamma-glycidoxypropyltrimethoxysilane, and gamma-methacryloxypropyltrimethoxysilane. These compounds are commercially available from Union Carbide Corporation, New York, New York 10017 as A-1100 silane, A-1120 silane, A-186 silane, A-187 silane, and A-174 silane, respectively. Gamma-Glycidoxypropyltrimethoxysilane and N-beta-(aminoethyl)-gamma-propyltrimethoxysilane also are commercially available from Dow Corning Corporation, Midland, Michigan 48640 as Z6040 silane and Z6020 silane, respectively. Such silane coupling agents may be employed as alcoholic solutions, aqueous alcoholic solutions, or simply aqueous solutions. The concentration of the silane solutions typically is between about 0.01% and about 1.5% by weight.

Other suitable adhesion agents may also be employed. Exemplary of such other suitable adhesion agents are adhesives such as nitrile rubber-phenolic resins, epoxides, acrylonitrile-butadiene rubbers, urethane modified acrylics, polyester-co-polyamides, polyester hot melts, polyester hot melts crosslinked with polyisocyanates, polyisobutylene modified styrene-butadiene rubbers, urethanes, ethylene-acrylic acid copolymers, ethylenevinyl acetate copolymers, and the like.

Of the suitable adhesion agents listed hereinabove, the organosilane adhesion promoters or coupling agents are preferred in that the resultant metal-thermoplastic adhesion is both stronger and more resistant to deterioration and failure.

Various techniques employing the adhesion agents noted hereinabove so as to ensure the required adhesion between the facing metal-layer-thermoplastic core layer surfaces are suitable. One such technique gives exceptional results when the metal layers are aluminum and the thermoplastic core layer is a nylon, a nylon copolymer, a nylon terpolymer, poly(ethylene terephthalate), or modification thereof. An exemplary method employing this technique to fabricate the laminates so as to ensure strong metal-thermoplastic adhesion may be described as follows, with aluminum and nylon 6,6 being used as the metal layers and the thermoplastic core layer, respectively, for convenience. The aluminum-metal layers are first subjected to a degreasing operation to remove any grease and dirt from their surfaces (although such degreasing is unnecessary, and therefore may be omitted, when the metal is already free of such contaminants). For example, washing the surface or complete submersion thereof in toluene or some other suitable solvent is convenient. If desired, the cleaned aluminum layers then may be soaked in a hot dichromate-sulfuric acid (chromic acid) solution or a dilute solution of aqueous alkali metal hydroxide—for example, sodium hydroxide or potassium hydroxide—to etch the surface, although said etching is not an absolute necessity. Excess etching agent, whether hot chromic acid or dilute aqueous alkali metal hydroxide, is removed from the etched surface by thorough rinsing of such surface in water.

Following the pre-treatment (when necessary), the aluminum-metal layer surfaces are treated with an organosilane adhesion promoter to provide the preferred adhesion agent.

Alternatively, the nylon 6,6 layer similarly may be treated with an organosilane adhesion promoter. But in any event, the organosilane adhesion promoter (or in general the adhesion agent) is interposed between the facing surfaces of the aluminum layers and the nylon 6,6 layer regardless of whether it is placed on the surfaces of the aluminum layers or the surfaces of the nylon 6,6 layer.

As noted hereinabove, however, the imposition of an organosilane adhesion promoter between the facing surfaces of the metal layers and the thermoplastic core layer, while convenient, is not an absolute necessity. Other adhesion agents (or no adhesion agent at all) also can be employed, although the organosilane adhesion promoters are preferred for use as adhesion agents.

As an example, laminates comprised of aluminum as the metal layers laminated to a thermoplastic core layer of a mineral-reinforced nylon 6-co-6,6 (VYDYNE® R-240), and of aluminum laminated to a block-copolymer (HYTREL® 4056)-modified poly(ethylene terephthalate), can be prepared without utilizing any adhesion agent at all. Such laminates possess all the critical and important properties necessary for use as construction panels, even though the long-term stability of the metal-thermoplastic bond may suffer adversely.

It will be appreciated, however, that (when employed) the particular pre-treatment and adhesion agent, and procedure employed to provide the desired laminate will vary depending upon both the particular metal layers and thermoplastic core layer employed and their condition.

The elevated temperatures and pressures employed in the preparation of the laminates are not narrowly critical. Suitable temperatures necessary for the formation of strong and secure metal-thermoplastic adhesion can vary, for example, between about 100° C. (212° F.) and about 350° C. (662° F.). In a similar manner, suitable pressures are those sufficient to maintain contact between the facing surfaces of the two metal layers and the thermoplastic core layer in order to provide metal-thermoplastic adhesion having a peel strength of at least about $1.75 \times 10^3$ N/m (10 lb./linear inch).

It will of course be appreciated that the particular conditions of temperature, pressure and the like will vary depending upon the particular materials making up the laminates.

A variety of methods of actually fabricating the laminates of the present invention may be employed including compression molding, extrusion lamination, and the like. One preferred method of fabrication of the laminates is to extrude a sheet of the thermoplastic material being employed and laminate the molten thermoplastic layer between the two metal layers, so as to obtain excellent adhesion as noted hereinabove. It is also possible to cast some thermoplastics, such as nylon 6 and its block copolymers, by polymerizing $\epsilon$-caprolactam by anionic polymerization in situ between the metal layers using acyllactams and the like such as acetylcaprolactam, adipoyl-bis-caprolactam, therephthaloyl-bis-caprolactam, isophthaloyl-bis-caprolactam, and the like as initiators. It is also contemplated that the metal layers can be preformed to the desired shapes by standard metal-shaping techniques and held in a mold while the thermoplastic core layer is injection molded, compression molded, or cast polymerized between them.

5. Experimental Examples

The following Examples illustrate the present invention. They are not to be construed as limitive upon the overall scope thereof.

EXAMPLE 1

A general description of the procedures employed to prepare the metal-thermoplastic-metal laminates of this invention is given below. The procedure can be conveniently described as a step-wise procedure consisting of the following operations in the order given:

(a) metal pre-treatment;
  (1) metal degreasing;
  (2) metal cleaning/etching;
(b) thermoplastic pre-treatment;
(c) application of the adhesion agent (if employed);
(d) fabricating the laminate.

It will be noted, however, that steps (a) and/or (b) may be unnecessary and therefore may be omitted where the metal layers and/or the thermoplastic core layer materials are free from contaminating agents such as grease, dirt, and the like, for example, contemporaneously or newly extruded materials.

(a) Metal Pre-treatment
  (1) Metal Degreasing—The metal surface is cleaned (when necessary) of processing oils by vapor degreasing in a suitable solvent, such as trichloroethylene. Alternatively, the surface is wiped clean with a clean cloth (a Webril® Litho Pad is convenient) while immersed in a suitable solvent, such as, for example, trichloroethylene, 1,1,1-trichloroethane, toluene, acetone, and the like. The metal surface is thereafter rinsed with fresh solvent, either the same or different—for example, an acetone rinse following an initial cleaning with toluene—without wiping and the excess solvent allowed to evaporate.
  (2) Metal Cleaning/Etching—Following the degreasing [Step (a)(1)] (when employed) the metal preferably is cleaned/etched prior to the application of the adhesion agent (when employed) in order to provide the highest metal-thermoplastic-adhesion strength, although in many cases the cleaning/etching is not necessary.

The metal surface can be etched by either chemical or non-chemical means. Non-chemical etching (or mechanical abrasion) includes brushing with a wire brush, grit blasting with alumina or steel grit, wet sanding, and the like. Either of these etching treatments is followed by degreasing as described in Step (a)(1).

The chemical etching media may be either alkaline, acid or some combination thereof. Suitable alkaline etching media include aqueous solutions of sodium hydroxide, sodium metasilicate, proprietary metal cleaners available commercially, such as, for example Apex 764 M cleaner (available from Apex Alkali Products Company, Philadelphia, Pennsylvania), and the like. Suitable acid etching media include dichromate-sulfuric acid (chromic acid) solutions, aqueous hydrochloric acid solutions, phosphoric acid solutions, and the like.

The particular medium employed may vary depending on the metal being used in that different metals sometimes require different treatments. In certain instances metals are suitably cleaned with several of the treatments. Exemplary treatments for specific metals include the following:

(1) Aluminum
(a) sodium hydroxide solution, 2–5% at 25° C.;
(b) sodium metasilicate solution—50.0 grams/liter at 70° C.;
(c) Apex 764 M cleaner—50.0 grams/liter at 70° C.; and
(d) sodium dichromate solution—30.0 grams sodium dichromate ($Na_2Cr_2O_7.2H_2O$), 150 milliliters concentrated sulfuric acid (sp. gr. 1.84), and 1 liter water at 60° C.

(2) Low Carbon Steel
(a) phosphoric acid, 2% at 25° C.

(3) Stainless Steel
(a) Apex 764 M cleaner—50.0 grams/liter at 70° C.;
(b) wipe with 1:1 hydrochloric acid-water, abrade lightly with a wire brush, then Apex 764 M cleaner—50.0 grams/liter at 70° C.; and
(c) abrade lightly with a wire brush, then Apex 764 M cleaner—50.0 grams/liter at 70° C.

The metal surface is etched by immersing the metal in the etching medium for an appropriate time period. Typical treatment times are: sodium hydroxide solution, 2–5 minutes; Apex 764 M cleaner and sodium metasilicate solutions, 2 minutes; dichromate-sulfuric acid (chromic acid) and phosphoric acid solutions, 5 minutes.

Following the cleaning/etching treatment, the metal is thoroughly rinsed with water. When an alkaline medium treatment is employed, in general, the metal is washed with hot, running water while wiping with a clean cloth (a Webril ® Litho Pad is convenient), followed by a hot water rinse without wiping. The metal is thereafter blown dry with a jet of clean air or nitrogen.

When an acid medium treatment is employed, in general, the metal is washed successively with tap water and demineralized water. If a silane adhesion promoter is to be applied as in Step (c), it usually is applied directly to the wet metal although it also can be applied to the dry metal, if desired. If silane is not to be used, the metal is first blown dry as described above and then oven dried at a suitably convenient temperature.

(b) Thermoplastic Pre-Treatment

In order to obtain good metal-thermoplastic adhesion during Step (d) hereinbelow, any processing aid present, for example, a mold release agent as in the case of a cast thermoplastic sheet, must be removed. If the thermoplastic is not to be used above its melting point in subsequent operations [Step (d)], its surface is prepared by thoroughly wiping with a suitable solvent-moistened clean cloth, abrading lightly, again wiping the surface, and finally drying. On the other hand, if Step (d) involves melting the thermoplastic, the sanding or abrading step is not necessary unless it is to remove foreign material from the surface of the thermoplastic.

(c) Application of the Adhesion Agent

The application method for the adhesion agent (when employed) depends on the particular system being used. When adhesion agents referred to as adhesion promoters as for example, the organosilane coupling agents are employed, they are applied as dilute solutions (usually about 0.01% to about 1.0% by weight) to the surface in question. The amount of such agent applied to the surface in question is generally quite small, and only a small amount is retained on the surface—a monomolecular layer being ideal for good metal-thermoplastic adhesion. The adhesion promoters may be applied to the metal surface and/or the thermoplastic surface by immersing the surface in question into the solution or by spraying the solution onto the surface. In either case, the material is allowed to drain briefly and thereafter dried either by air drying or forced air drying with a jet of air or nitrogen without touching the silane-treated surface. An alternative method involves incorporating the adhesion promoter into the thermoplastic. However, an application to the metal surface is the preferred method in that following the application, the metal can be readily baked at elevated temperatures, usually about 130° C. for between about 5 minutes and about 30 minutes, to assure complete dryness of the metal surface prior to use in Step (d).

When adhesion agents such as an epoxy or a nitrile-rubber/phenolic system is employed, they are usually applied by conventional coating techniques, for example, metering bar, roll coater, and the like. Such adhesion agents are applied in an amount such that the thickness is measured in thousandths of a centimeter (cm). They may be applied to the metal and/or the thermoplastic surface.

(d) Fabricating the Laminate

Procedure (1)—Adhesion Promoter Adhesion Agent Laminate—The laminates containing the organosilane adhesion promoters are fabricated by placing a layer or sheet of metal on each side of a layer of thermoplastic, with the silane-treated side of the metal layers in contact with the thermoplastic core layer.

For convenience and to avoid polymer flash getting on the hot press platens during the actual laminating phase, a "throw-away" back-up sheet is placed between the treated metal layers and the press platens. Thin gage aluminum foil is useful for this purpose. Additional back-up sheets, for example, polished metal sheets to ensure surface smoothness of the finished laminate, can also be used. The assembly is placed in a press and heated above the melting point of the polymer under sufficient pressure to maintain contact between the metal and thermoplastic and to cause the thermoplastic to flow to the thickness desired. The laminate's total thickness, in addition to the total thickness of the metal layers, is controlled by using suitable spacers between the platens or, preferably, a TEFLON ®—coated metal mold frame of designated thickness around the perimeter of the laminate assembly. Contact at the desired temperature is maintained for a time sufficient to ensure good metal and thermoplastic adhesion, usually a few seconds up to about 30 minutes. The metal-thermoplastic-metal laminate is then cooled under pressure to below the melting point of the thermoplastic. The pressure is then released and the laminate removed from the press. Certain laminates, for example, those containing poly(ethylene terephthalate)-based thermoplastics, are slow-cooled under pressure in the press to about 80°–140° C. below the crystalline melting point of the thermoplastic, and/or after being removed from the press, the laminate is post-annealed for about 1 hour, also at about 80°–140° C. below the crystalline melting point of the thermoplastic.

Procedure (2)—Adhesive Adhesion Agent Laminate—The laminates containing adhesive adhesion agents are fabricated by disposing a metal layer on each side of a thermoplastic core layer in such a manner that the adhesive adhesion agent is interposed between the facing surfaces of the metal layers and the thermoplastic core layer. The assembly is placed in a pres and heated under pressure to cure the adhesive and obtain metal-thermoplastic adhesion. Generally, the assembly is not heated above the melting point of the thermoplastic. As a result, the total thickness of the fabricated laminate is determined by the sum of the total thickness of the metal layers and the thickness of the thermoplastic core layer used to prepare it.

Procedure (3)—Non-Adhesion Agent Laminate—The laminates containing neither adhesion promoter nor adhesive adhesion agents are fabricated by disposing a metal layer on each side of the thermoplastic core layer in a suitable mold. The assembly is placed in a press and heated above the melting point of the polymer to effect lamination as described in Procedure (1) above.

Procedure (4)—Continuous Extrusion Procedure—The thermoplastic is extruded, in the melt between two layers of metal. Contact under pressure is maintained by pressing means such as suitably spaced, heated and/or chilled rolls and/or platens.

Alternatively, the extruded thermoplastic melt may be allowed to solidify before contact with the metal layers and then laminating as described in either of Procedures (1), (2) or (3), depending upon whether an adhesion agent is employed. Pressing means, such as suitably spaced, heated and/or chilled rolls and/or platens are used to effect the necessary contact between the metal and thermoplastic.

EXAMPLE 2

A metal-thermoplastic-metal laminate was prepared using 0.00508 cm (0.002 inch, 2 mils) thick 1100-0 aluminum as the metal layers and nylon 6,6 having a degree of crystallinity of 33% as the thermoplastic core layer. The aluminum surface was degreased by immersion in trichloroethylene as described in EXAMPLE 1 above and then cleaned/etched by immersion in a 5% aqueous solution of sodium hyroxide at ambient temperatures for a period of 5 minutes. The aluminum was removed from the alkaline solution and rinsed with hot, running water while wiping with a clean cloth (a Webril ® Litho Pad is convenient) followed by a hot water rinse without wiping and thereafter blown dry with a jet of clean nitrogen. A 0.4% aqueous solution of A-1100 silane was applied to the cleaned/etched aluminum surface and the sheets hung vertically to drain and air dry. They were then heated in an oven at 130° C. for thirty minutes.

The treated aluminum layers and the nylon 6,6 were assembled in a 0.178 cm (0.070 inch) thick TEFLON ®-coated stainless steel mold frame with the treated surfaces of the aluminum layers facing the nylon 6,6. The assembly was placed in a platen press heated to 285° C. Pressure was applied and maintained for 10 minutes after the nylon 6,6 had flowed to fill the mold cavity. The laminate was then cooled under pressure to 200° C., afterwhich the pressure was released and the laminate removed from the press. The laminate's properties are tabulated in TABLE 1.

EXAMPLES 3–9

Metal-thermoplastic-metal laminates using 1100-0 aluminum as the metal layers and nylon 6,6 as the thermoplastic core layer were prepared according to the procedure described in EXAMPLE 2 above. The properties of the laminates, including the component layers' thicknesses, are tabulated in TABLE 1.

EXAMPLE 10

A 0.185 cm (0.073 inch, 73 mils) thick metal-thermoplastic-metal laminate was prepared using 0.00254 cm (0.001 inch, 1 mil) thick 5052-0 aluminum sheets as the metal layers and nylon 6,6 having a degree of crystallinity of 33% as the thermoplastic core layer. The aluminum surface was degreased by immersion in toluene followed by an acetone rinse as described in EXAMPLE 1 and then cleaned/etched by immersion in a 50.0 grams/-liter solution of sodium metasilicate at 70° C. for a period of 2 minutes. The aluminum was removed from the solution and rinsed with hot, running water while wiping with a clean cloth (a Webril ® Litho Pad is convenient) followed by a hot water rinse without wiping and thereafter blown dry with a jet of clean nitrogen. A solution containing 2.5 milliliters of A-1100 silane in 1,000 milliliters of distilled water was applied to the cleaned/etched aluminum surface and the sheets hung vertically and allowed to drain and air dry.

The treated aluminum layers and the nylon 6,6 were assembled in a 0.180 cm (0.071 inch) thick TEFLON ®-coated stainless steel mold frame and laminated as described in EXAMPLE 2 above. The laminate's properties are tabulated in TABLE 1.

EXAMPLES 11–14

Metal-thermoplastic-metal laminates using 5052-0 aluminum as the metal layers and nylon 6,6 having a degree of crystallinity of 33% as the thermoplastic core layer were fabricated according to the procedure described in EXAMPLE 10 above. The laminates' properties are tabulated in TABLE 1.

EXAMPLE 15

A metal-thermoplastic-metal laminate was fabricated using 0.00762 cm (0.003 inch, 3 mils) thick 5052-0 aluminum as the metal layers and nylon 6,6 having a degree of crystallinity of 33% as the thermoplastic core layer. The aluminum surface was degreased by immersion in 1,1,1-trichloroethane as described in EXAMPLE 1 above and then cleaned/etched by immersion in a sodium dichromate dihydrate, 150 milliliters concentrated sulfuric acid (sp. gr. 1.84 ), and 1 liter water at 60° C. for a period of 5 minutes. The aluminum was removed from the chromic acid solution and rinsed thoroughly with running water followed by a demineralized water rinse. A 0.4% aqueous solution of A-1100 silane in distilled water (pH adjusted to 4.0 with formic acid) was applied to the cleaned/etched surface of the wet aluminum. The aluminum sheets were blown dry with a jet of clean nitrogen and heated in an oven at 130° C. for 2 minutes.

The treated aluminum layers and the nylon 6,6 were assembled in a 0.133 cm (0.525 inch) thick TEFLON ®-coated stainless steel mold frame with the treated surfaces of the aluminum layers facing the nylon 6,6. The assembly was placed in a platen press heated to 285° C. A pressure of 453.5 kg (0.5 ton) or less ram force was applied for 3 minutes and thereafter increased to 13605 kg (15 tons) for 1 minute. The laminate was then cooled under pressure to 138° C., afterwhich the pressure was released and the laminate removed from the press. The laminate's properties are tabulated in TABLE 1.

EXAMPLES 16–24

Metal-thermoplastic-metal laminates using 5052-0 aluminum as the metal layers and nylon 6,6 having a degree of crystallinity of 33% as the thermoplastic core layer were fabricated according to the procedure described in EXAMPLE 15 above. The laminates' properties are tabulated in TABLE 1.

EXAMPLE 25

A 0.187 cm (0.0735 inch, 73.5 mils) thick metal-thermoplastic-metal laminate was prepared using 0.00254 cm (0.001 inch, 1 mil) thick 304 stainless steel (annealed) sheets as the metal layers and nylon 6,6 having a degree of crystallinity of 33% as the thermoplastic core layer. The stainless steel surface was degreased by immersion in toluene as described in EXAMPLE 1 above and then cleaned/etched by immersion in a 50.0 grams/-liter solution of Apex 764 M (a product of Apex Alkali Products Company, Philadelphia, Pennsylvania) at 70° C. for a period of 2 minutes. The stainless steel was removed from the cleaning/etching solution and rinsed with hot, running water while wiping with a clean cloth (a Webril ® Litho Pad is convenient) followed by a hot water rinse without wiping and thereafter blown dry with a jet of clean nitrogen. A solution containing 2.5 milliliters of A-1100 silane in 1,000 milliliters of distilled water was applied to the cleaned/etched stainless steel surface and the sheets hung vertically and allowed to drain and air dry. They were then heated in an oven at 90° C. for 10 minutes.

The treated stainless steel layers and the nylon 6,6 were assembled in a 0.182 cm (0.0715 inch) thick TEFLON ®-coated stainless steel mold frame with the treated surfaces of the stainless steel layers facing the nylon 6,6. The assembly was placed in a platen press, heated to 285° C. Pressure was applied and maintained for 10 minutes after the nylon 6,6 had flowed to fill the mold cavity. The laminate was then cooled under pressure to 175° C., afterwhich the pressure was released and the laminate removed from the press. The laminate's properties are tabulated in TABLE 1

EXAMPLES 26–37

Metal-thermoplastic-metal laminates using 304 stainless steel (annealed) as the metal layers and nylon 6,6 having a degree of crystallinity of 33% as the thermoplastic core layer were fabricated according to the procedure described in EXAMPLE 25 above. The laminates' properties are tabulated in TABLE 1.

EXAMPLE 38

A metal-thermoplastic-metal laminate was prepared using 0.0152 cm (0.006 inch, 6 mils) thick 6061-T6 aluminum as the metal layers and nylon 6,6 having a degree of crystallinity of 33% as the thermoplastic core layer according to the procedure described in EXAMPLE 2 above, except that following the degreasing step, the aluminum was sanded with wet 400-grit sandpaper and cleaned/etched in a 2.5% aqueous sodium hydroxide solution. A 0.122 cm (0.048 inch) thick TEFLON ®-coated stainless steel mold frame also was employed. The laminate's properties are tabulated in TABLE 1.

EXAMPLES 39–41

Metal-thermoplastic-metal laminates were prepared using 6061-T6 aluminum as the metal layers and nylon 6,6 having a degree of crystallinity of 33% as the thermoplastic core layer. The aluminum surface was degreased by immersion in trichloroethylene as described in EXAMPLE 1 above and then cleaned/etched by immersion in a 10% aqueous hydrochloric acid solution at ambient temperatures for a period of 10 minutes. The aluminum was removed from the cleaning/etching solution and rinsed thoroughly with running water followed by a demineralized water rinse, buffed with steel wool, and air dried. The aluminum sheets were immersed in a 0.4% aqueous solution of A-1100 silane in distilled water and hung vertically to drain and air dry. They were then heated in an oven at 130° C. for 30 minutes.

The laminates were assembled and fabricated as described in EXAMPLE 2 above. The properties of the laminates, including the component layers' thicknesses, are tabulated in TABLE 1.

EXAMPLES 42–44

Metal-thermoplastic-metal laminates using 6061-0 aluminum as the metal layers and nylon 6,6 having a degree of crystallinity of 33% as the thermoplastic core layer were prepared according to the procedure described in EXAMPLE 38 above. The properties of the laminates, including the component layers' thicknesses, are tabulated in TABLE 1.

EXAMPLES 45–48

These Examples illustrate the preparation of metal-thermoplastic-metal laminates without subjecting the metal layers to either degreasing or cleaning/etching.

Laminates were prepared using Lithoplate aluminum (Lith-Kem-Ko, wipe-on offset, brush grain) as the metal layers and nylon 6,6 having a degree of crystallinity of 33% as the thermoplastic core layer. The aluminum sheets were immersed in a solution containing 4 milliliters of A-1100 silane in 1000 milliliters of 95% ethanol and hung vertically to drain and air dry. They were then heated in an oven at 130° C. for 30 minutes. The laminates were assembled and fabricated as described in EXAMPLE 2 above. The properties of the laminates, including the component layers' thicknesses, are tabulated in TABLE 1.

EXAMPLE 49–54

Metal-thermoplastic-metal laminates were prepared using C 1010 low carbon steel-annealed as the metal layers and nylon 6,6 having a degree of crystallinity of 33% as the thermoplastic core layer according to the procedure described in EXAMPLE 2 above, except that the cleaning/etching was effected by immersion in a 2% aqueous solution of phosphoric acid at ambient temperatures for a period of 0.25 minute (15 seconds). The laminates' properties, including the component layers' thicknesses, are tabulated in TABLE 1.

EXAMPLES 55–56

These Examples illustrate the preparation of metal-thermoplastic-metal laminates having metal layers of different composition and thicknesses on each side of the thermoplastic core layer.

EXAMPLE 55—A 0.284 cm (0.112 inch, 112 mils) thick laminate was prepared using 0.00508 cm (0.002 inch, 2 mils) thick 304 stainless steel (annealed) and 0.0152 cm (0.006 inch, 6 mils) thick 6061-0 aluminum as the metal layers and nylon 6,6 having a degree of crystallinity of 33% as the thermoplastic core layer. The metal layers were degreased by immersion in 1,1,1-trichloroethane as described in EXAMPLE 1 above and thereafter cleaned/etched by immersion in 50.0 grams/-liter aqueous solution of Apex 764 M at 70° C. for a period of 2 minutes. The metal layers were removed from the cleaning/etching solution and rinsed thoroughly with running water followed by a demineralized water rinse. A 0.3% aqueous solution of A-1100 silane in distilled water (pH adjusted to 4.0 with formic acid) was applied to the cleaned/etched surfaces of the wet metals. The metal sheets were blown dry with a jet of clean nitrogen and heated in an oven at 130° C. for 2 minutes.

The treated metal layers and the nylon 6,6 were assembled in a 0.264 cm (0.104 inch) thick TEFLON ®-coated stainless steel mold frame with the treated surfaces of the metal layers facing the nylon 6,6. The assembly was placed in a platen press heated to 285° C. A pressure of 907 kg (1 ton) or less ram force was applied for 3 minutes and thereafter increased to 13605 kg (15 tons) for 1 minute. The laminate was then cooled under pressure to 38° C., afterwhich the pressure was released, then the laminate removed from the press. The laminate's properties are tabulated in TABLE 1.

EXAMPLE 56—A 0.279 cm (0.110 inch, 110 mils) thick metal-thermoplastic-metal laminate was prepared using 0.00508 cm (0.002 inch, 2 mils) thick 304 stainless steel (annealed) and 0.0127 cm (0.005 inch, 5 mils) thick 3003-H25 aluminum as the metal layers and nylon 6,6 having a degree of crystallinity of 33% as the thermoplastic core layer according to the procedure described in EXAMPLE 55. The laminate's properties are tabulated in Table 1.

EXAMPLE 57

A metal-thermoplastic-metal laminate was prepared using 0.0127 cm (0.005 inch, 5 mils) thick 1100-0 aluminum as the metal layers and ZYTEL ® ST-801 (a high impact nylon 6,6) as the thermoplastic core layer according to the procedure described in EXAMPLE 10, except that the aluminum was cleaned/etched in a 50.0 gram/liter aqueous solution of Apex 764 M and a 0.173 cm (0.068 inch) thick TEFLON ®-coated stainless steel mold frame was employed. The laminate's properties are tabulated in TABLE 1.

EXAMPLE 58

This Example illustrates the preparation of a metal-thermoplastic-metal laminate without the use of an adhesion agent.

A 0.190 cm (0.075 inch, 75 mils) thick laminate was prepared using 0.0127 cm (0.005 inch, 5 mils) thick 1100-0 aluminum as the metal layers and VYDYNE ® R-240 (a Monsanto mineral reinforced nylon 6-co-6,6) as the thermoplastic core layer. The aluminum surface was degreased by immersion in 1,1,1-trichloroethane as described in EXAMPLE 1 above and then cleaned-/etched by immersion in a sodium dichromate (chromic acid) solution containing 30.0 grams sodium dichromate dihydrate, 150 milliliters concentrated sulfuric acid (sp. gr. 1.84), and 1 liter water at 60° C. for a period of 5 minutes. The aluminum was removed from the cleaning/etching solution, rinsed thoroughly with running water followed by a demineralized water rinse, blown dry with a jet of clean nitrogen, and heated in an oven at 130° C. for 2 minutes.

The dry cleaned/etched aluminum layers, and the VYDYNE ® R-240 were assembled in a 0.165 cm (0.065 inch) thick TEFLON ®-coated stainless steel mold frame with the cleaned/etched surfaces of the aluminum layers facing the VYDYNE ® R-240. The assembly was placed in a platen press heated to 285° C. A pressure of 1814 kg (2 tons) or less ram force was applied for three minutes and thereafter increased to 22675 kg (25 tons) for 1 minute. The laminate was then cooled under pressure to 138° C., afterwhich the pressure was released and the laminate was removed from the press. The laminate's properties are tabulated in TABLE 1.

EXAMPLES 59

The procedure of EXAMPLE 58 was repeated except that 0.0152 cm (0.006 inch, 6 mils) thick 6061-0 aluminum was used as the metal layers and a 0.160 cm (0.063 inch) thick TEFLON ®-coated stainless steel mold frame was employed. The properties of the laminate are tabulated in TABLE 1.

EXAMPLE 60

The procedure of EXAMPLE 60 above was repeated, except that 0.0152 cm (0.006 inch, 6 mils) thick 6061-T6 aluminum was used as the metal layers and a 0.122 cm (0.048 inch) thick TEFLON ®-coated stainless steel mold frame was employed. The properties of the laminate are tabulated in TABLE 1.

EXAMPLE 61

The procedure of Example 58 above was repeated, except that 0.0127 cm (0.005 inch, 5 mils) thick 5052-0 aluminum was used as the metal layers and 0.165 cm (0.065 inch) thick TEFLON ®-coated stainless steel mold frame was employed. The properties of the laminate are tabulated in TABLE 1.

EXAMPLE 62

The procedure described in EXAMPLE 61 above was repeated except that 0.152 cm (0.060 inch) thick TEFLON ®-coated stainless steel mold frame was employed. The laminate's properties are tabulated in TABLE 1.

EXAMPLE 63

A metal-thermoplastic-metal laminate was prepared using 0.0127 cm (0.005 inch, 5 mils) thick 5052-0 aluminum as the metal layers and a mineral reinforced nylon 6-co-6,6 (available commercially from Monsanto Company, St. Louis, Missouri 63166 as VYDYNE ® R-220) as the thermoplastic core layer. The aluminum surface was degreased by immersion in trichloroethylene as described in EXAMPLE 1 above and then cleaned-/etched by immersion in a 5% aqueous sodium hydroxide solution at ambient temperatures for a period of 5 minutes. The aluminum was removed from the alkaline solution and rinsed thoroughly with running water followed by a demineralized water rinse. A 0.4% aqueous solution of A-1100 silane in distilled water was applied to the cleaned/etched surface of the wet aluminum. The aluminum sheets were blown dry with a jet of clean nitrogen and heated in an oven at 130° C. for 15 minutes.

The treated aluminum layers and the VYDYNE ® R-220 were assembled in a 0.168 cm (0.066 inch) thick TEFLON ®-coated stainless steel mold frame with the treated surfaces of the aluminum facing the VYDYNE ® R-220. The assembly was placed in a platen press heated to 285° C. A minimal pressure of ram force was applied for 3 minutes and thereafter increased to 22675 kg (25 tons) for 1 minute. The laminate was then cooled under pressure to 200° C., afterwhich the pressure was released and the laminate removed from the press. The properties of the laminate are tabulated in TABLE 1.

EXAMPLE 64

A metal-thermoplastic-metal laminate was prepared using 0.00508 cm (0.002 inch, 2 mils) thick C 1010 low carbon steel (annealed) as the metal layers and VYDYNE ®️ R-240 as the thermoplastic core layer. The steel surface was degreased by immersion in 1,1,1-trichloroethane as described in EXAMPLE 1 above and then cleaned/etched by immersion in a 2% aqueous solution of phosphoric acid at ambient temperatures for a period of 5 minutes. The steel was removed from the phosphoric acid solution and rinsed thoroughly with running water followed by a demineralized water rinse. A 0.2% aqueous solution of A-1100 silane in distilled water (pH adjusted to 4.0 with formic acid) was applied to the cleaned/etched surface of the wet steel. The steel sheets were blown dry with a jet clean nitrogen and heated in an oven at 130° C. for 2 minutes.

The treated steel layers, and the VYDYNE ®️ R-240 were assembled in a 0.124 cm (0.049 inch) thick TEFLON ®️-coated stainless steel mold frame with the treated surfaces of the steel facing the VYDYNE ®️ R-240. The assembly was placed in a platen press heated to 285° C. A pressure of 907 kg (1 ton) or less ram force was applied for 3 minutes and thereafter increased to 13605 kg (15 tons) for 1 minute. The laminate was then cooled under pressure to 66° C., afterwhich the pressure was released and the laminate removed from the press. The properties of the laminate are tabulated in TABLE 1.

EXAMPLE 65

A 0.127 cm (0.050 inch, 50 mils) thick metal-thermoplastic-metal laminate was prepared using 0.00762 cm (0.003 inch, 3 mils), thick 304 stainless steel (annealed) as the metal layers and VYDYNE ®️ R-240 as the thermoplastic core layer according to the procedure described in EXAMPLE 64 above except that the cleaning/etching was effected by immersion in a 50.0 gram/liter aqueous solution of Apex 764 M at 70° C. for a period of 2 minutes, a 0.112 cm (0.044 inch) thick TEFLON ®️-coated stainless steel mold frame was employed, and the fabricated laminate was cooled to 38° C. before releasing the pressure. The laminate's properties are tabulated in TABLE 1.

EXAMPLE 66

A 0.185 cm (0.073 inch, 73 mils) thick metal-thermoplastic-metal laminate was prepared using 0.0127 cm (0.005 inch, 5 mils) thick 1100-0 aluminum as the metal layers and nylon 6,6 containing 10% by weight fiberglass as the thermoplastic core layer according to the procedure described in EXAMPLE 25 above, except that the degreasing in toluene was followed by an acetone rinse, the dry A-1100 silane-treated aluminum sheets were heated in an oven at 130° C. for 5 minutes, and a 0.160 cm (0.063 inch) thick TEFLON ®️-coated stainless steel mold frame was employed. The properties of the laminate are tabulated in TABLE 1.

EXAMPLE 67

A 0.193 cm (0.075 inch, 76 mils) thick metal-thermoplastic-metal laminate was prepared using 0.0127 cm (0.005 inch, 5 mils) thick 1100-0 aluminum as the metal layers and nylon 6 as the thermoplastic core layer according to the procedure described in EXAMPLE 66 above, except that a 0.168 cm (0.066 inch) thick TEFLON ®️-coated stainless steel mold frame was employed. The properties of the laminate are tabulated in TABLE 1.

EXAMPLE 68

The procedure described in EXAMPLE 67 was repeated except that nylon 6 containing 10% by weight fiberglass was employed as the thermoplastic core layer and a 0.157 cm (0.062 inch) thick TEFLON ®️-coated stainless steel mold frame was employed. The properties of the laminate are tabulated in TABLE 1.

EXAMPLE 69

A 0.234 cm (0.092 inch, 92 mils) thick metal-thermoplastic-metal laminate was prepared using 0.0127 cm (0.005 inch, 5 mils) thick 1100-0 aluminum as the metal layers and nylon 56% 6, TA-co-44% 6, IA (PARN 56/-44) having a degree of crystallinity of 35% as the thermoplastic core layer according to the procedure described in EXAMPLE 15 above except as follows.

The treated aluminum layers and the PARN 56/-44 were assembled in a 0.208 cm (0.082 inch) thick TEFLON ®️-coated stainless steel mold frame with the treated surfaces of the aluminum layers facing the PARN 56/44. The assembly was placed in a platen press heated to 299° C. A pressure of 1814 kg (2 tons) or less ram force was applied for 3 minutes and thereafter increased to 13605 kg (15 tons) for 1 minute. The laminate was then cooled under pressure to 66° C., afterwhich the pressure was released. The laminate was removed from the press and annealed at 170° C. for one hour. The properties of the laminate are tabulated in TABLE 1.

EXAMPLE 70

This Example illustrates the use of an amorphous thermoplastic as the thermoplastic core layer for comparison purposes.

The procedure described in EXAMPLE 69 was repeated except as follows.

The treated aluminum layers, and the PARN 56/44 were assembled in a 0.178 cm (0.070 inch) thick TEFLON ®️-coated stainless steel mold frame with the treated surfaces of the aluminum layers facing the PARN 56/44. The assembly was placed in a platen press heated to 310° C. A pressure of 1814 kg (2 tons) or less ram force was applied for 3 minutes and thereafter increased to 13605 kg (15 tons) for 1 minute. The laminate was then immersed immediately in an ice-water mixture. The properties of the laminate are tabulated in TABLE 1.

EXAMPLE 71

A 0.179 cm (0.0705 inch, 70.5 mils) thick metal-thermoplastic-metal laminate was prepared using 0.0127 cm (0.005 inch, 5 mils) thick 1100-0 aluminum as the metal layers and poly(ethylene terephthalate) (PET) having a degree of crystallinity of 38% as the thermoplastic core layer according to the procedure described in EXAMPLE 15 above except as follows.

The treated aluminum layers and the PET were assembled in a 0.154 cm (0.0605 inch) thick TEFLON ®️-coated stainless steel mold frame with the treated surfaces of the aluminum layers facing the PET. The assembly was placed in a platen press heated to 240° C. A pressure of 1814 kg (2 tons) or less ram force was applied for 3 minutes and thereafter increased to 13605 kg (15 tons) for 1 minute. The laminate was then cooled under pressure to 55° C. afterwhich the pressure was released. The laminate was removed from the press and annealed at 150° C. for 1 hour. The properties of the laminate are tabulated in TABLE 1.

EXAMPLE 72

The procedure described in EXAMPLE 71 above was repeated except that a 0.254 cm (0.100 inch) thick TEFLON ®-coated stainless steel mold frame was employed. The properties of the laminate are tabulated in TABLE 1.

EXAMPLE 73

A metal-thermoplastic-metal laminate was prepared using 0.0140 cm (0.0055 inch, 5.5 mils) thick Lithoplate aluminum as the metal layers and poly(ethylene terephthalate) (PET) having a degree of crystallinity of 38% as the thermoplastic core layer. The aluminum was degreased by immersion in methylene chloride as described in EXAMPLE 1 above and allowed to air dry.

A Z6020 silane solution was prepared by agitating a mixture of 11.1 grams of Z6020 silane in a solution of 3 drops of glacial acetic acid in 3.6 grams of water at ambient temperatures to form a clear, single-phase solution, which was diluted with 2254.0 grams of ethanol.

The degreased aluminum was wetted thoroughly with the above-prepared Z6020 silane solution, blown dry with a jet of clean nitrogen and heated in an oven at 100° C. for 10 minutes.

The treated aluminum layers and the PET were assembled in a 0.279 cm (0.110 inch) thick TEFLON ®-coated stainless steel mold frame with the treated surfaces of the aluminum facing the PET. The assembly was placed in a platen press heated to 282° C. A minimal pressure of ram force was applied for 3 minutes and thereafter increased to 22675 kg (25 tons) for 1 minute. The laminate was then cooled under pressure to 66° C., afterwhich the pressure was released and the laminate removed from the press. The properties of the laminate are tabulated in TABLE 1.

EXAMPLE 74

This Example illustrates the use of an amorphous thermoplastic core layer for comparison purposes.

The procedure described in EXAMPLE 71 above was repeated except as follows.

A 0.193 cm (0.076 inch, 76 mils) thick metal-thermoplastic-metal laminate using 0.0127 cm (0.005 inch, 5 mils) thick 1100-0 aluminum as the metal layers and PET as the thermoplastic core layer were fabricated according to the procedures described in EXAMPLE 70 above, except that the platen press temperature was 285° C. The properties of the laminate are tabulated in TABLE 1.

EXAMPLES 75-81

These Examples illustrate the preparation of metal-thermoplastic-metal laminates without etching the metal layers or employing an adhesion agent.

Laminates were prepared using 1100-0 aluminum as the metal layers and a melt blend of PET having a degree of crystallinity of 38% and 11.7% poly(butylene tere-co-isophthalate)-block-poly(butylene glycol) (HYTREL ® 4056, available commercially from E. I. du Pont de Nemours & Co., Wilmington, Del. 19898) as the thermoplastic core layer. The aluminum surface was degreased by immersion in trichloroethylene as described in EXAMPLE 1 above, hung vertically, and allowed to air dry without dripping. The degreasing was repeated with methanol.

The degreased aluminum layers and the PET/11.7% HYTREL ® 4056 blend were assembled in a TEFLON ®-coated stainless steel mold frame with the degreased surfaces (either metal layer surface) of the aluminum layers facing the PET/11.7% HYTREL ® 4056 blend. The assembly was placed in a platen press heated to 279° C. A minimal pressure of ram force was applied for 3 minutes and thereafter increased to 22675 kg (25 tons) for 1 minute. The laminate was then cooled under pressure to 100° C., afterwhich the pressure was released and the laminate removed from the press. The properties of the laminates, including the component layers' thicknesses, are tabulated in TABLE 1.

EXAMPLE 82

A metal-thermoplastic-metal laminate was prepared using 0.0127 cm (0.005 inch, 5 mils) thick 1100-0 aluminum as the metal layers and PET/11.7% HYTREL ® 4056 as the thermoplastic core layer. The aluminum was degreased in 1,1,1-trichloroethane as described in EXAMPLE 1 above, and then cleaned/etched by immersion in a 5% aqueous solution of sodium hydroxide at ambient temperatures for a period of 5 minutes. The aluminum was removed from the alkaline solution and rinsed thoroughly with running water followed by a demineralized water rinse. A solution of 0.9985 gram of A-1100 silane in 3.126 grams of water and 243.0 grams of ethanol (pH adjusted to 4.0 with formic acid) was sprayed onto the cleaned/etched surface of the wet aluminum. The aluminum sheets were blown dry with a jet of clean nitrogen and then heated in an oven at 130° C. for 15 minutes.

The treated aluminum layers and the PET/11.7% HYTREL ® 4056 were assembled in a 0.150 cm (0.059 inch) thick TEFLON ®-coated stainless steel mold frame with the treated surfaces of the aluminum layers facing the PET/11.7% HYTREL ® 4056. The assembly was placed in a platen press heated to 279° C. A pressure of 2721 kg (3 tons) or less ram force was applied for 3 minutes and thereafter increased to 22675 kg (25 tons) for 1 minute. The laminate was then cooled under pressure to 52° C., afterwhich the pressure was released. The laminate was removed from the press and annealed by melting to 150° C. for 20 minutes. The laminate's properties are tabulated in TABLE 1.

EXAMPLE 83

The procedure described in EXAMPLE 82 above was repeated except that a 0.165 cm (0.065 inch) thick TEFLON ®-coated stainless steel mold frame was employed. The laminate's properties are tabulated in TABLE 1.

EXAMPLE 84

A metal-thermoplastic-metal laminate was fabricated using 0.0127 cm (0.005 inch, 5 mils) thick 5052-0 aluminum as the metal layers and PET/11.7% HYTREL ® 4056 as the thermoplastic core layer. The aluminum surface was degreased in 1,1,1-trichloroethane as described in EXAMPLE 1 above and then cleaned-/etched by immersion in a sodium dichromate (chromic acid) solution containing 30.0 grams sodium dichromate dihydrate, 150 milliliters concentrated sulfuric acid (sp. gr. 1.84) and 1 liter water at 60° C. for a period of 5 minutes. The aluminum was removed from the chromic acid solution and rinsed thoroughly with running water followed by a demineralized water rinse. A 0.4% aqueous solution of Z6040 silane in distilled water (pH adjusted to 4.0 with formic acid) was applied to the cleaned/etched surface of the wet aluminum. The aluminum sheets were blown dry with a jet of clean nitrogen and heated in an oven at 130° C. for 2 minutes.

The treated aluminum layers and the PET/11.7% HYTREL ® 4056 were assembled in a 0.203 cm (0.080 inch) thick TEFLON ®-coated stainless steel mold frame with the treated surfaces of the aluminum layer facing the thermoplastic core layer. The assembly was placed in a platen press heated to 279° C. A pressure of 1814 kg (2 tons) or less ram force was applied for 3 minutes and thereafter increased to 22675 kg (25 tons) for 1 minute. The laminate was then cooled under pressure to 138° C., afterwhich the pressure was released and the laminate removed from the press. The laminate's properties are tabulated in TABLE 1.

EXAMPLES 85–87

Metal-thermoplastic-metal lamiantes using 5052-0 aluminum as the metal layers and PET/11.7% HYTREL ® 4056 as the thermoplastic core layer were prepared according to the procedure described in EXAMPLE 84 above. The properties of the laminates including the component layers' thicknesses, are tabulated in TABLE 1.

EXAMPLES 88–91

Metal-thermoplastic-metal lamiantes were prepared using 6061-0 aluminum as the metal layers and a melt blend of PET/11.7% HYTREL ® 4056 as the thermoplastic core layer. The aluminum surface was degreased by immersion in trichloroethylene followed by an acetone rinse as described in EXAMPLE 1 above and then cleaned/etched by immersion in a 2.5% aqueous sodium hydroxide solution at ambient temperatures for a period of 5 minutes. The aluminum was removed from the alkaline solution and rinsed thoroughly with running water followed by a demineralized water rinse. The wet aluminum was immersed in a mixture of 50 milliliters of A-1100 silane solution (prepared by mixing 0.83 gram of A-1100 silane with 208.0 grams of water) and 50 milliliters of A-174 silane solution (prepared by agitating a mixture of 10.0 grams of A-174 silane, 2.5 grams of water, and 0.04 gram of glacial acetic acid at ambient temperatures to form a clear, single-phase solution, and diluting with 2449.0 grams of water and 10 milliliters of ethanol), blown dry with a jet of clean nitrogen and heated in an oven at 130° C. for 2 minutes.

The treated aluminum layers and the PET/11.7% HYTREL ® 4056 were assembled in a TEFLON ®-coated stainless steel mold frame with the treated surfaces of the aluminum facing the PET/11.7% HYTREL ® 4056. The assembly was placed in a platen press heated to 279° C. A minimal pressure of ram force was applied for 3 minutes and thereafter increased to 22675 kg (25 tons) for an additional 3 minutes. The laminate was then cooled under pressure to 66° C., afterwhich the pressure was released and the laminate removed from the press. The properties of the laminates, including the component layers' thicknesses, are tabulated in TABLE 1.

EXAMPLES 92–94

The procedure described in EXAMPLES 88–91 above was repeated, except that 6061-T6 aluminum was used as the metal layers and ethanol was omitted from the A-174 silane solution. The properties of the laminates, including the component layers' thicknesses, are tabulated in TABLE 1.

EXAMPLE 95

The procedure described in EXAMPLE 73 above was repeated except that a melt blend of PET/11.7% HYTREL ® 4056 was employed as the thermoplastic core layer. The properties of the laminate are tabulated in TABLE 1.

EXAMPLE 96

A 0.127 cm (0.050 inch, 50 mils) thick metal-thermoplastic-metal laminate using 0.00508 cm (0.002 inch, 2 mils) thick C 1010 low carbon steel-annealed as the metal layers and PET/11.7% HYTREL ® 4056 as the thermoplastic core layer was prepared according to the procedure described in EXAMPLE 64 above except that the steel layers were immersed in the phosphoric acid solution for 2 minutes, a 0.117 cm (0.046 inch) thick TEFLON ®-coated stainless steel mold frame was employed, and the fabricated laminate was cooled to 38° C. before being removed from the press. The laminate's properties are tabulated in TABLE 1.

EXAMPLE 97

The procedure described in EXAMPLE 96 above was repeated except that a 0.208 cm (0.082 inch) thick TEFLON ®-coated stainless steel mold frame was employed. The laminate's properties are tabulated in TABLE 1.

EXAMPLE 98

A metal-thermoplastic-metal laminate was prepared using 0.0127 cm (0.005 inch, 5 mils) thick 1100-0 aluminum as the metal layers and a melt blend of PET having a degree of crystallinity of 38% and 11.1% poly-(ethylene terephthalate)-block-45% poly(butylene oxide) (PETBCP), with the poly(butylene oxide) blocks having a molecular weight of 1000, as the thermoplastic core layer. The aluminum was degreased by immersion in methylene chloride as described in EXAMPLE 1 above and allowed to air dry. The aluminum was immersed in an equivolume solution (50 milliliters each) of A-1100 silane solution (prepared by mixing 10.6 milliliters of A-1100 silane and 31.3 milliliters of water with 2095 milliliters of ethanol) and A-174 silane solution (prepared by agitating a mixture of 9.6 milliliters of A-174 silane, 2.5 milliliters of water and 2 drops of glacial acetic acid at ambient temperatures for 30 minutes to form a clear, single-phase solution and diluting with 3120 milliliters of ethanol), blown dry with a jet of clean nitrogen and heated in an oven at 130° C. for 2 minutes.

The treated aluminum layers and the PET/11.7% PETBCP were assembled in a 0.282 cm (0.111 inch) thick TEFLON ®-coated stainless steel mold frame and laminated as described in EXAMPLES 88–91 above. The laminate's properties are tabulated in TABLE 1.

EXAMPLES 99–102

Metal-thermoplastic-metal laminates using 6061-0 aluminum as the metal layers and a melt blend of PET/11.7% PETBCP as the thermoplastic core layer were prepared according to the procedure described in EXAMPLES 88–91 except that the acetone rinse was omitted in the degreasing step. The properties of the laminates, including the component layers' thicknesses, are tabulated in TABLE 1.

EXAMPLE 103

A metal-thermoplastic-metal laminate was prepared using 0.0152 cm (0.006 inch, 6 mils) thick 6061-T6 aluminum as the metal layers and a melt blend of PET/11.7% PETBCP as the thermoplastic core layer was prepared as described in EXAMPLES 99–102 except that following the degreasing, the aluminum was wet sanded with 400-grit wet sandpaper prior to being etched in the 2.5% aqueous sodium hydroxide solution. The properties of the laminate are tabulated in TABLE 1.

EXAMPLE 104

A metal-thermoplastic-metal laminate using 0.0127 cm (0.005 inch, 5 mils) thick aluminum as the metal layers and partly crystalline poly(ethylene terephthalate)-block-5% poly(butylene oxide) (PET-b-5% PBO), with the PBO block having a molecular weight of 1000, as the thermoplastic core layer was prepared according to the procedure described in EXAMPLE 15 above. The laminate's properties are tabulated in TABLE 1.

EXAMPLE 105

This Example illustrates the preparation of a metal-thermoplastic-metal laminate without etching the metal or using an adhesion agent.

A laminate was prepared using 0.0127 cm (0.005 inch, 5 mils) thick 1100-0 aluminum as the metal layers and partly crystalline poly(ethylene terephthalate)-block-24% poly(butylene oxide) (PET-b-24% PBO), with the PBO blocks having a molecular wight of 1000 as the thermoplastic core layer. The aluminum was degreased by immersion in methylene chloride as described in EXAMPLE 1 above and allowed to air dry. The degreased aluminum layers and the PET-b-24% PBO were assembled in a 0.292 cm (0.115 inch) thick TEFLON ®-coated stainless steel mold frame with the degreased surfaces (either surface) facing the PET-b-24% PBO. The assembly was placed in a platen press heated to 282° C. A minimal pressure of ram force was applied for 3 minutes and thereafter increased to 22675 kg (25 tons) for an additional 3 minutes. The laminate was then cooled under pressure to 66° C., afterwhich the pressure was released and the laminate removed from the press. The properties of the laminate are tabulated in TABLE 1.

EXAMPLES 106–109

Metal-thermoplastic-metal laminates using 1100-0 aluminum as the metal layers and a melt blend of poly(ethylene terephthalate) (PET) having a degree of crystallinity of 38% and 23.5% HYTREL ® 4056 as the thermoplastic core layer were prepared according to the procedure described in EXAMPLES 88–91 except that methylene chloride was employed as the degreasing solvent and the cleaning/etching of the aluminum surface was effected by immersion in a 5% aqueous sodium hydroxide solution at ambient temperatures for a period of 10 minutes. The properties of the laminates are tabulated in TABLE 1.

EXAMPLE 110

The procedure described in EXAMPLE 73 above was repeated except that a melt blend of PET having a degree of crystallinity of 38% and 23.5% HYTREL ® 4056 was employed as the thermoplastic core layer. The laminate's properties are tabulated in TABLE 1.

EXAMPLE 111

The procedure described in EXAMPLE 70 above was repeated, except that a melt blend of PET having a degree of crystallinity of 38% and 10% poly(oxycarbonyloxy-1,4-phenyleneisopropylidene-1,4-phenylene (also known as poly[2,2-bis(4'-phenylene)propane carbonate] or simply polycarbonate or PC, available commercially as MERLON ® M100 from Mobay Chemical Corp., Pittsburgh, Pa. 15205) was employed as the thermoplastic core layer and a 0.183 cm (0.072 inch) thick TEFLON ®-coated stainless steel mold frame was employed. The laminate's properties are tabulated in TABLE 1.

EXAMPLE 112

A 0.190 cm (0.075 inch, 75 mils) thick metal-thermoplastic-metal laminate using 0.0127 cm (0.005 inch, 5 mils) thick 1100-0 aluminum as the metal layers and poly(ethylene 80% terephthalate-co-20% isophthalate) (PET/I 80/20) having a degree of crystallinity of 32% as the thermoplastic core layer, and a 0.4% aqueous solution of A-1100 silane in distilled water (pH adjusted to 4.0 with formic acid) as the adhesion agent was prepared according to the procedure described in EXAMPLE 84 above except as follows.

The treated aluminum layers and the PET/I 80/20 were assembled in a 0.165 cm (0.065 inch) thick TEFLON ®-coated stainless steel mold frame with the treated surfaces of the aluminum layers facing the PET/I 80/20. The assembly was placed in a platen press heated to 240° C. A pressure of 1814 kg (2 tons) or less ram force was applied for 3 minutes and thereafter increased to 13605 kg (15 tons) for 1 minute. The laminate was then slow-cooled under pressure to 54° C., afterwhich the pressure was released and the laminate removed from the press. The laminates' properties are tabulated in TABLE 1.

EXAMPLE 113

The procedure described in EXAMPLE 70 above was repeated except that amorphous PET/I 80/20 having a degree of crystallinity of only 5% was used as the thermoplastic core layer, a 0.170 cm (0.067 inch) thick TEFLON ®-coated stainless steel mold frame was employed and the platen press was heated to 285° C. The properties of the laminate are tabulated in TABLE 1 for comparison purposes.

EXAMPLE 114

The procedure described in EXAMPLE 113 above was repeated except that the amorphous PET/I 80/20 had a degree of crystallinity of only 3.3% and a 0.142 cm (0.056 inch) thick TEFLON ®-coated stainless steel mold frame was employed. The properties of the laminate are tabulated in TABLE 1 for comparison purposes.

EXAMPLE 115

A metal-thermoplastic-metal laminate was prepared using 0.0127 cm (0.005 inch, 5 mils) thick 1100-0 aluminum as the metal layers and a partly crystalline melt blend of poly(ethylene 80% terephthalate-co-20% isophthalate) (PET/I 80/20) and 11.7% HYTREL ® 4056 as the thermoplastic core layer. The aluminum surface was degreased by immersion in methylene chloride as described in EXAMPLE 1 above and allowed to air dry. The degreased aluminum was immersed in a 0.4% solution of Z6020 silane in ethanol (prepared as described in EXAMPLE 75 above), blown dry with a jet of clean nitrogen and heated in an oven at 100° C. for 10 minutes.

The treated aluminum layers and the PET/I 80/20/11.7% HYTREL® 4056 were assembled in a 0.282 cm (0.111 inch) thick TEFLON®-coated stainless steel mold frame with the treated surfaces of the aluminum facing the PET/I 80/20/11.7% HYTREL® 4056. The assembly was placed in a platen press heated to 249° C. A minimal pressure of ram force was applied for 3 minutes and thereafter increased to 22675 kg (25 tons) for an additional 3 minutes. The laminate was then cooled under pressure to 66° C., afterwhich the pressure was released and the laminate removed from the press. The laminate was annealed by melting to 150° C. for 20 minutes. The properties of the laminate are tabulated in TABLE 1.

EXAMPLE 116

The procedure descrived in EXAMPLE 115 above was repeated except that 0.0140 cm (0.0055 inch, 5.5 mils) thick Lithoplate aluminum was employed as the metal layers and a 0.279 cm (0.110 inch) thick TEFLON®-coated stainless steel mold frame was employed. The laminate's properties are tabulated in TABLE 1.

EXAMPLE 117

The procedure described in EXAMPLE 112 was employed except that poly(butylene terephthalate) (PBT) was employed as the thermoplastic core layer and a 0.165 cm (0.065 inch) thick TEFLON®-coated stainless steel mold frame was employed. The properties of the laminate are tabulated in TABLE 1.

EXAMPLE 118

The procedure described in EXAMPLE 117 using a 0.282 cm (0.111 inch) thick TEFLON®-coated stainless steel mold frame was employed. The laminate's properties are tabulated in TABLE 1.

EXAMPLE 119

The procedure described in EXAMPLE 75 above was employed except that partly crystalline poly(butylene terephthalate) (PBT, available commercially as VALOX® 310 from General Electric Company, Pittsfield, Mass. 01201) was employed as the thermoplastic core layer and the press platens were heated to 252° C. The laminate's properties are tabulated in TABLE 1.

EXAMPLE 120

The procedure described in EXAMPLE 115 above was repeated except that a partly crystalline melt blend of PBT and 11.7% HYTREL® 4056 (PBT/11.7% HYTREL® 4056) was employed as the thermoplastic core layer. The laminate's properties are tabulated in TABLE 1.

EXAMPLE 121

The procedure described in EXAMPLE 120 above was repeated except that 0.0140 cm (0.0055 inch, 5.5 mils) thick Lithoplate aluminum was employed as the metal layers. The laminate's properties are tabulated in TABLE 1.

EXAMPLE 122

The procedure described in EXAMPLE 119 was repeated except that 0.0127 cm (0.005 inch, 5 mils) thick 1100-0 aluminum was employed as the metal layers, a partly crystalline melt blend of PBT and 23.5% HYTREL® 4056 (PBT/23.5% HYTREL® 4056) was employed as the thermoplastic core layer, and a 0.274 cm (0.108 inch) thick TEFLON®-coated strainless steel mold frame was employed. The laminate's properties are tabulated in TABLE 1.

EXAMPLE 123

The procedure described in EXAMPLE 122 above was employed except that 0.0140 cm (0.0055 inch, 5.5 mils) thick Lithoplate aluminum was employed as the metal layers and a 0.277 cm (0.109 inch) thick TEFLON®-coated stainless steel mold frame was employed. The laminate's properties are tabulated in TABLE 1.

EXAMPLE 124

A 0.211 cm (0.83 inch, 83 mils) thick laminate using 0.0127 cm (0.005 inch, 5 mils) thick 1100-0 aluminum as the metal layers and HYTREL® 7246 as the thermoplastic core layer was prepared according to the procedure described in EXAMPLE 15 above except that the initial applied pressure was 1814 kg (2 tons) or less ram force and the fabricated laminate was cooled to 54° C. before being removed from the press. The properties of the laminate are tabulated in TABLE 1.

EXAMPLE 125

The procedure described in EXAMPLES 106-109 was employed except that a partly crystalline poly(butylene terephthalate-co-isophthalate)-block-poly(butylene oxide) (HYTREL® 7246) was employed as the thermoplastic core layer and a 0.282 cm (0.111 inch) thick TELFON®-coated stainless steel mold frame was employed. The laminate's properties are tabulated in TABLE 1.

EXAMPLE 126

A metal-thermoplastic-metal laminate was prepared according to the procedure described in EXAMPLE 73 above except that HYTREL® 7246 was employed as the thermoplastic core layer. The properties of the laminate are tabulated in TABLE 1.

EXAMPLE 127

A metal-thermoplastic-metal laminate was prepared according to the procedure described in EXAMPLE 73 above except that a partly crystalline poly(butylene terephthalate-co-isophthalate)-block-poly(butylene oxide) (HYTREL® 6346) was employed as the thermoplastic core layer. The properties of the laminate are tabulated in TABLE 1.

EXAMPLE 128

A metal-thermoplastic-metal laminate was prepared according to the procedure described in EXAMPLE 119 above except that a partly crystalline poly(butylene terephthalate-co-isophthalate)-block-poly(butylene oxide) (HYTREL® 5555) was employed as the thermoplastic core layer and a 0.264 cm (0.104 inch) thick TEFLON®-coated stainless steel mold frame was employed. The properties of the laminate are tabulated in TABLE 1.

EXAMPLE 129

The procedure described in EXAMPLE 119 was employed except that a partly crystalline poly(butylene terephthalate-co-isophthalate)-block-poly(butylene oxide) (HYTREL ® 4055) was employed as the thermoplastic core layer. The properties of the laminate are tabulated in TABLE 1.

EXAMPLES 130–133

These Examples illustrate the fabrication of metal-thermoplastic-metal laminates by polymerization of monomeric material between the metal layers. The properties of the laminates are tabulated in TABLE 1.

The laminates were prepared using 0.0127 cm (0.005 inch, 5 mils) thick aluminum as the metal layers. The aluminum surface was degreased by immersion in toluene followed by an acetone rinse as described in EXAMPLE 2 above and then cleaned/etched by immersion in 5% aqueous sodium hydroxide at ambient temperatures for a period of 2 minutes. The aluminum was removed from the alkaline solution and rinsed for 10 minutes with running water followed by a demineralized water rinse. A 0.4% solution of A-1100 silane in ethanol was sprayed onto the cleaned/etched surface of the wet aluminum. The aluminum sheets were blown dry with a jet of clean nitrogen and heated in an oven at 180° C. for 30 minutes.

EXAMPLE 130—A laminate was prepared by in situ polymerization of a nylon 6 block copolymer between Lithoplate aluminum layers. A solution was prepared containing 60.0 grams of VORANOL ® 2120 (polyoxypropylene glycol with hydroxyl number of 56.8), 14.4 grams of isophthaloyl-bis-caprolactam, 1.5 grams of FLECTOL ® H (polymerized 1,2-dihydro-2,2,4-trimethylquinoline), and 109.0 grams of $\epsilon$-caprolactam. The solution was dried by distilling 25 milliliters of caprolactam under reduced pressure. A separate catalyst solution was prepared by adding 7 milliliters of 3 molar ethylmagnesium bromide in diethyl ether to 175.0 grams of dry molten $\epsilon$-caprolactam at 100° C. The solution was evacuated to remove ether and ethane and held at 100° C. under nitrogen until just prior to use.

A mold was prepared by placing the two aluminum sheets between heated platens in a closed press such that the treated surfaces would face the polymerized thermoplastic. The aluminum sheets were separated by 0.318 cm (0.125 inch) thick TEFLON ® spacers. With the mold and reactive solutions at 130° C., the solutions were pump cast into the mold using Zenith gear pumps. The stream volume ratio of monomer solution to catalyst solution was 1.12:1. The streams were mixed by means of a Kenics static mixer. After 5 minutes in the mold the laminate was removed and allowed to cool. The nylon 6 block copolymer contained 20% by weight polyoxypropylene blocks.

EXAMPLE 131—A laminate was made similar to EXAMPLE 130 above except that 1100-0 aluminum was employed as the metal layers.

EXAMPLE 132—A nylon 6 laminate was prepared by polymerizing $\epsilon$-caprolactam between 1100-0 aluminum. The mold was prepared as described in EXAMPLE 130 above. A solution was prepared containing 350.0 grams of molten $\epsilon$-caprolactam, 1.5 grams of FLECTOL ® H, and 3.4 grams of PEI-1000 (polyethylenimine, 30% aqueous solution). The solution was dried by distilling 50 milliliters of caprolactam at reduced pressure. The solution was catalyzed by the addition of 6.2 milliliters of 3 molar ethylmagnesium bromide in diethyl ether, followed by thorough degassing under vacuum. The solution temperature was adjusted to 130° C. and 1.7 milliliters of acetylcaprolactam was mixed in to serve as an initiator. The solution was then poured into the mold heated at 180° C. The casting was allowed to cure 10 minutes before removal from the mold.

EXAMPLE 133—A 40% calcined kaolinite clay reinforced nylon 6 laminate was prepared by reacting a caprolactam slurry between 1100-0 aluminum sheets. The mold was prepared as described in EXAMPLE 130 above. A mixture of 230.0 grams of $\epsilon$-caprolactam, 1.5 grams of FLECTOL ® H and 2.0 grams of PEI-1000 were heated under nitrogen to 130° C. To this stirred solution was added 120.0 grams of Alsilate W calcined kaolin, keeping the slurry temperature above 100° C. To the resultant slurry was added 1.2 milliliters of A-1100 silane. The mixture was evacuated and dried by distilling 50 milliliters of caprolactam. The vacuum was released to nitrogen and the slurry cooled to 100° C. To this mixture was added 3.2 milliliters of 3 molar ethylmagnesium bromide in diethyl ether followed by thorough degassing under vacuum. The vacuum was released through nitrogen and 1 milliliter of acetylcaprolactam added to the catalyzed slurry followed by stirring for 30 seconds. The slurry was poured into the mold, heated at 180° C. and allowed to cure for 10 minutes before removing from the mold.

EXAMPLE 134

This Example illustrates the fabrication of a metal-thermoplastic-metal laminate using an adhesive adhesion agent.

The laminate was prepared using 0.0127 cm (0.005 inch, 5 mils) thick 1100-0 aluminum as the metal layers. The aluminum surface was degreased by immersion in toluene as described in EXAMPLE 1 above followed by an acetone rinse and then cleaned/etched in a 50.0 grams/liter aqueous solution of Apex 764 M at 70° C. for a period of 2 minutes. The aluminum was removed from the cleaning/etching solution and rinsed with hot running water while wiping with a clean cloth (a Webril ® Litho Pad is convenient) followed by a hot water rinse without wiping and thereafter blown dry with a jet of clean nitrogen. The aluminum was then heated in an oven at 130° C. for 10 minutes.

An epoxy adhesive consisting of 67:33 weight mixture of EPON ® 871:EPON ® 828 (aliphatic epoxy resin, weight per epoxide, 390-470 and unmodified bisphenol A epoxy resin, weight per epoxide, 185-192, respectively, available commercially from Shell Chemical Company, Houston, Texas 77002) with EPON ® curing agent V-25 [a polyamide, equivalent weight (amount to react with 1 mole of epoxide) of about 163] was applied to the cleaned/etched surface of the aluminum as 0.00508 cm (0.002 inch, 2 mils) thick films. The treated aluminum layers and a sheet of nylon 6,6 were assembled, with the adhesive-treated aluminum surfaces facing the nylon 6,6 and laminated under pressure at 285° C. for 10 minutes, cooled under pressure to 200° C., and removed from the press. The properties of the laminate are tabulated in TABLE 1.

EXAMPLE 135

The properties of the metal-thermoplastic-metal laminates prepared as described in EXAMPLES 2–134 are tabulated in TABLE 1, with EXAMPLES 70, 74, 113 and 114, which are comprised of amorphous thermoplastic core layers, being included for comparison purposes. The properties of the component metal layers and thermoplastic core layers are tabulated in TABLES 2 and 3, respectively. Specimens for all the tests were preconditioned at 23° C. (73° F.) for at least 18 hours. Except for the coefficient of linear thermal expansion and heat distortion temperature measurements, all tests were done at 23° C. and 50% relative humidity. All non-laminated polyamide specimens were kept dry, as-molded in sealed cans with anhydrous magnesium perchlorate or anhydrous calcium sulfate desiccants during the preconditioning period at 23° C. All other specimens were preconditioned at 50% relative humidity.

It is to be understood that the values for the thickness of the thermoplastic reported in TABLE 1 represent an approximate average of the values for the various laminate specimens employed in the physical tests performed on the laminate, it being understood that minor variations in thickness may exist among such specimens obtained from the experimental laminate samples prepared.

Unless otherwise indicated, the reported tensile properties for the metals are for the metal before being subjected to the thermal conditions of lamination and these values would not be expected to substantially change after being subjected to the thermal conditions of lamination in the corresponding Examples herein.

TABLE I

| EXAMPLE | METAL TYPE | THICKNESS$^a$, cm | THERMOPLASTIC TYPE | THICKNESS, cm | TR |
|---|---|---|---|---|---|
| 2 | 1100-0 Aluminum | 0.00508 | Nylon 6,6 | 0.178 | 0.0571 |
| 3 | " | 0.0127 | " | 0.295 | 0.0861 |
| 4 | " | 0.0127 | " | 0.216 | 0.118 |
| 5 | " | 0.0127 | " | 0.180 | 0.141 |
| 6 | " | 0.0254 | " | 0.114 | 0.446 |
| 7 | " | 0.0254 | " | 0.279 | 0.182 |
| 8 | " | 0.0254 | " | 0.173 | 0.294 |
| 9 | " | 0.0254 | " | 0.0940 | 0.541 |
| 10 | 5052-0 Aluminum | 0.00254 | " | 0.180 | 0.0282 |
| 11 | " | 0.00762 | " | 0.178 | 0.0856 |
| 12 | " | 0.00762 | " | 0.173 | 0.0881 |
| 13 | " | 0.0127 | " | 0.165 | 0.154 |
| 14 | " | 0.0127 | " | 0.160 | 0.159 |
| 15 | " | 0.00762 | " | 0.133 | 0.115 |
| 16 | " | 0.00254 | " | 0.284 | 0.0179 |
| 17 | " | 0.00762 | " | 0.282 | 0.0540 |
| 18 | " | 0.0127 | " | 0.175 | 0.145 |
| 19 | " | 0.0127 | " | 0.175 | 0.145 |
| 20 | " | 0.0127 | " | 0.168 | 0.151 |
| 21 | " | 0.0127 | " | 0.168 | 0.151 |
| 22 | " | 0.0127 | " | 0.127 | 0.200 |
| 23 | " | 0.0127 | " | 0.0711 | 0.357 |
| 24 | " | 0.0127 | " | 0.0483 | 0.526 |
| 25 | 304 Stainless Steel-annealed | 0.00254 | " | 0.182 | 0.0279 |
| 26 | 304 Stainless Steel-annealed | 0.000254 | " | 0.531 | 0.000957 |
| 27 | 304 Stainless Steel-annealed | 0.00254 | " | 1.112 | 0.00457 |
| 28 | 304 Stainless Steel-annealed | 0.00127 | " | 0.528 | 0.00481 |
| 29 | 304 Stainless Steel-annealed | 0.00127 | " | 0.290 | 0.00876 |
| 30 | 304 Stainless Steel-annealed | 0.00127 | " | 0.279 | 0.00910 |
| 31 | 304 Stainless Steel-annealed | 0.00254 | " | 0.493 | 0.0103 |
| 32 | 304 Stainless Steel-annealed | 0.00127 | " | 0.174 | 0.0146 |
| 33 | 304 Stainless Steel-annealed | 0.00254 | " | 0.292 | 0.0174 |
| 34 | 304 Stainless Steel-annealed | 0.00508 | " | 0.173 | 0.0587 |
| 35 | 304 Stainless Steel-annealed | 0.00762 | " | 0.163 | 0.0935 |
| 36 | 304 Stainless Steel-annealed | 0.00762 | " | 0.107 | 0.142 |
| 37 | 304 Stainless Steel-annealed | 0.00762 | " | 0.0533 | 0.286 |
| 38 | 6061-T6 Aluminum | 0.0152 | " | 0.122 | 0.249 |
| 39 | " | 0.0152 | " | 0.109 | 0.279 |
| 40 | " | 0.0152 | " | 0.180 | 0.169 |
| 41 | " | 0.0152 | " | 0.251 | 0.121 |
| 42 | 6061-0 Aluminum | 0.0152 | " | 0.160 | 0.190 |
| 43 | " | 0.0152 | " | 0.112 | 0.271 |
| 44 | " | 0.0152 | " | 0.168 | 0.181 |
| 45 | Lithoplate Aluminum | 0.0140 | " | 0.259 | 0.108 |
| 46 | " | 0.0140 | " | 0.161 | 0.174 |
| 47 | " | 0.0140 | " | 0.147 | 0.190 |
| 48 | " | 0.0140 | " | 0.0978 | 0.286 |
| 49 | C 1010 Low Carbon | | | | |

TABLE I-continued

| | | | | | |
|---|---|---|---|---|---|
| 50 | Steel-annealed C 1010 Low Carbon | 0.00762 | " | 0.180 | 0.0847 |
| 51 | Steel-annealed C 1010 Low Carbon | 0.00508 | " | 0.279 | 0.0364 |
| 52 | Steel-annealed C 1010 Low Carbon | 0.00762 | " | 0.277 | 0.0550 |
| 53 | Steel-annealed C 1010 Low Carbon | 0.00508 | " | 0.173 | 0.0587 |
| 54 | Steel-annealed C 1010 Low Carbon | 0.00508 | " | 0.119 | 0.0854 |
| 55 | Steel-annealed 304 Stainless | 0.00762 | " | 0.119 | 0.128 |
| 56 | { Steel-annealed 6061-0 Aluminum | 0.00508 0.0152 } | " | 0.264 | 0.0768 |
|    | { 304 Stainless Steel-annealed 3003-H25 Aluminum | 0.00508 0.0140 } | " | 0.260 | 0.0734 |
| 57 | 1100-0 Aluminum | 0.0127 | ZYTEL ® ST-801 | 0.173 | 0.147 |
| 58 | " | 0.0127 | VYDYNE ® R-240 | 0.165 | 0.154 |
| 59 | 6061-0 Aluminum | 0.0152 | " | 0.160 | 0.190 |
| 60 | 6061-T6 Aluminum | 0.0152 | " | 0.122 | 0.249 |
| 61 | 5052-0 Aluminum | 0.0127 | " | 0.165 | 0.154 |
| 62 | " | 0.0127 | " | 0.152 | 0.167 |
| 63 | " | 0.0127 | VYDYNE ® R-220 | 0.168 | 0.151 |
| 64 | C 1010 Low Carbon Steel-annealed | 0.00508 | VYDYNE ® R-240 | 0.124 | 0.0819 |
| 65 | 304 Stainless Steel-annealed | 0.00762 | " | 0.112 | 0.136 |
| 66 | 1100-0 Aluminum | 0.0127 | Nylon 6,6/10% fiberglass | 0.160 | 0.159 |
| 67 | " | 0.0127 | Nylon 6 | 0.168 | 0.151 |
| 68 | " | 0.0127 | Nylon 6,6/10% fiberglass | 0.157 | 0.162 |
| 69 | " | 0.0127 | PARN 56/44 (crystalline) | 0.208 | 0.122 |
| 70 | " | 0.0127 | PARN 56/44 (amorphous) | 0.178 | 0.143 |
| 71 | " | 0.0127 | PET | 0.154 | 0.165 |
| 72 | " | 0.0127 | " | 0.254 | 0.100 |
| 73 | Lithoplate Aluminum | 0.0140 | " | 0.279 | 0.100 |
| 74 | 1100-0 Aluminum | 0.0127 | PET (amorphous) | 0.168 | 0.151 |
| 75 | " | 0.0127 | PET/11.7% HYTREL ® 4056 | 0.216 | 0.118 |
| 76 | " | 0.0127 | PET/11.7% HYTREL ® 4056 | 0.165 | 0.154 |
| 77 | " | 0.0254 | PET/11.7% HYTREL ® 4056 | 0.183 | 0.278 |
| 78 | " | 0.0508 | PET/11.7% HYTREL ® 4056 | 0.152 | 0.668 |
| 79 | " | 0.0127 | PET/11.7% HYTREL ® 4056 | 0.264 | 0.0962 |
| 80 | " | 0.0127 | PET/11.7% HYTREL ® 4056 | 0.249 | 0.102 |
| 81 | " | 0.0127 | PET/11.7% HYTREL ® 4056 | 0.312 | 0.0871 |
| 82 | " | 0.0127 | PET/11.7% HYTREL ® 4056 | 0.150 | 0.169 |
| 83 | " | 0.0127 | PET/11.7% HYTREL ® 4056 | 0.165 | 0.154 |
| 84 | 5052-0 Aluminum | 0.0127 | PET/11.7% HYTREL ® 4056 | 0.203 | 0.125 |
| 85 | " | 0.0762 | PET/11.7% HYTREL ® 4056 | 0.175 | 0.0870 |
| 86 | " | 0.0127 | PET/11.7% HYTREL ® 4056 | 0.165 | 0.154 |
| 87 | " | 0.0127 | PET/11.7% HYTREL ® 4056 | 0.165 | 0.154 |
| 88 | 6061-0 Aluminum | 0.0152 | PET/11.7% HYTREL ® 4056 | 0.160 | 0.190 |
| 89 | " | 0.0152 | PET/11.7% HYTREL ® 4056 | 0.160 | 0.190 |
| 90 | " | 0.0152 | PET/11.7% HYTREL ® 4056 | 0.160 | 0.190 |
| 91 | " | 0.0152 | PET/11.7% HYTREL ® 4056 | 0.0914 | 0.333 |
| 92 | 6061-T6 Aluminum | 0.0152 | PET/11.7% HYTREL ® 4056 | 0.249 | 0.122 |
| 93 | " | 0.0152 | PET/11.7% HYTREL ® 4056 | 0.163 | 0.187 |
| 94 | " | 0.0152 | PET/11.7% HYTREL ® | | |

TABLE I-continued

| | | | | | |
|---|---|---|---|---|---|
| 95 | Lithoplate Aluminum | 0.0140 | PET/11.7% HYTREL® 4056 | 0.0914 | 0.333 |
| | | | | 0.290 | 0.0966 |
| 96 | C 1010 Low Carbon Steel-annealed | 0.00508 | PET/11.7% HYTREL® 4056 | 0.117 | 0.0868 |
| 97 | C 1010 Low Carbon Steel-annealed | 0.00508 | PET/11.7% HYTREL® 4056 | 0.208 | 0.0488 |
| 98 | 1100-0 Aluminum | 0.0127 | PET/11.1% PETBCP | 0.282 | 0.0901 |
| 99 | 6061-0 Aluminum | 0.0152 | " | 0.249 | 0.122 |
| 100 | " | 0.0152 | " | 0.163 | 0.187 |
| 101 | " | 0.0152 | " | 0.165 | 0.184 |
| 102 | " | 0.0152 | " | 0.0914 | 0.333 |
| 103 | 6061-T6 Aluminum | 0.0152 | " | 0.163 | 0.187 |
| 104 | 1100-0 Aluminum | 0.0127 | PET[b]-5% PBO-1000 | 0.168 | 0.151 |
| 105 | " | 0.0127 | PET[b]-24% PBO-1000 | 0.292 | 0.0870 |
| 106 | " | 0.0127 | PET/23.5% HYTREL® 4056 | 0.236 | 0.108 |
| 107 | " | 0.0127 | PET/23.5% HYTREL® 4056 | 0.282 | 0.0901 |
| 108 | " | 0.0127 | PET/23.5% HYTREL® 4056 | 0.282 | 0.0901 |
| 109 | " | 0.0127 | PET/23.5% HYTREL® 4056 | 0.165 | 0.154 |
| 110 | Lithoplate Aluminum | 0.0140 | PET/23.5% HYTREL® 4056 | 0.282 | 0.0993 |
| 111 | 1100-0 Aluminum | 0.0127 | PET/10% PC | 0.183 | 0.139 |
| 112 | " | 0.0127 | PET/I 80/20 | 0.165 | 0.154 |
| 113 | " | 0.0127 | PET/I 80/20 (amorphous) | 0.170 | 0.149 |
| 114 | " | 0.0127 | PET/I 80/20 (amorphous) | 0.142 | 0.179 |
| 115 | " | 0.0127 | PET/I 80/20 11.7% HYTREL® 4056 | 0.282 | 0.0901 |
| 116 | Lithoplate Aluminum | 0.0140 | PET/I 80/20 11.7% HYTREL® 4056 | 0.282 | 0.0993 |
| 117 | 1100-0 Aluminum | 0.0127 | PBT | 0.165 | 0.154 |
| 118 | " | 0.0127 | " | 0.282 | 0.0901 |
| 119 | Lithoplate Aluminum | 0.0140 | " | 0.282 | 0.0993 |
| 120 | 1100-0 Aluminum | 0.0127 | PET/11.7% HYTREL® 4056 | 0.279 | 0.0909 |
| 121 | Lithoplate Aluminum | 0.0140 | PET/11.7% HYTREL® 4056 | 0.279 | 0.100 |
| 122 | 1100-0 Aluminum | 0.0127 | PBT/23.5% HYTREL® 4025 | 0.274 | 0.0927 |
| 123 | Lithoplate Aluminum | 0.0140 | PBT/23.5% HYTREL® 4025 | 0.277 | 0.101 |
| 124 | 1100-0 Aluminum | 0.0127 | HYTREL® 7246 | 0.185 | 0.137 |
| 125 | " | 0.0127 | " | 0.282 | 0.0901 |
| 126 | Lithoplate Aluminum | 0.0140 | " | 0.282 | 0.0993 |
| 127 | " | 0.0140 | HYTREL® 6346 | 0.282 | 0.0993 |
| 128 | " | 0.0140 | HYTREL® 5555 | 0.264 | 0.106 |
| 129 | " | 0.0140 | HYTREL® 4055 | 0.282 | 0.0993 |
| 130 | " | 0.0127 | Nylon 6[b]-20% POP | 0.318 | 0.0799 |
| 131 | 1100-0 Aluminum | 0.0127 | Nylon 6[b]-20% POP | 0.318 | 0.0799 |
| 132 | " | 0.0127 | Nylon 6[b]-20% POP | 0.318 | 0.0799 |
| 133 | " | 0.0127 | Nylon 6/40% calcined clay | 0.318 | 0.0799 |
| 134 | " | 0.0127 | Nylon 6,6 | 0.180 | 0.141 |

| EXAMPLE | $CLTE_l$ $10^{-6}$ °C.$^{-1}$ | $HDT^p$ °C. | $IR_f$ % | EFFECTIVE FLEXURAL STIFFNESS $10^3$ N/m | STRENGTH $10^6$ N/m | MODULUS $10^9$ N/m$^2$ |
|---|---|---|---|---|---|---|
| 2 | 46.3 | 136 | 11.5 | | 137.19 | 5.52 |
| 3 | 35.8 | 228 | 19.0 | | 127.54 | 11.44 |
| 4 | | >250 | | | 128.23 | 11.44 |
| 5 | 29.0 | >250 | 27.0 | 1034.84 | 114.44 | 19.17 |
| 6 | | | | | | |
| 7 | 28.6 | >250 | 39.5 | | 131.68 | 17.72 |
| 8 | 26.8 | >250 | 68.0 | | 126.16 | 26.96 |
| 9 | 25.0 | >246 | 92.5 | | 120.64 | 21.51 |
| 10 | 45.5 | 168 | 17.0 | 231.66 | 129.61 | 5.86 |
| 11 | 34.9 | >246 | 49.0 | | 159.94 | 12.34 |
| 12 | | | | | 157.18 | 10.27 |
| 13 | 30.6 | >250 | | 809.66 | 177.18 | 18.89 |
| 14 | 27.5 | | 72.0 | 746.63 | 179.93 | 18.89 |
| 15 | 30.2 | >246 | 53.5 | 273.51 | 183.38 | 13.44 |
| 16 | 55.8 | 166 | 11.0 | | 133.05 | 5.45 |
| 17 | 34.6 | >250 | 30.0 | | 144.77 | 9.65 |
| 18 | | | | 832.24 | 173.73 | 16.61 |

TABLE I-continued

| | | | | | | |
|---|---|---|---|---|---|---|
| 19 | | | | 908.24 | 175.80 | 18.13 |
| 20 | | | | 774.82 | 178.55 | 17.37 |
| 21 | | | | 780.95 | 183.38 | 17.51 |
| 22 | 26.3 | >246 | 79.0 | 358.60 | 201.30 | 16.34 |
| 23 | 25.6 | | 87.0 | 161.44 | 202.68 | 28.95 |
| 24 | 24.7 | | 85.0 | | 191.65 | 40.33 |
| 25 | 33.1 | >250 | 33.0 | 511.64 | 174.42 | 12.68 |
| 26 | | 134 | | 3659.59 | 117.89 | 3.84 |
| 27 | | 178 | | 41148.50 | 131.68 | 4.76 |
| 28 | | 178 | | | | |
| 29 | | 150 | | | | |
| 30 | | 153 | | | | |
| 31 | 49.0 | >250 | 19.0 | 5743.28 | 143.40 | 7.51 |
| 32 | | >250 | | | | |
| 33 | 38.9 | >250 | 24.0 | 1346.17 | 147.53 | 8.27 |
| 34 | 26.8 | | 59.0 | 690.07 | 210.96 | 18.20 |
| 35 | 22.3 | | 70.0 | 751.88 | 222.68 | 21.58 |
| 36 | 21.6 | | 82.0 | 309.05 | 253.01 | 27.51 |
| 37 | 17.8 | | 85.0 | 131.85 | 297.13 | 65.91 |
| 38 | | | 81.0 | 606.72 | 260.59 | 27.64 |
| 39 | | | | | 307.47 | 29.78 |
| 40 | | | 75.0 | | 196.48 | 22.61 |
| 41 | 33.5 | | | | 191.65 | 17.65 |
| 42 | | | 62.0 | | 160.63 | 18.27 |
| 43 | | | | | 137.19 | 30.89 |
| 44 | | | | | 139.95 | 24.68 |
| 45 | | | | | 164.77 | 15.24 |
| 46 | | | | | 169.59 | 23.65 |
| 47 | | | | | 162.01 | 25.58 |
| 48 | | | | | 166.15 | 31.44 |
| 49 | 16.2 | >250 | 66.5 | | 211.65 | 21.58 |
| 50 | | | | | 159.94 | 15.58 |
| 51 | | | | | 175.80 | 18.68 |
| 52 | 17.8 | >250 | 47.0 | | 159.94 | 22.54 |
| 53 | | | | 493.43 | 156.49 | 36.61 |
| 54 | | | | 762.21 | 183.38 | 50.40 |
| 55 | 32.8[e] / 35.5[g] | >250[f] / >250[h] | 45.0[f] / 43.0[h] | | 158.56[f] / 166.15[h] | 16.45[f] / 17.58[h] |
| 56 | 23.2[e] / 34.7[g] | >250[f] / >250[h] | 45.0[f] / 43.0[h] | | 159.94[f] / 166.83[h] | 16.34[f] / 17.17[h] |
| 57 | 30.2 | >250 | 47.0 | 598.32 | 84.11 | 12.41 |
| 58 | 24.8 | 239 | 27.0 | 682.54 | 159.25 | 15.93 |
| 59 | 26.3 | 239 | 54.0 | | 183.38 | 19.72 |
| 60 | | | | | | |
| 61 | | | | | | |
| 62 | 28.3 | 240 | 78.0 | | 216.47 | 21.79 |
| 63 | 34.2 | 240 | | | 184.07 | 19.58 |
| 64 | 18.2 | >237 | 66.5 | 317.98 | 211.65 | 21.03 |
| 65 | 19.3 | >240 | 78.0 | 408.86 | 278.52 | 32.19 |
| 66 | 26.6 | 238 | 26.0 | | 147.53 | 14.27 |
| 67 | 24.3 | 218 | 33.0 | | 122.71 | 12.82 |
| 68 | 25.0 | 217 | 27.0 | | 135.81 | 12.41 |
| 69 | 40.0 | 207 | 20.0 @ r = 1.5% | | 83.42 | 10.07 |
| 70 | 29.0 | 122 | 24.5 | | 91.69 | 9.03 |
| 71 | 29.5 | 240 | 30.1 | | 126.85 | 14.75 |
| 72 | 37.4 | | | | 110.30 | 13.86 |
| 73 | 28.4 | | | | 152.36 | 15.72 |
| 74 | 29.0 | 79 | 36.0 | | 90.31 | 13.99 |
| 75 | 28.8 | 238 | 39.0 | | 97.89 | 11.72 |
| 76 | | | | | | |
| 77 | 28.1 | 238 | 80.5 | | 114.44 | 18.61 |
| 78 | 24.8 | 244 | 93.5 | | 97.89 | 25.51 |
| 79 | | 244 | | | 101.34 | 11.79 |
| 80 | | 246 | | | 104.10 | 12.41 |
| 81 | | | | | 104.10 | 11.86 |
| 82 | 25.2 | | 54.0 | 598.14 | 115.82 | 15.72 |
| 83 | 26.8 | | | 815.44 | 94.45 | 19.03 |
| 84 | 26.8 | 243 | 74.0 | | 149.60 | 14.82 |
| 85 | | | | | 126.16 | 10.62 |
| 86 | | 239 | | | | |
| 87 | | | | | | |
| 88 | | | 73.0 | | 127.54 | 15.79 |
| 89 | | 240 | | | | |
| 90 | | | | | | |
| 91 | | | 90.0 | | 138.57 | 19.44 |
| 92 | 29.2 | | 75.0 | | 173.04 | 17.72 |
| 93 | | | | | 203.37 | 27.30 |
| 94 | | | 79.0 @ r = 3% | | 230.95 | 35.37 |
| 95 | | | | | 119.96 | 12.00 |
| 96 | 19.3 | >240 | 78.0 | 291.54 | 174.42 | 22.96 |

TABLE I-continued

| | | | | | | |
|---|---|---|---|---|---|---|
| 97 | 18.7 | 239 | 53.0 | | 144.77 | 12.13 |
| 98 | | 249 | | | 111.68 | 12.20 |
| 99 | 28.1 | | 52.5 | | 126.16 | 15.17 |
| 100 | | | | | 117.20 | 27.16 |
| 101 | | 246 | | | | |
| 102 | | | | | 109.61 | 31.99 |
| 103 | | | | | 168.21 | 39.50 |
| 104 | 27.9 | 243 | 30.0 | | 113.06 | 10.27 |
| 105 | | 228 | | | 34.47 | 7.86 |
| 106 | 27.5 | 238 | 38.5 | | 79.28 | 12.75 |
| 107 | | | | | 103.41 | 13.03 |
| 108 | | 242 | | | 84.80 | 9.10 |
| 109 | | | | | 77.21 | 19.17 |
| 110 | 30.4 | 239 | | | 83.42 | 13.72 |
| 111 | 23.9 | 219 | 23.0 | | 119.96 | 13.72 |
| 112 | 28.8 | 117 | 27.0 | | 125.47 | 15.24 |
| 113 | 27.4 | 80 | 43.0 | | 85.49 | 9.51 |
| 114 | | 74 | 42.0 | | 101.34 | 12.68 |
| 115 | | | | | 81.35 | 12.89 |
| 116 | | | | | 95.83 | 13.99 |
| 117 | 25.7 | >207 | 36.0 @ r = 4% | | 96.52 | 16.75 |
| 118 | | | | | 101.34 | 13.86 |
| 119 | | 225 | | | 145.46 | 15.03 |
| 120 | | | | | 54.46 | 7.58 |
| 121 | | | | | 103.41 | |
| 122 | | | | | 71.01 | 11.72 |
| 123 | | | | | 87.55 | 12.62 |
| 124 | 28.1 | 185 | 83 | 616.70 | 54.12 | 10.62 |
| 125 | | 212 | | | 51.70 | 10.55 |
| 126 | | 214 | | | 62.74 | 9.10 |
| 127 | | 194 | | | 57.22 | 9.31 |
| 128 | | | | | 49.64 | 7.01 |
| 129 | | | | | 27.58 | 3.72 |
| 130 | 26.6 | | | | 127.54 | 13.79 |
| 131 | 25.6 | | | | 72.39 | 5.45 |
| 132 | 25.6 | | | | 117.20 | 8.00 |
| 133 | 30.4 | | | | 130.30 | 11.10 |
| 134 | 39.8 | 234 | | 495.01 | 120.92 | 9.17 |

| | TENSILE | | | | | | |
|---|---|---|---|---|---|---|---|
| | STRENGTH, $10^6$ N/m² | | ELONGATION, % | | MODULUS | GIS | IZOD, NOTCHED[d] |
| EXAMPLE | YIELD | FAIL | YIELD | FAIL | $10^9$ N/m² | N-m | N-m/m |
| 2 | | | | | | | |
| 3 | | | | | | | |
| 4 | | | | | | | |
| 5 | | | | | | | |
| 6 | 91.00 | 82.04 | 17.7 | 25.5 | 2.79 | | |
| 7 | | | | | | | |
| 8 | | | | | | | |
| 9 | | | | | | | |
| 10 | | | | | | | |
| 11 | 101.34 | 93.76 | 19.0 | 27.0 | | | |
| 12 | 97.89 | 95.83 | 13.0 | 15.2 | | | |
| 13 | 113.06 | 106.86 | 17.0 | 21.5 | | | |
| 14 | 110.30 | 103.41 | 17.0 | 22.0 | | | |
| 15 | | | | | | | |
| 16 | | | | | | | |
| 17 | | | | | | | |
| 18 | 103.41 | 97.89 | 17.0 | 23.5 | | | |
| 19 | 108.93 | 99.96 | 18.0 | 23.5 | | | |
| 20 | 108.93 | 102.72 | 17.0 | 23.0 | | | |
| 21 | 108.24 | 108.24 | 14.5 | 19.0 | | | |
| 22 | | | | | | | |
| 23 | | | | | | | |
| 24 | | | | | | | |
| 25 | | | | | | | |
| 26 | | | | | | | |
| 27 | | | | | | | |
| 28 | | | | | | | |
| 29 | | | | | | | |
| 30 | | | | | | | |
| 31 | | | | | | | |
| 32 | | | | | | | |
| 33 | | | | | | | |
| 34 | | | | | | | |
| 35 | | | | | | | |
| 36 | | | | | | | |
| 37 | | | | | | | |
| 38 | | | | | | | |
| 39 | 134.43 | 123.40 | | | 3.24 | | |
| 40 | 110.30 | 104.79 | | | 2.83 | | |
| 41 | | | | | | | |

TABLE I-continued

| | | | | | | | |
|---|---|---|---|---|---|---|---|
| 42 | | | | | | | |
| 43 | 98.58 | 21.69 | 15.5 | 21.0 | 3.10 | | |
| 44 | 100.65 | 93.28 | 13.0 | 18.5 | 3.24 | | |
| 45 | | | | | | | |
| 46 | | | | | | | |
| 47 | | | | | | | |
| 48 | | | | | | | |
| 49 | 116.51 | 108.24 | 13.0 | 19.0 | 3.79 | | |
| 50 | | | | | | | |
| 51 | | | | | | | |
| 52 | 104.79 | 104.10 | 16.0 | 18.0 | 3.45 | | |
| 53 | | | | | | | |
| 54 | | | | | | | |
| 55 | | | | | | | |
| 56 | | | | | | | |
| 57 | | | | | | | |
| 58 | | | | | | 9.04 | |
| 59 | | | | | | 9.04 | |
| 60 | | | | | | 9.04 | |
| 61 | | | | | | >18.08 | |
| 62 | | 113.75 | | 10.0 | 8.27 | >18.08 | |
| 63 | | 104.10 | | 2.7 | 11.10 | <0.68 | |
| 64 | | | | | | | |
| 65 | | | | | | | |
| 66 | | | | | | | |
| 67 | | | | | | | |
| 68 | | | | | | | |
| 69 | | | | | | | |
| 70 | | | | | | | |
| 71 | | | | | | | |
| 72 | | | | | | 1.36 | 37.37 |
| 73 | | | | | | | 48.04 |
| 74 | | | | | | | |
| 75 | | | | | | | |
| 76 | | | | | | >18.08 | |
| 77 | | | | | | | |
| 78 | | | | | | | |
| 79 | | | | | | >18.08 | 53.91 |
| 80 | | | | | | >18.08 | 49.11 |
| 81 | | | | | | >18.08 | 54.98 |
| 82 | 63.42 | 58.60 | 4.3 | 11.7 | 2.34 | >18.08 | 87.01 |
| 83 | | | | | | | 74.73 |
| 84 | | | | | | | |
| 85 | 72.39 | 65.49 | 6.25 | 14.0 | 26.20 | >18.08 | |
| 86 | 78.59 | 73.77 | 8.9 | 17.8 | 2.55 | >18.08 | |
| 87 | | | | | | >18.08 | |
| 88 | | | | | | | |
| 89 | 70.32 | 64.1 | | | 2.41 | | |
| 90 | | | | | | >18.08 | |
| 91 | | | | | | | |
| 92 | 84.11 | 77.90 | 3.9 | 7.9 | 9.65 | 6.33 | 82.21 |
| 93 | 95.83 | 89.62 | 4.1 | 7.7 | 11.72 | 9.94 | 109.96 |
| 94 | 108.93 | 104.10 | 7.4 | 8.1 | 17.24 | 6.78 | 168.68 |
| 95 | | | | | | >18.08 | 59.79 |
| 96 | | | | | | | |
| 97 | | | | | | | |
| 98 | | | | | | >18.08 | 47.51 |
| 99 | 72.39 | 65.49 | 4.7 | 12.0 | 2.83 | >18.08 | 68.86 |
| 100 | 71.01 | 68.94 | 5.9 | 12.0 | 2.83 | >18.08 | |
| 101 | | | | | | | |
| 102 | 74.46 | 71.70 | 10.0 | 15.0 | 2.96 | 14.92 | |
| 103 | 90.31 | 86.86 | 5.0 | 11.0 | 0.76 | 8.59 | |
| 104 | | | | | | | |
| 105 | | | | | | | 70.46 |
| 106 | | | | | | >18.08 | 81.14 |
| 107 | | | | | | 11.30 | 79.00 |
| 108 | | | | | | >18.08 | 73.66 |
| 109 | | | | | | >18.08 | 109.43 |
| 110 | | | | | | >13.56 | 59.25 |
| 111 | | | | | | | |
| 112 | | | | | | | |
| 113 | | | | | | | |
| 114 | | | | | | | |
| 115 | | | | | | 5.20 | 48.58 |
| 116 | | | | | | 2.71 | 52.31 |
| 117 | | | | | | | |
| 118 | | | | | | 11.75 | 44.31 |
| 119 | | | | | | 11.75 | 53.38 |
| 120 | | | | | | >18.08 | 80.07 |
| 121 | | | | | | >18.08 | 104.09 |
| 122 | | | | | | >18.08 | 77.40 |
| 123 | | | | | | >18.08 | 112.63 |

TABLE I-continued

| | | | |
|---|---|---|---|
| 124 | | | |
| 125 | | >18.08 | 110.50 |
| 126 | | >18.08 | 100.89 |
| 127 | | >18.08 | 358.71 |
| 128 | | 16.27 | 768.67 |
| 129 | | 3.16 | 560.49 |
| 130 | | | |
| 131 | | | 218.86 |
| 132 | | | |
| 133 | | | |
| 134 | | | |

[a]Thickness for each metal layer
[b]Measured at $1.82 \times 10^6$ N/m$^2$, except where noted otherwise.
[c]Determined, except where noted otherwise, at a strain, r, of 5% in the outer metal layers at the point of maximum deflection.
[d]Measured according to ASTM D 256-73 test method for plastics.
[e]Steel side.
[f]Steel on tension side.
[g]Aluminum side.
[h]Aluminum on tension side.

TABLE 2
PROPERTIES OF METALS

| METAL TYPE | THICKNESS, cm | DENSITY[a] kg/m$^2$-cm | CLTE$_m$[a] $10^{-6}$ °C.$^{-1}$ | IR$_m$[b] % |
|---|---|---|---|---|
| 1145-0 Aluminum | 0.102 | 27.07 | 23.8 | 95.0 |
| " | 0.0127 | 27.07 | 23.8 | |
| 1100-0 Aluminum | 0.104 | 27.07 | 23.6 | 94.0 |
| " | 0.102 | 27.07 | 23.6 | |
| " | 0.0508 | 27.07 | 23.6 | |
| " | 0.0254 | 27.07 | 23.6 | |
| " | 0.0127 | 27.07 | 23.6 | |
| 3003-H14 Aluminum | 0.0635 | 27.46 | 23.2 | 88.0 |
| 3003-H25 Aluminum | 0.0140 | 27.46 | 23.2 | |
| 3003-H19 Aluminum | 0.0127 | 27.46 | 23.2 | |
| 5052-0 Aluminum | 0.0813 | 26.88 | 23.8 | 87.5 |
| " | 0.102 | 26.88 | 23.8 | |
| " | 0.0127 | 26.88 | 23.8 | |
| " | 0.00762 | 26.88 | 23.8 | |
| 6061-0 Aluminum | 0.163 | 27.07 | 23.4 | 91.0 |
| " | 0.0635 | 27.07 | 23.4 | |
| " | 0.0152 | 27.07 | 23.4 | |
| 6061-T6 Aluminum | 0.0813 | 27.07 | 23.4 | 80.0 |
| " | 0.127 | 27.07 | 23.4 | 83.0 |
| " | 0.470 | 27.07 | 23.4 | |
| " | 0.102 | 27.07 | 23.4 | |
| " | 0.0152 | 27.07 | 23.4 | |
| 304 Stainless Steel-annealed | 0.122 | 80.26 | 15.5$^c$ | 88.0 |
| 304 Stainless Steel-annealed | 0.00762 | 80.26 | 17.3 | |
| C 1008 Low Carbon Steel | 0.109 | | | 92.8 |
| C 1010 Low Carbon Steel-annealed | 0.00762 | 78.34 | 15.1 | |
| Low Carbon Steel Paint Test Panel | 0.0965 | | | 91.0 |
| 1977 Oldsmobile Delta 88 Hood Aluminum | 0.109 | | | 84.0 |
| 1977 Oldsmobile Delta 88 Hood Steel | 0.0864 | | | 92.7 |
| 1977 Chevrolet Monte Carlo Hood Steel | 0.0838 | | | 92.5 |
| 1977 Chevrolet Monte Carlo Hood Steel | 0.0813 | 78.14 | | |

| METAL | MODULUS $10^6$ N/m$^2$ | TENSILE STRENGTH, $10^6$ N/m$^2$ AT OFFSET, % | | | | ELONGATION, % FAIL | FLEXURAL MODULUS $10^9$ N/m$^2$ | STIFFNESS $10^3$ N/m |
|---|---|---|---|---|---|---|---|---|
| | | 0.2 | 5.0 | 10.0 | FAIL | | | |
| 1145-0 Aluminum | | | | | | | 39.71 | 278.06 |
| " | 68.94 | 38.12 | 46.95 | 74.46 | 74.46 | 13.0 | | |
| 1100-0 Aluminum | 68.94 | | | | | | 42.74 | 299.25 |
| " | 68.94 | | | | | | 39.43 | 256.35 |
| " | 68.94 | | | | | | | 32.04$^d$ |
| " | 68.94 | | | | 79.97 | 30.0 | | |

TABLE 2-continued

PROPERTIES OF METALS

| Metal | | | | | | | | |
|---|---|---|---|---|---|---|---|---|
| " | 68.94 | 33.85 | 58.25 | 64.87 | 71.01 | 30.1 | | |
| 3003-H14 Aluminum | 68.94 | | | | | | | |
| 3003-H25 Aluminum | 68.94 | 152.36[h] | 152.36[h] | — | 152.36[h] | 7.6[h] | | |
| 3003-H19 Aluminum | 68.94 | | | | 237.84 | 2.3 | | |
| 5052-0 Aluminum | 70.32 | | | | | | 64.11 | 213.45 |
| " | 70.32 | | | | | | | 416.91[e] |
| " | 70.32 | 97.21 | 153.05 | 179.93 | 194.41 | 19.5 | | |
| " | 70.32 | 103.41 | 153.74 | 184.07 | 198.55 | 19.2 | | |
| 6061-0 Aluminum | 68.94 | | | | | | 41.23 | 1097.88 |
| " | 68.94 | | | | | | | 65.49 |
| " | 68.94 | 54.46 | 112.37 | — | 128.23 | 18.0 | | |
| 6061-T6 Aluminum | 68.94 | | | | | | 68.18 | 226.93 |
| " | 68.94 | | | | | | 65.42 | |
| " | 68.94 | | | | | | | 42.90[f] |
| " | 68.94 | | | | | | | 434.25[f] |
| " | 68.94 | 250.94 | 282.65 | — | 293.00 | | | |
| 304 Stainless Steel-annealed | 193.03 | | | | | | 112.37 | |
| 304 Stainless Steel-annealed | | 259.21 | 369.52 | 443.97 | 574.96 | 24.0 | | |
| C 1008 Low Carbon Steel | | | | | | | 162.01 | 1308.70 |
| C 1010 Low Carbon Steel-annealed | 199.93–206.82 | 326.78 | 349.53 | 372.28 | 375.03 | 23.0 | | |
| Low Carbon Steel Paint Test Panel | | | | | | | 173.73 | |
| 1977 Oldsmobile Delta 88 Hood Aluminum | | | | | | | 62.67 | 506.04 |
| 1977 Oldsmobile Delta 88 Hood Steel | | | | | | | 167.52 | 668.88 |
| 1977 Chevrolet Monte Carlo Hood | | | | | | | 133.05 | 485.73 |
| 1977 Chevrolet Monte Carlo Hood Steel | | | | | | | | 443.00[g] |

| | FLEXURAL STRENGTH, $10^6$ N/m² AT STRAIN, r. % | | | | |
|---|---|---|---|---|---|
| METAL | 0.5 | 1.0 | 3.0 | 5.0 | MAXIMUM |
| 1145-0 Aluminum | 67.77 | 77.90 | 99.27 | 106.17 | 106.17 |
| " | | | | | |
| 1100-0 Aluminum | 74.46 | 87.55 | 118.58 | 128.92 | 128.92 |
| " | 70.32 | 70.28 | 99.96 | 104.79 | 104.79 |
| " | | | | | |
| " | | | | | |
| 3003-H14 Aluminum | | | | | |
| 3003-H25 Aluminum | | | | | |
| 3003-H19 Aluminum | | | | | |
| 5052-0 Aluminum | 255.77 | 320.57 | 379.17 | 317.81 | 380.55 |
| " | | | | | |
| " | | | | | |
| 6061-0 Aluminum | 101.34 | 130.30 | 173.73 | 201.99 | |
| " | | | | | |
| 6061-T6 Aluminum | 324.71 | 488.10 | 548.07 | 537.73 | 554.28 |
| " | 310.23 | 535.66 | 587.37 | 598.40 | 598.40 |
| " | | | | | |
| " | | | | | |
| 304 Stainless Steel-annealed | 441.91 | 556.35 | 703.19 | 765.23 | 779.02 |
| 304 Stainless Steel-annealed | | | | | |
| C 1008 Low Carbon Steel | 483.27 | 503.26 | 598.40 | 623.91 | |
| C 1010 Low Carbon Steel-annealed | | | | | |
| Low Carbon Steel Paint Test Panel | 606.67 | 686.64 | 744.55 | 744.55 | 751.45 |
| 1977 Oldsmobile Delta 88 Hood Aluminum | 283.34 | 388.82 | 483.27 | 520.50 | 523.25 |
| 1977 Oldsmobile Delta 88 Hood Steel | 477.75 | 513.60 | 581.16 | 588.06 | |

TABLE 2-continued

PROPERTIES OF METALS

| | | | | | |
|---|---|---|---|---|---|
| 1977 Chevrolet Monte Carlo Hood Steel | 330.91 | 383.31 | 463.28 | 467.41 | 477.06 |
| 1977 Chevrolet Monte Carlo Hood Steel | | | | | |

[a] Taken from: Lynch, Handbook of Materials of Science, Vol. II, CRC Press, Cleveland, 1975, except where noted otherwise.
[b] Determined, except where noted otherwise, at a strain, r, of 5% in the outer layers at the point of maximum deflection.
[c] Observed.
[d] Calculated from the average of 42.74 and 39.43 moduli, 41.08, for 0.104 cm and 0.102 cm thick 1100-0 aluminum, respectively.
[e] Calculated from 64.11 modulus for 0.102 cm thick 5052-0 aluminum.
[f] Calculated from the average of 68.18 and 65.42 moduli, 66.80, for 0.0813 cm and 0.127 cm thick 6061-T6 aluminum, respectively.
[g] Calculated from 133.05 modulus for 0.0838 cm thick steel from 1977 Chevrolet Monte Carlo Hood.
[h] Values are for the metal before subjection to the thermal conditions of lamination.
Values for the metal after subjection to such conditions are:
Tensile strength ($10^6$ N/m$^2$) = 111 @ 0.2% offset, 130 @ 0.5% offset, 134 @ fail.
Tensile elongation @ fail = 9.8%

TABLE 3

PROPERTIES OF THERMOPLASTICS.

| THERMOPLASTIC TYPE | THICKNESS, cm | DENSITY[a] kg/m$^2$-cm | CLTE$_c$ $10^{-6}$ °C.$^{-1}$ | HDT$_c$[b] °C. | IR$_c$[c] % | FLEXURAL MODULUS $10^9$ N/m$^2$ | FLEXURAL STIFFNESS $10^3$ N/m | FLEXURAL STRENGTH $10^6$ N/m$^2$ |
|---|---|---|---|---|---|---|---|---|
| Nylon 6,6 | 0.138 | 11.37[e] | 110.2 | | 1.3 | 2.62 | 699.52 | 110.99 |
| Nylon 6,6 | 0.132 | | | 77 | | | | |
| ZYTEL® ST-801 | 0.130 | 10.79[e] | 130.9 | 62 | 1.2 | 1.45 | 323.06 | 72.39 |
| VYDYNE® R-240 | 0.146 | 13.88[e] | 87.5 | 109 | 5.6 | 4.96 | 1504.28 | 142.71 |
| VYDYNE® R-220 | 0.128 | 14.59[e] | 83.5 | 99 | | | | |
| Nylon 6,6/10% fiberglass | 0.138 | | 81.2 | 113 | 3.0 | 3.61 | | 142.71 |
| Nylon 6 | 0.135 | 11.29 | 133.6 | 65 | 0.8 | 2.55 | | 104.79 |
| Nylon 6/10% fiberglass | 0.133 | | 68.0 | 100 | 2.4 | 3.93 | | 146.84 |
| PARN 56/44 (crystalline) | 0.145 | 12.15[f] | 57.6 | 117 | 0.4 | 3.03 | | 119.27 |
| PARN 56/44 (crystalline) | 0.080 | | 57.6 | 117 | 1.5 (@ r = 2%) | 4.14 | | 95.14 |
| PARN 56/44 (amorphous) | 0.128 | 11.73[f] | 63.9 | 117 | 0.38 | 2.41 | | 120.65 |
| PET (crystalline) | 0.136 | 13.75[f] | 92.7 | 89 | 0.81 | 2.83 | | 118.58 |
| PET (amorphous) | 0.333 | 13.32 | 83.2 | 68 | 0.78 | 2.21 | | 83.42 |
| PET/11.7% HYTREL® 4056 | 0.211 | | 112.0 | | | | | |
| PET/11.7% HYTREL® 4056 | 0.351 | | | 82 | 4.6 | 1.86 | | 64.11 |
| PET/23.5% HYTREL® 4056 | 0.318 | | 93.1 | 82 | | 1.86 | | 67.63 |
| PET/11.1% PETBCP | 0.318 | | 91.8 | 68 | 5.9 | 2.00 | | 73.08 |
| PET-b-5% PBO-1000 | 0.353 | | 116.3 | 75 | 1.6 | 2.69 | | 97.21 |
| PET (crystalline)/ 10% Polycarbonate | 0.343 | | 83.7 | 88 | 1.2 | 2.65 | | 115.13 |
| PET/I 80/20 (crystalline) | 0.361 | 13.71 | 82.3 | 75 | 1.1 | 2.76 | | 114.44 |
| PET/I 80/20 (amorphous) | 0.366 | 13.40 | 78.5 | 75 | 4.5 | 2.17 | | 91.00 |
| PBT | 0.345 | 13.08[e] | 140.6 | 52 | 0.66 | 2.21 | | 79.97 |
| HYTREL® 7246 | 0.343 | 12.48[e] | 166.0 | 53 | 0.40 | 5.31 | 132.73 | 22.75 |

| THERMOPLASTIC | TENSILE MODULUS $10^9$ N/M$^2$ | STRENGTH, $10^6$ N/m$^2$ YIELD | STRENGTH, $10^6$ N/m$^2$ FAIL | ELONGATION, % YIELD | ELONGATION, % FAIL | T$_m$, °C. | T$_g$[g], °C. |
|---|---|---|---|---|---|---|---|
| Nylon 6,6 | 2.96 | 83.42 | 63.42 | 18.0 | 36.0 | 263 | |
| Nylon 6,6 | | | | | | | |
| ZYTEL® ST-801 | 1.79 | 51.64 | | 7.1 | >50.0 | 265 | |
| VYDYNE® R-240 | 5.03 | 95.83 | 92.83 | 3.9 | 12.0 | 246 | |
| VYDYNE® R-220 | 6.55 | | 85.14 | | 1.8 | 241 | |
| Nylon 6,6/10% fiberglass | 3.79 | | 91.00 | | 3.7 | 260 | |
| Nylon 6 | 2.69 | 75.14 | | 4.6 | >50.0 | 220 | |
| Nylon 6/10% fiberglass | 3.93 | | 94.45 | | 3.3 | 218 | |
| PARN 56/44 (crystalline) | | | 78.74 | | 2.2 | 301 | |
| PARN 56/44 (crystalline) | | | | | | 301 | |
| PARN 56/44 | | | | | | | |

TABLE 3-continued
PROPERTIES OF THERMOPLASTICS.

| | | | | | |
|---|---|---|---|---|---|
| (amorphous) | 2.55 | 88.00 | | 5.6 | >50.0 | |
| PET (crystalline) | | | | | | |
| PET/11.7% 77.21 | | | 4.8 | | 257 | |
| PET (amorphous) | 2.21 | 54.95 | | 3.9 | 50.0 | |
| PET/11.7% HYTREL ® 4056 | | | | | | |
| PET/11.7% HYTREL ® 4056 | 2.34 | 58.60 | | 5.6 | >50.0 | 257 |
| PET/23.5% HYTREL ® 4056 | 1.79 | 45.50 | | 5.0 | >50.0 | 257 |
| PET/11.1% PETBCP | 3.09 | | 73.42 | | | 260 |
| PET-b-5% PBO-1000 | 2.83 | 68.94 | 41.23 | 5.0 | 30.0 | 256 |
| PET (crystalline)/ 10% Polycarbonate | 2.83 | 74.46 | | 4.5 | >50.0 | 242 |
| PET/I 80/20 (crystalline) | 2.83 | 76.52 | | 4.5 | 18.5 | 202 |
| PET/I 80/20 (amorphous) | 3.03 | 63.49 | | 3.45 | >50.0 | |
| PBT | 2.14 | 55.84 | | 12.0 | >50.0 | 230 |
| HYTREL ® 7246 | 0.55 | 27.58 | | 22.0 | >50.0 | 216 |

[a]Literature values, as noted.
[b]Measured at $1.82 \times 10^6$ N/m² except where noted otherwise.
[c]Determined, except where noted otherwise, at a strain, r, of 5% in the outer layers at the point of maximum deflection.
[d]Value for commercial product. Taken from: International Plastics Selector, Cordura Publications, Inc., La Jolla, CA, 1977.
[e]Taken from product brochure for commercial product.
[f]Experimental value.
[g]Taken from: Brandrup and Immergut, Eds., Polymer Handbook, 2nd ed., John Wiley & Sons, New York, 1975.

Thus, it is apparent that there has been provided, in accordance with the present invention, metal-thermoplastic-metal laminates and a process for preparing same that fully satisfies the objects and advantages set forth hereinabove. While the invention has been described with respect to various specific examples and embodiments thereof, it is understood that the invention is not limited thereto and that many alternatives, modifications and variations will be apparent to those skilled in the art in light of the foregoing description. Accordingly, it is intended to embrace all such alternatives, modifications, and variations as fall within the spirit and broad scope of the invention.

What is claimed is:

1. A metal-thermoplastic-metal laminate having in combination:
 an inelastic ratio less than about 93%;
 a coefficient of linear thermal expansion less than about $63 \times 10^{-6} °C.^{-1}$;
 a heat distortion temperature of at least about 130° C.; and
 a maximum weight of no more than about 9.76 kg/m²; said laminate comprising:
 a thermoplastic core layer selected from the group consisting of partly crystalline polyamides and polyesters having a crystalline melting point greater than about 130° C., said thermoplastic core having a minimum thickness of about 0.0483 cm; and
 a metal layer laminated on each side of the thermoplastic core layer, each metal layer having:
 a melting point greater than the crystalline melting point of the thermoplastic core layer; and a
 minimum thickness of about 0.00127 cm;
wherein the thickness ratio of the sum of the metal layer-thicknesses to the thermoplastic core layer thickness is described by the region of numerical overlap of the parameter $TR(YS_m/TS_c)$ as determined from the areas defined by the relationships of $TR(YS_m/TS_c)$ to $IR_l$, $CLTE_l$, and $(HDT_l - HDT_c)/(T_{mc} - HDT_c)$, the lower boundary of said areas being defined by the equation of a straight line $$y = mx + b$$

in which y is the y-axis parameters of $IR_l$, $CLTE_l$, and $(HDT_l - HDT_c)/(T_{mc} - HDT_c)$, x is the x-axis parameter of $TR(YS_m/TS_c)$, m is the slope of the straight line, and b is the intercept on the y-axis, with the proviso that:
 when y is $IR_l$, m is 108 and b is zero (0) for values of x from zero (0) to 0.65, and m is zero (0) and b is 70 for values of x greater than 0.65;
 when y is $CLTE_l$, m is $-3.6 \times 10^{-4}$ and b is $45 \times 10^{-6}$ for values of x from zero (0) to 0.1, and m is zero (0) and b is $9 \times 10^{-6}$ for values of x greater than 0.1; and
 when y is $(HDT_l - HDT_c)/(T_{mc} - HDT_c)$, m is 1 and b is zero (0) for values of x from zero (0) to 0.05, m is 10 and b is $-0.45$ for values of x from 0.05 to 0.12, and m is zero (0) and b is 0.75 for values of x greater than 0.12;
and the upper boundary of said areas being defined by the equation of a straight line as defined hereinabove, with the proviso that:
 when y is $IR_l$, m is 280 and b is 30 for values of x from zero (0) to 0.25, and m is zero (0) and b is 100 for values of x greater than 0.25;
 when y is $CLTE_l$, m is $-2.88 \times 10^{-3}$ and b is $216 \times 10^{-6}$ for values of x from zero (0) to 0.05, m is $-1.29 \times 10^{-4}$ and b is $78.5 \times 10^{-6}$ for values of x from 0.05 to 0.26, and m is zero (0) and b is $45 \times 10^{-6}$ for values of x greater than 0.26; and
 when y is $(HDT_l - HDT_c)/(T_{mc} - HDT_c)$, m is 112.5 b is zero (0) for values of x from zero (0) to 0.004, m is 15.3 and b is 0.389 for values of x from 0.004 to 0.04, and m is zero (0) and b is 1 for values of x greater than 0.04;
wherein:
 $IR_l$ is the inelastic ratio of the laminate as measured in flexure at 5% strain in the outer metal layers at the point of maximum deflection;
 $CLTE_l$ is the coefficient of linear thermal expansion of the laminate;

$(HDT_l - HDT_c)/(T_{mc} - HDT_c)$ is a normalized heat distortion temperature variable wherein $HDT_l$ is the heat distortion temperature of the laminate;

$HDT_c$ is the heat distortion temperature of the thermoplastic core layer;

$T_{mc}$ is the crystalline melting point of the thermoplastic core layer;

TR is the thickness ratio of the sum of the metal layer-thicknesses to the thermoplastic core layer thickness;

$YS_m$ is the thickness-weight-average tensile yield strength of the two metal layers at an offset of 5% elongation; and $TS_c$ is the tensile strength of the thermoplastic core layer.

2. The laminate of claim 1 wherein the partly crystalline polyamides and polyesters are selected from the group consisting of thermoplastic compositions which have a partly crystalline polyamide or polyester portion having a degree of crystallinity of at least about 20%.

3. The laminate of claim 1 wherein the thermoplastic core layer is a partly crystalline polyamide.

4. The laminate of claim 3 wherein the partly crystalline polyamide is selected from the group consisting of nylon 6,6; nylon 6; and nylon 6-CO-6,6.

5. The laminate of claim 4 wherein the partly crystalline polyamide is nylon 6,6.

6. The laminate of claim 3 wherein the partly crystalline polyamide is a partially aromatic nylon.

7. The laminate of claim 6 wherein said nylon is a nylon 6, terephthalic acid-co-6, isophthalic acid.

8. The laminate of claim 1 wherein the thermoplastic core layer is a partly crystalline polyester.

9. The laminate of claim 8 wherein the partly crystalline polyester is a poly(alkylene terephthalate).

10. The laminate of claim 9 wherein the poly(alkylene terephthalate) has an alkylene group containing from 2 to 10 carbon atoms.

11. The laminate of claim 10 wherein the poly(alkylene terephthalate) is selected from the group consisting of poly(ethylene terephthalate) and poly(butylene terephthalate).

12. The laminate of claim 10 wherein the poly(alkylene terephthalate) is a block copolymer-modified poly(alkylene terephthalate).

13. The laminate of claim 12 wherein the block copolymer-modified poly(alkylene terephthalate) is a poly(ethylene terephthalate)/poly(butylene tere-co-isophthalate)-block-poly(butylene glycol) blend.

14. The laminate of claims 1, 2, 3, 4, 5, 6, 7, 8, 9, 10, 11, 12 or 13 wherein the thermoplastic core layer material contains an added modifying agent.

15. The laminate of claim 14 wherein the added modifying agent is high modulus, high performance fibers.

16. The laminate of claim 15 wherein the high modulus, high performance fibers are glass fibers.

17. The laminate of claim 16 wherein the glass fibers are present in concentrations of between about 1% and about 45% by weight.

18. The laminate of claim 14 wherein the added modifying agent is a mineral filler.

19. The laminate of claim 18 wherein the mineral filler is present in concentrations of between about 1% and about 50% by weight.

20. The laminate of claim 19 wherein the mineral filler is calcined kaolinite clay.

21. The laminate of claim 1 wherein the metal layers laminated on each side of the thermoplastic core layer have the same composition.

22. The laminate of claim 21 wherein the metal layers are selected from the group consisting of aluminum, low carbon steel and stainless steel.

23. The laminate of claim 22 wherein the metal layers are aluminum.

24. The laminate of claim 1 wherein the metal layers have different compositions.

25. The laminate of claim 1 wherein the metal layers laminated on each side of the thermoplastic core layer are of equal thickness.

26. The laminate of claim 1 wherein both the metal layers and the thermoplastic core layer are ductile.

27. The laminate of claim 1 which is a substantially flat structure.

28. The laminate of claim 1 which is a non-flat shaped structure.

29. The laminate of claim 1 wherein the thermoplastic core layer and the metal layers are uniformly laminated together via an adhesion agent interposed between the facing surfaces thereof.

30. The laminate of claim 29 wherein the adhesion agent is an organosilane adhesion promoter.

31. The laminate of claim 30 wherein the organosilane adhesion promoter is an amino-functional alkyltrialkoxysilane.

32. The laminate of claim 31 wherein the amino-functional alkyl-trialkoxysilane is selected from the group consisting of gamma-aminopropyltriethoxysilane and N-beta-(aminoethyl)-gamma-aminopropyltrimethoxysilane.

33. The laminate of claim 30 wherein the organosilane adhesion promoter is a glycidoxy-functional alkyltrialkoxysilane.

34. The laminate of claim 33 wherein the glycidoxy-functional alkyltrialkoxysilane is gamma-glycidoxypropyltrimethoxysilane.

35. The laminate of claim 30 wherein the organosilane adhesion promoter is a methacryloxy-functional alkyltrialkoxysilane.

36. The laminate of claim 35 wherein the methacryloxy-functional alkyltrialkoxysilane is gamma-methacryloxypropyltrimethoxysilane.

37. The laminate of claim 30 wherein the organosilane adhesion promoter is a mixture of an amino-functional alkyltrialkoxysilane and a methacryloxy-functional alkyltrialkoxysilane.

38. The laminate of claim 37 wherein the amino-functional alkyltrialkoxysilane and the methacryloxy-functional alkyltrialkoxysilane of the mixture are gamma-aminopropyltriethoxysilane and gamma-methacryloxypropyltrimethoxysilane, respectively.

39. The laminate of claim 29 wherein the adhesion agent is an adhesive.

40. The laminate of claim 39 wherein the adhesive is an epoxy resin.

41. The laminate of claim 1 suitable for use as an automobile body panel wherein:
(a) the heat distortion temperature is at least about 163° C.;
(b) the coefficient of linear thermal expansion is less than about $45 \times 10^{-6}$°C.$^{-1}$;
(c) the inelastic ratio is less than about 75%; and
(d) the maximum weight is less than about 6.34 kg/m² surface area;

said laminate further having a flexural stiffness of at least about $262.65 \times 10^3$ N/m.

42. A process for the preparation of a metal-thermoplastic-metal laminate having in combination:
   an inelastic ratio less than about 93%;
   a coefficient of linear thermal expansion less than about $63 \times 10^{-6}$ °C.$^{-1}$;
   a heat distortion temperature of at least about 130° C.; and
   a maximum weight of no more than about 9.76 kg/m$^2$; which process comprises:
   disposing a metal layer on each side of a thermoplastic core layer selected from the group consisting of partly crystalline polyamides and polyesters having a crystalline melting point greater than about 130° C., said polyamide consisting essentially of: nylon 6; nylon 6,6; nylon 6-co-6,6; nylon 6, terephthalic acid-co-6, isophthalic acid; blends thereof; and copolymers thereof, each metal layer having a melting point greater than the crystalline melting point of the thermoplastic core layer and a minimum thickness of about 0.00127 cm;
   wherein the thickness ratio of the sum of the metal layer-thicknesses to the thermoplastic core layer thickness is described by the region of numerical overlap of the parameter TR(YS$_m$/TS$_c$) as determined from the areas defined by the relationships of TR(YS$_m$/TS$_c$) to IR$_l$, CLTE$_l$, and (HDT$_l$−HDT$_c$)/(T$_{mc}$−HDT$_c$), the lower boundary of said areas being defined by the equation of a straight line $$y = mx + b$$

in which y is the y-axis parameters of IR$_l$, CLTE$_l$, and (HDT$_l$−HDT$_c$)/(T$_{mc}$−HDT$_c$), x is the x-axis parameter of TR(YS$_m$/TS$_c$), m is the slope of the straight line, and b is the intercept on the y-axis, with the proviso that:
   when y is IR$_l$, m is 108 and b is zero (0) for values of x from zero (0) to 0.65, and m is zero (0) and b is 70 for values of x greater than 0.65;
   when y is CLTE$_l$, m is $-3.6 \times 10^{-4}$ and b is $45 \times 10^{-6}$ for values of x from zero (0) to 0.1, and m is zero (0) and b is $9 \times 10^{-6}$ for values of x greater than 0.1; and
   when y is (HDT$_l$−HDT$_c$)/(T$_{mc}$−HDT$_c$), m is 1 and b is zero (0) for values of x from zero (0) to 0.05, m is 10 and b is −0.45 for values of x from 0.05 to 0.12, and m is zero (0) and b is 0.75 for values of x greater than 0.12;
and the upper boundary of said areas being defined by the equation of a straight line as defined hereinabove, with the proviso that:
   when y is IR$_l$, m is 280 and b is 30 for values of x from zero (0) to 0.25, and m is zero (0) and b is 100 for values of x greater than 0.25;
   when y is CLTE$_l$, m is $-2.88 \times 10^{-3}$ and b is $216 \times 10^{-6}$ for values of x from zero (0) to 0.05, m is $-1.29 \times 10^{-4}$ and b is $78.5 \times 10^{-6}$ for values of x from 0.005 to 0.26, and m is zero (0) and b is $45 \times 10^{-6}$ for values of x greater than 0.26; and
   when y is (HDT$_l$−HDT$_c$)/(T$_{mc}$−HDT$_c$), m is 112.5 and b is zero (0) for values of x from zero (0) to 0.004, m is 15.3 and b is 0.389 for values of x from 0.004 to 0.04, and m is zero (0) and b is 1 for values of x greater than 0.04;
wherein:

IR$_l$ is the inelastic ratio of the laminate as measured in flexure at 5% strain in the outer metal layers at the point of maximum deflection; CLTE$_l$ is the coefficient of linear thermal expansion of the laminate;
(HDT$_l$−HDT$_c$)/(T$_{mc}$−HDT$_c$) is a normalized heat distortion temperature variable wherein
HDT$_l$ is the heat distortion temperature of the laminate;
HDT$_c$ is the heat distortion temperature of the thermoplastic;
T$_{mc}$ is the crystalline melting point of the thermoplastic core layer;
TR is the thickness ratio of the sum of the metal layer-thicknesses to the thermoplastic core layer thickness;
YS$_m$ is the thickness-weight-average tensile yield strength of the two metal layers at an offset of 5% elongation; and
TS$_c$ is the tensile strength of the thermoplastic core layer;
laminating the thermoplastic core layer and the metal layers by subjecting the combination to elevated temperatures and a pressure sufficient to maintain fare-adhering contact; and
cooling to ambient temperatures.

43. The process of claim 42 wherein the elevated temperatures are between about 100° C. and 350° C.

44. The process of claim 42 wherein an adhesion agent is interposed between the facing surfaces of the metal layers and the thermoplastic core layer.

45. The process of claim 44 wherein the adhesion agent is an organosilane adhesion promoter.

46. The process of claim 45 wherein the organosilane adhesion promoter is an amino-functional alkyltrialkoxysilane.

47. The process of claim 46 wherein the amino-functional alkyltrialkoxysilane is selected from the group consisting of gamma-aminopropyltriethoxysilane and N-beta-(aminoethyl)-gamma-aminopropyltrimethoxysilane.

48. The process of claim 45 wherein the organosilane adhesion promoter is a glycidoxy-functional alkyltrialkoxysilane.

49. The process of claim 48 wherein the glycidoxy-functional alkyltrialkoxysilane is gamma-glycidoxypropyltrimethoxysilane.

50. The process of claim 45 wherein the organosilane adhesion promoter is a methacryloxy-functional alkyltrialkoxysilane.

51. The process of claim 50 wherein the methacryloxy-functional alkyltrialkoxysilane is gamma-methacryloxypropyltrimethoxysilane.

52. The process of claim 45 wherein the organosilane adhesion promoter is a mixture of an amino-functional alkyltrialkoxysilane and a methacryloxy-functional alkyltrialkoxysilane.

53. The process of claim 52 wherein the amino-functional alkyltrialkoxysilane and the methacryloxy-functional alkyltrialkoxysilane are gamma-aminopropyltriethoxysilane and gamma-methacryloxypropyltrimethoxysilane, respectively.

54. The process of claim 44 wherein the adhesion agent is an adhesive.

55. The process of claim 54 wherein the adhesive is an epoxy resin.

56. The process of claim 42 which further comprises:

(a) applying a weather resistant protective coating to at least one of the metal surfaces of the metal-thermoplastic-metal laminate;

(b) curing the protective coating at elevated temperatures; and thereafter (c) cooling to ambient temperatures.

57. A process for the preparation of a metal-thermoplastic-metal laminate claim 1 which comprises:

(a) orienting two metal layers to provide a spatial separation therebetween; and (b) casting a thermoplastic core layer between the two metal layers by in situ polymerization therebetween of monomeric material at polymerization conditions, said thermoplastic core selected from the group consisting of partly crystalline polyamides and polyesters having a crystalline melting point greater than about 130° C., said polyamdie consisting essentially of: nylon 6; nylon 6,6; nylon 6-co-6,6; nylon 6, terephthalic acid-co-6, isophthalic acid; blends thereof; and copolymers thereof.

58. The process of claim 57 wherein the monomeric material is $\epsilon$-caprolactam and the thermoplastic core layer is nylon 6.

59. The process of claim 57 wherein the monomeric material is $\epsilon$-caprolactam, an acyl-bis-caprolactam, and polyoxypropylene glycol and the thermoplastic core layer is a nylon 6/polyoxypropylene block copolymer.

60. The process of claim 59 wherein the acyl-bis-caprolactam is isophthaloyl-bis-caprolactam.

61. The process of claim 57 wherein the monomeric material is $\epsilon$-caprolactam admixed with calcined kaolinite clay and the thermoplastic core layer is a calcined kaolinite clay reinforced nylon 6.

62. The process of claim 61 wherein the calcined clay reinforced nylon 6 is a 20% to 45% calcined kaolinite clay reinforced nylon 6.

63. A laminate in accordance with claims 1, 3, 4, 5 or 22 wherein the heat distortion temperature is at least about 163° C.

64. A laminate in accordance with claim 30 wherein the thermoplastic core layer is a partly crystalline polyamide.

65. A laminate in accordance with claim 64 wherein the partly crystalline polyamide is selected from the group consisting of nylon 6,6; nylon 6; and nylon 6-co-6,6.

66. A laminate in accordance with claims 64 or 65 wherein the thermoplastic core layer has a void level less than about 15%.

67. A metal-thermoplastic-metal laminate having in combination:

an inelastic ratio less than about 93%;

a coefficient of linear thermal expansion less than about $63 \times 10^{-6}$°C.$^{-1}$;

a heat distortion temperature of at least 130° C.; and a maximum weight of no more than about 9.76 kg/m$^2$; said laminate comprising:

a thermoplastic core layer selected from the group consisting of partly crystalline polyamides and polyesters having a crystalline melting point greater than about 130° C., said polyamides consisting essentially of: nylon 6; nylon 6,6; nylon 6-co-6,6; nylon 6, terephthalic acid-co-6, isophthalic acid; blends thereof; and copolymers thereof; and a metal layer laminated on each side of the thermoplastic core layer, each metal layer having:

a melting point greater than the crystalline melting point of the thermoplastic core layer; and a minimum thickness of about 0.00127 cm;

wherein the thickness ratio of the sum of the metal layer-thicknesses to the thermoplastic core layer thickness is described by the region of numerical overlap of the parameter TR(YS$_m$/TS$_c$) as determined from the areas defined by the relationships of TR(YS$_m$/TS$_c$) to IR$_l$, CLTE$_l$, and (HDT$_l$−HDT$_c$)/(T$_{mc}$−HDT$_c$), the lower boundary of said areas being defined by the equation of a straight line $$y = mx + b$$

in which y is the y-axis parameters of IR$_l$, CLTE$_l$, and (HDT$_l$−HDT$_c$)/(T$_{mc}$−HDT$_c$), x is the x-axis parameter of TR(YS$_m$/TS$_c$), m is the slope of the straight line, and b is the intercept on the y-axis, with the proviso that:

when y is IR$_l$, m is 108 and b is zero (0) for values of x from zero (0) to 0.65, and m is zero (0) and b is 70 for values of x greater than 0.65;

when y is CLTE$_l$, m is $-3.6 \times 10^{-4}$ and b is $45 \times 10^{-6}$ for values of x from zero (0) to 0.1, and m is zero (0) and b is $9 \times 10^{-6}$ for values of x greater than 0.1; and when y is (HDT$_l$−HDT$_c$)/(T$_{mc}$−HDT$_c$), m is 1 and b is zero (0) for values of x from zero (0) to 0.05, m is 10 and b is $-0.45$ for values of x from 0.05 to 0.12, and m is zero (0) and b is 0.75 for values of x greater than 0.12;

and the upper boundary of said areas being defined by the equation of a straight line as defined hereinabove, with the proviso that:

when y is IR$_l$, m is 280 and b is 30 for values of x from zero (0) to 0.25, and m is zero (0) and b is 100 for values of x greater than 0.25;

when y is CLTE$_l$, m is $-2.88 \times 10^{-3}$ and b is $216 \times 10^{-6}$ for values of x from zero (0) to 0.05, m is $-1.29 \times 10^{-4}$ and b is $78.5 \times 10^{-6}$ for values of x from 0.05 to 0.26, and m is zero (0) and b is $45 \times 10^{-6}$ for values of x greater than 0.26; and when y is (HDT$_l$−HDT$_c$)/(T$_{mc}$−HDT$_c$), m is 112.5 be is zero (0) for values of x from zero (0) to 0.004, m is 15.3 and b is 0.389 for values of x from 0.004 to 0.04, and m is zero (0) and b is 1 for values of x greater than 0.04;

wherein:

IR$_l$ is the inelastic ratio of the laminate as measured in flexure at 5% strain in the outer metal layers at the point of maximum deflection;

CLTE$_l$ is the coefficient of linear thermal expansion of the laminate;

(HDT$_l$−HDT$_c$)/(T$_{mc}$−HDT$_c$) is a normalized heat distortion temperature variable wherein HDT$_l$ is the heat distortion temperature of the laminate;

HDT$_c$ is the heat distortion temperature of the thermoplastic core layer;

T$_{mc}$ is the crystalline melting point of the thermoplastic core layer;

TR is the thickness ratio of the sum of the metal layer-thicknesses to the thermoplastic core layer thickness;

YS$_m$ is the thickness-weight-average tensile yield strength of the two metal layers at an offset of 5% elongation; and $TS_c$ is the tensile strength of the thermoplastic core layer.

68. The laminate of claim 67 wherein the partly crystalline polyamide is nylon 6.

69. The laminate of claim 67 wherein the partly crystalline polyamide is nylon 6,6.

70. The laminate of claim 67 wherein the partly crystalline polyamide is nylon 6-co-6,6.

71. A metal-thermoplastic-metal laminate having in combination:
   an inelastic ratio less than about 93%;
   a coefficient of linear thermal expansion less than about $63 \times 10^{-6} °C.^{-1}$;
   a heat distortion temperature of at least about 130° C.; and
   a maximum weight of no more than about 9.76 kg/m$^2$; said laminate comprising:
   a thermoplastic core layer selected from the group consisting of partly crystalline polyamides and polyesters having a crystalline melting point greater than about 130° C., said polyamides consisting essentially of: poly($\Sigma$-caprolactam); poly(hexamethylene adipamide); poly(hexamethylene tere-co-iso-phthalamide); and
   a metal layer laminated on each side of the thermoplastic core layer, each metal layer having:
      a melting point greater than the crystalline melting point of the thermoplastic core layer; and a minimum thickness of about 0.00127 cm;
wherein the thickness ratio of the sum of the metal layer-thicknesses to the thermoplastic core layer thickness is described by the region of numerical overlap of the parameter TR(YS$_m$/TS$_c$) as determined from the areas defined by the relationships of TR(YS$_m$/TS$_c$) to IR$_l$, CLTE$_l$, and (HDT$_l$−HDT$_c$)/(T$_{mc}$−HDT$_c$), the lower boundary of said areas being defined by the equation of a straight line $$y = mx + b$$

in which y is the y-axis parameters of IR$_l$, CLTE$_l$, and (HDT$_l$−HDT$_c$)/(T$_{mc}$−HDT$_c$), x is the x-axis parameter of TR(YS$_m$/TS$_c$), m is the slope of the straight line, and b is the intercept on the y-axis, with the proviso that:
   when y is IR$_l$, m is 108 and b is zero (0) for values of x from zero (0) to 0.65, and m is zero (0) and b is 70 for values of x greater than 0.65;
   when y is CLTE$_l$, m is $-3.6 \times 10^{-4}$ and b is $45 \times 10^{-6}$ for values of x from zero (0) to 0.1, and m is zero (0) and b is $9 \times 10^{-6}$ for values of x greater than 0.1; and
   when y is (HDT$_l$−HDT$_c$)/(T$_{mc}$−HDT$_c$), m is 1 and b is zero (0) for values of x from zero (0) to 0.05, m is 10 and b is −0.45 for values of x from 0.05 to 0.12, and m is zero (0) and b is 0.75 for values of x greater than 0.12;
and the upper boundary of said areas being defined by the equation of a straight line as defined hereinabove, with the proviso that:
   when y is IR$_l$, m is 280 and b is 30 for values of x from zero (0) to 0.25, and m is zero (0) and b is 100 for values of x greater than 0.25;
   when y is CLTE$_l$, m is $-2.88 \times 10^{-3}$ and b is $216 \times 10^{-6}$ for values of x from zero (0) to 0.05, m is $-1.29 \times 10^{-4}$ and b is $78.5 \times 10^{-6}$ for values of x from 0.05 to 0.26, and m is zero (0) and b is $45 \times 10^{-6}$ for values of x greater than 0.26; and
   when y is (HDT$_l$−HDT$_c$), m is 112.5 b is zero (0) for values of x from zero (0) to 0.004, m is 15.3 and b is 0.389 for values of x from 0.004 to 0.04, and m is zero (0) and b is 1 for values of x greater than 0.04;
wherein:
   IR$_l$ is the inelastic ratio of the laminate as measured in flexure at 5% strain in the outer metal layers at the point of maximum deflection;
   CLTE$_l$ is the coefficient of linear thermal expansion of the laminate;
   (HDT$_l$−HDT$_c$)/(T$_{mc}$−HDT$_c$) is a normalized heat distortion temperature variable wherein
   HDT$_l$ is the heat distortion temperature of the laminate;
   HDT$_c$ is the heat distortion temperature of the thermoplastic core layer;
   T$_{mc}$ is the crystalline melting point of the thermoplastic core layer;
   TR is the thicknss ratio of the sum of the metal layer-thicknesses to the thermoplastic core layer thickness;
   YS$_m$ is the thickness-weight-average tensile yield strength of the two metal layers at an offset of 5% elongation; and
   TS$_c$ is the tensile strength of the thermoplastic core layer.

72. A laminate in accordance with claims 67 or 71 wherein said thermoplastic core layer has a minimum thickness of about 0.0483 cm.

* * * * *

UNITED STATES PATENT AND TRADEMARK OFFICE
CERTIFICATE OF CORRECTION

PATENT NO. : 4,369,222

DATED : January 18, 1983

INVENTOR(S) : Ross M. Hedrick et al.

It is certified that error appears in the above-identified patent and that said Letters Patent is hereby corrected as shown below:

Col. 7, line 28, delete "$D_4$" and substitute therefor --$D_r$--.

Col. 17, line 17, delete "$m=d^3E_B$" and substitute therefor --$m=4d^3E_B$--.

Col. 58, Example 55, last column, delete "16.45f" and substitute therefor --16.41f--.

Cols. 69-70, Table 3, line 4, after PET (crystalline) insert the following numbers in the column of the table for the respective property indicated below:

--3.03--, in the MODULUS column;

--77.21--, in the STRENGTH, YIELD column;

--4.8--, in the ELONGATION, YIELD column;

--257--, in the $T_m$ °C column.

Cols. 69-70, Table 3, line 5, delete the entire line which reads "PET/11.7%  77.21, 4.8, 257".

Signed and Sealed this

Sixteenth Day of April 1985

[SEAL]

Attest:

DONALD J. QUIGG

Attesting Officer  Acting Commissioner of Patents and Trademarks